(12) United States Patent
Takada et al.

(10) Patent No.: US 6,480,722 B1
(45) Date of Patent: Nov. 12, 2002

(54) RADIO RECEIVER

(75) Inventors: Masashi Takada, Tokyo (JP); Tatsumasa Yoshida, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/300,472

(22) Filed: Apr. 28, 1999

(30) Foreign Application Priority Data

May 29, 1998 (JP) .......................................... 10-149227

(51) Int. Cl.[7] ........................ H04B 15/00; H04B 7/005; H04B 7/01; H04B 7/015
(52) U.S. Cl. ...................... 455/501; 455/63; 455/194.1; 455/222; 455/245.1
(58) Field of Search ............................ 455/501, 194.1, 455/212, 218, 221, 222, 63, 219, 220, 67.1, 67.3, 226.1, 232.1, 245.1

(56) References Cited

U.S. PATENT DOCUMENTS

| | | | |
|---|---|---|---|
| 4,893,347 A | 1/1990 | Eastmond et al. | 455/506 |
| 4,893,349 A | 1/1990 | Eastmond et al. | 455/205 |
| 5,689,816 A * | 11/1997 | Lee et al. | 375/216 |
| 5,970,399 A * | 10/1999 | Rostamy et al. | 455/212 |
| 6,181,739 B1 * | 1/2001 | Ryde et al. | 375/227 |

* cited by examiner

*Primary Examiner*—Dwayne Bost
*Assistant Examiner*—Lewis G. West
(74) *Attorney, Agent, or Firm*—Venable; Norman N. Kunitz

(57) ABSTRACT

Radio receivers which switches the received voice signal according to a supervisory signal used for supervising the condition of the propagation path through which the voice signal is transmitted are known. However, if the reception level of the radio wave received by a conventional radio receiver is low, the level of the supervisory signal becomes lower while the level of the noise accompanying the supervisory signal becomes higher, whereby the noise acts like the supervisory signal so as to provide a voice signal containing a lot of noise to the user of the radio receiver. To solve this problem, the radio receiver according to the present invention compares the level of the supervisory signal and the level of the noise accompanying the supervisory signal, so as to control the outputting of the voice signal according to the comparison result.

34 Claims, 39 Drawing Sheets

RADIO RECEIVER

This patent application claims priority based on a Japanese patent application, H10-149227 filed on May 29, 1998, the contents of which are incorporated herein by reference.

BACKGROUND OF THE INVENTION

1. Field of the Invention

The present invention relates to a radio receiver which receives a signal modulated by angle modulation, and in particular to a radio receiver which switches the received signal based upon a supervisory signal indicative of the condition of the propagation path through which the signal passes.

2. Description of the Related Art

Radio receivers employing angle-modulation have been widely used. In contrast to amplitude modulation, angle-modulation utilizes a wide band to improve the signal-to-noise ratio. However, this improvement has a limit, which in general is called the threshold. If the reception level of the audio signal is decreased to this threshold, the noise accompanying the audio signal sharply increases. In this case, it is necessary to cut off the audio signal, and a supervisory signal is used to indicate whether or not the audio signal should be cut off.

For example, the audio signal is cut off when the supervisory signal indicates that the propagation path is bad, so as to avoid providing an audio signal having a lot of noise to the user of the radio receiver.

FIG. 1 shows the configuration of a conventional radio receiver. The radio receiver receives from a radio transmitter (not shown) an audio signal and a supervisory signal. For example, as the supervisory signal, the AMPS (Advanced Mobile Phone Service) system employs a SAT (Supervisory Audio Tone) signal such as a 5970 Hz signal, a 6000 Hz signal, and a 6030 Hz signal. In FIG. 1, to control the audio signal as instructed by the supervisory signal, the radio receiver incorporates an antenna 1000, a demodulator 1001, a high pass filter (HPF) 1002, an audio demodulator 1003, a controller 1004, and a speaker 1005. Further, the audio demodulator 1003 incorporates a band pass filter (BPF) 1003*a*, a de-emphasizer 1003*b*, and an expander 1003*c*. The controller 1004 incorporates a detector 1004*a* and a switch 1004*b*, wherein the detector 1004*a* incorporates a band pass filter 1004*c*, a level detector 1004*d*, and a switch controller 1004*e* as shown in FIG. 2.

Upon receipt of an audio signal and a supervisory signal by the antenna 1000, the demodulator 1001 demodulates those signals, whereby the demodulated signals are fed into both the high pass filter 1002 and the audio demodulator 1003. Since the high pass filter 1002 permits signals having frequencies higher than the frequency of the audio signal to pass therethrough, the supervisory signal passes through the high pass filter 1002, thus entering the detector 1004*a* of the controller 1004. Since the band pass filter 1003*a* allows the audio signal to pass therethrough, the audio signal enters the switch 1004*b* of the controller 1004. Upon receiving the supervisory signal, the detector 1004*a* detects whether the level of the supervisory signal is higher or lower than a given threshold, so as to control the switch 1004*b*. More specifically, the band pass filter 1004*c* passes only the supervisory signal, the level detector 1004*d* detects the level of the supervisory signal, and the switch controller 1004*e* controls the switch 1004*b* according to the detected level. If the supervisory signal is higher than the threshold, the detector 1004*a* instructs the switch 1004*b* to pass the audio signal to the speaker 1005. On the contrary, if lower, the detector 1004*a* instructs the switch 1004*b* to cut off the audio signal. In this way, if the supervisory signal indicates that the path condition is good, that is, that the audio signal contains little noise, the audio signal is provided to the user; however, if the supervisory signal indicates that the path condition is bad, that is, that the audio signal contains a lot of noise, the audio signal is not provided to the user, so as not to annoy the user.

However, the detector 1004*a* detects the level of noise in addition to the level of the supervisory signal. The level of noise might be higher than the level of the supervisory signal owing to fading, for example. Accordingly, even though the level of the supervisory signal is low, a high level of noise might, by acting like the supervisory signal, allow the audio signal to enter the speaker 1005. This would provide the user with an audio signal containing a lot of noise, thus annoying the user.

On the other hand, the Japanese national publication of the translated version of Hei 1-500788 teaches another radio receiver. This radio receiver controls or reduces the level of the audio signal by comparing a given threshold with the amplitude envelope of the received signals which are beyond the frequency band of the audio signal. In addition, a technique of reducing the audio signal according to an RSSI (Received Signal Strength Indicator) signal indicating the level or strength of the received signal has been used. However, neither the former technique nor the latter technique has solved the problem discussed above.

SUMMARY OF THE INVENTION

It is therefore an object of the present invention to provide a receiver which is capable of correctly controlling the outputting of an audio signal according to a supervisory signal regardless of the level of the noise accompanying the supervisory signal.

According to an aspect of the present invention, there is provided a receiver, which receives a desired signal, comprising: a calculating circuit which calculates the condition of the desired signal based upon the level of the desired signal and the level of noise accompanying the desired signal; and a controlling circuit which controls the outputting of the desired signal according to the calculated condition.

According to another aspect of the present invention, there is provided a portable telephone which receives a voice signal modulated by angle modulation and a supervisory signal for checking the condition of the propagation path through which the voice signal passes, and controls the outputting of the voice signal according to the supervisory signal, the portable telephone comprising: a receiving circuit which receives a radio wave including the voice signal and the supervisory signal; a first filter which passes the supervisory signal; a second filter which passes noise whose frequency is different from the frequency band of the voice signal and the frequency of the supervisory signal; a first level calculator which calculates the level of the supervisory signal passing through the first filter; a second level calculator which calculates the level of the noise passing through the second filter; a subtractor which calculates the difference between the level of the supervisory signal and the level of the noise; a comparator which compares the difference with a threshold defined by the angle modulation; and a controller which controls the outputting of the voice signal according to the result of the comparison obtained by the comparator.

According to still another aspect of the present invention, there is provided a method for use of a radio receiver which receives a transmission signal and a supervisory signal for supervising the condition of the propagation path through which the transmission signal passes, and controls the outputting of the transmission signal according to the supervisory signal, the method comprising the steps of: detecting the level of the supervisory signal; detecting the level of noise whose frequency is different from the frequency band of the transmission signal and the frequency of the supervisory signal; and calculating the difference between the level of the supervisory signal and the level of noise; and controlling the outputting of the transmission signal according to the difference.

BRIEF DESCRIPTION OF THE DRAWINGS

The present invention will be understood more fully from the detailed description given hereinbelow, in conjunction with the accompanying drawings.

DESCRIPTION OF THE PREFERRED EMBODIMENTS

The preferred embodiments of the radio receiver according to the present invention will now be described in detail with reference to the accompanying drawings.

First Embodiment

The first embodiment of the radio receiver according to the present invention will now be described in detail.

Figure 1:
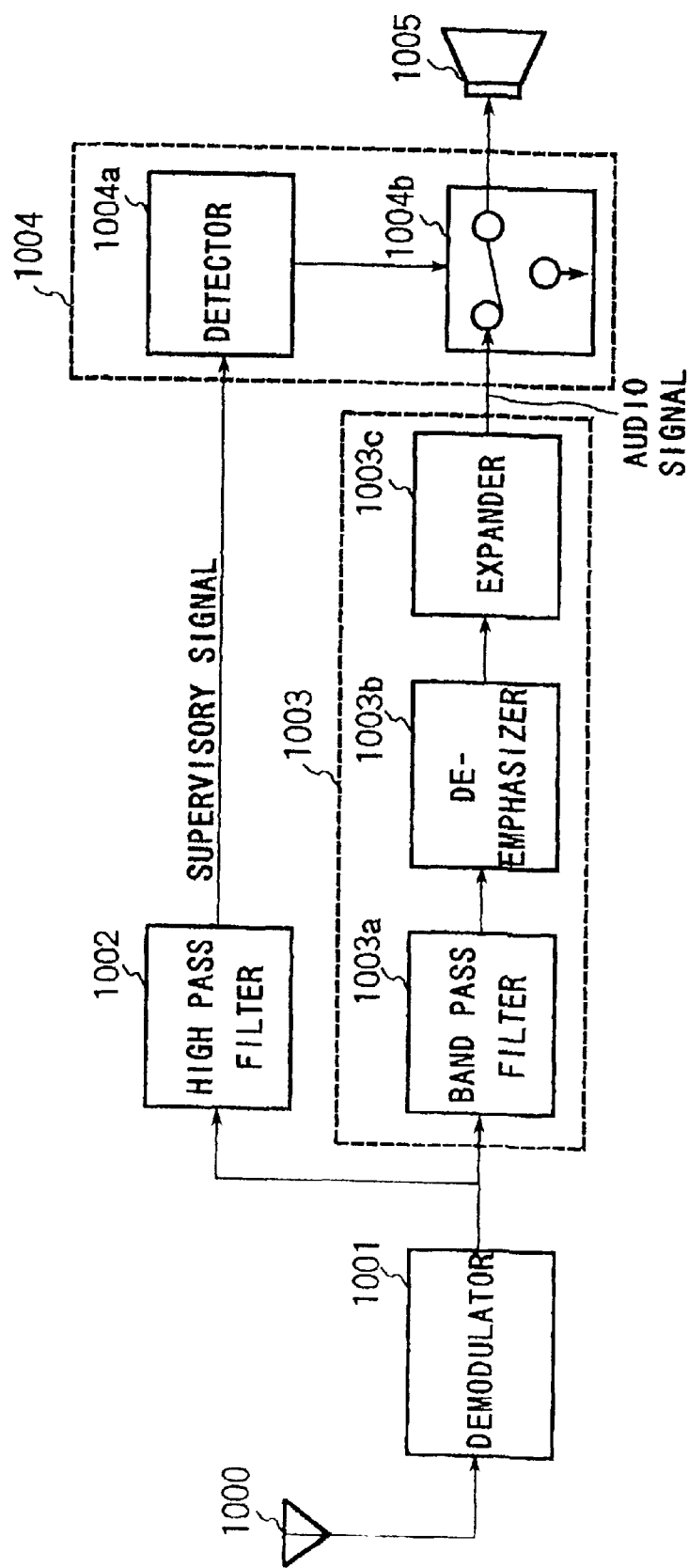
FIG. 1 shows the configuration of a conventional radio receiver.
Figure 2:
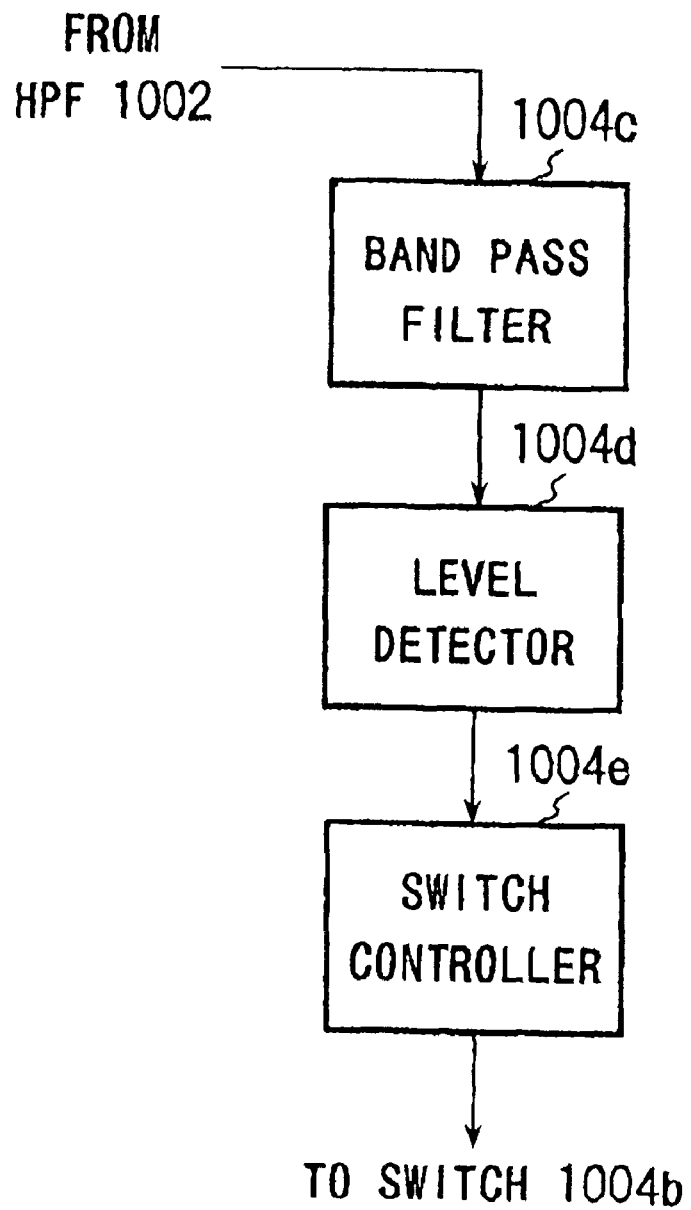
FIG. 2 shows the configuration of the detector in the conventional radio receiver of FIG. 1.
Figure 3:
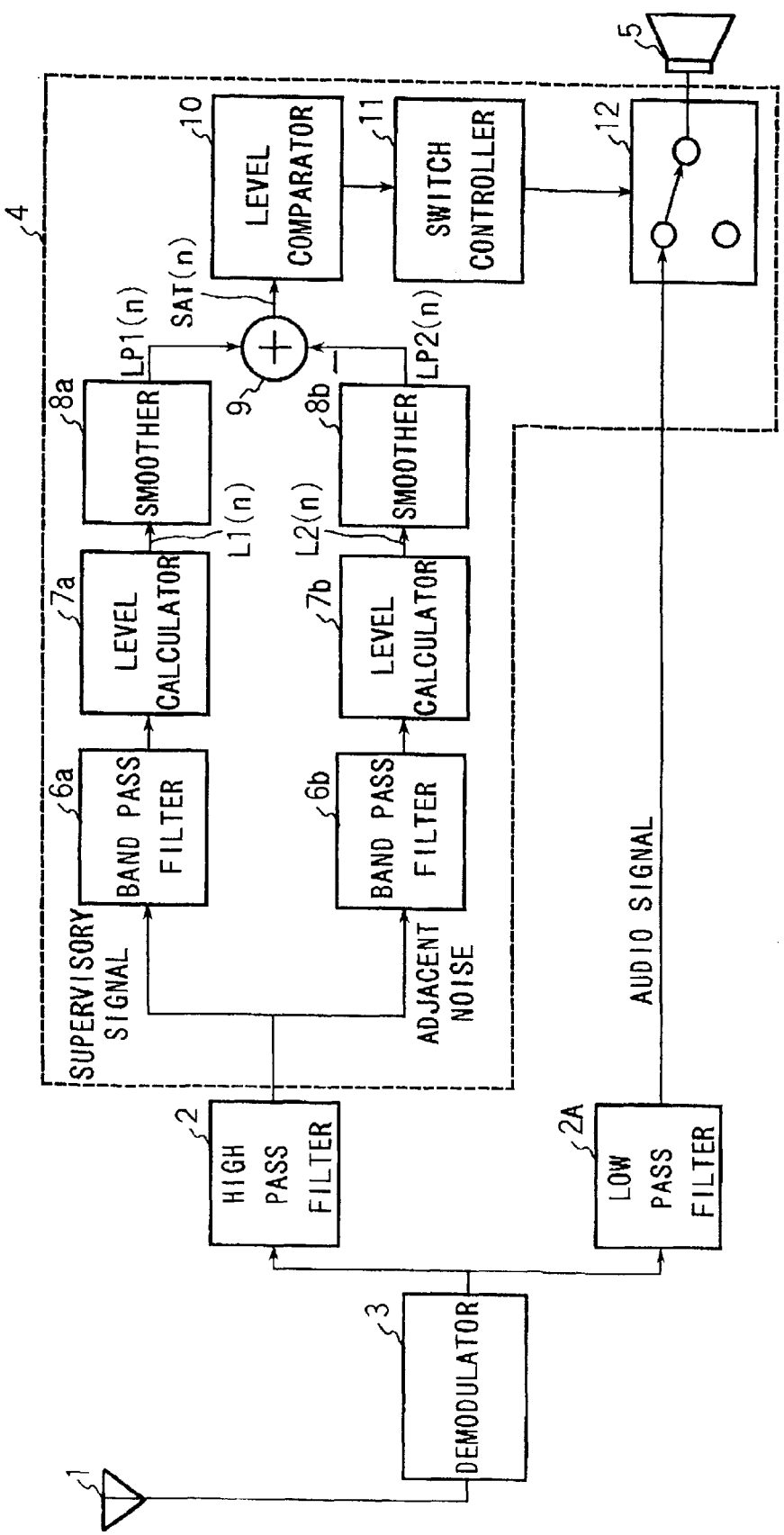
FIG. 3 shows the configuration of the first embodiment.

First, the configuration of the first embodiment will be explained. FIG. 3 shows the configuration of the first embodiment of the radio receiver. In the figure, the radio receiver incorporates an antenna 1, a high pass filter 2, a low pass filter 2A, a demodulator 3, a control unit 4, and a speaker 5. Further, the control unit 4 incorporates band pass filters 6a and 6b, level calculators 7a and 7b, smoothers 8a and 8b, a subtractor 9, a level comparator 10, a switch controller 11, and a switch 12.

The antenna 1 receives a radio wave including an audio signal, a supervisory signal, and noise from a radio transmitter (not shown). The supervisory signal is used for checking whether the condition of the propagation path between the radio transmitter and the radio receiver is good or bad. Upon receipt of the radio wave from the antenna 1, the demodulator 3 demodulates the radio wave to feed a demodulated signal to the high pass filter 2 and the low pass filter 2A. The demodulator 3 incorporates, for example, a band pass filter, a de-emphasizer, and an expander (not shown), which respectively pass, de-emphasize, and expand the received signal in demodulation.

Figure 4:
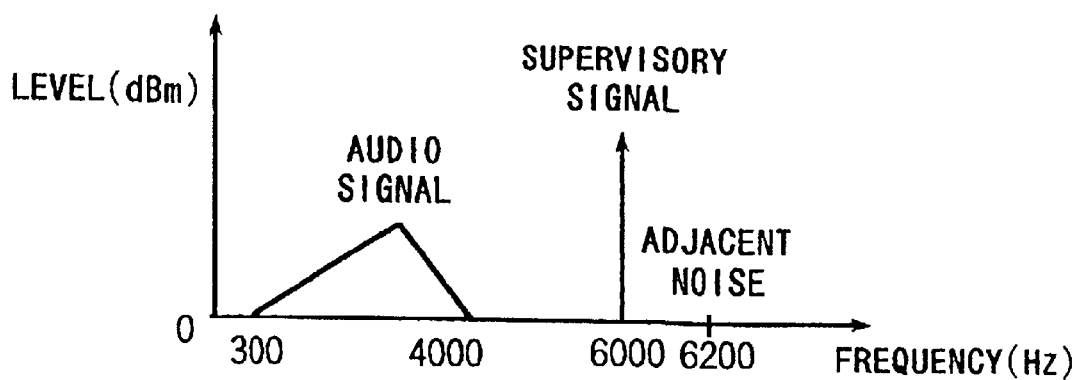
FIG. 4 shows the frequencies of the audio signal, the supervisory signal, and the adjacent signal in the first embodiment.

The high pass filter 2 passes the signals other than the audio signal. Specifically, since the frequency of the supervisory signal is higher than that of the audio signal, the high pass filter 2 passes signals whose frequency is higher than that of the audio signal, thus passing the supervisory signal and noise whose frequency is higher than that of the audio signal. Here, for example, the frequency of the supervisory signal is 6000 Hz, the frequency of the noise adjacent to the supervisory signal is 6200 Hz, and the frequency of the audio signal ranges from 300 Hz to 4000 Hz, as shown in FIG. 4. In this way, the supervisory signal and the adjacent noise are fed into both the band pass filter 6a and the band pass filter 6b of the control unit 4. On the other hand, the low pass filter 2A passes the audio signal to provide the audio signal to the switch 12 of the control unit 4.

In the control unit 4, the band pass filter 6a passes the supervisory signal while the band pass filter 6b passes noise whose frequency is adjacent to that of the supervisory signal, which is referred to as "adjacent noise." The level calculator 7a calculates the absolute value of the supervisory signal, which is referred to as "L1(n)." Similarly, the level calculator 7b calculates the absolute value of the adjacent noise, which is referred to as "L2(n)." Herein, the absolute value denotes the power. The smoother 8a smoothes the absolute value L1(n) to reduce the change in the supervisory signal, thus outputting the smoothed value LP1(n). The smoother 8b smoothes the absolute value L2(n) to reduce the change in the adjacent noise, thus outputting the smoothed value LP2(n). The subtractor 9 performs subtraction on the values LP1(n) and LP2(n), thereby providing the difference SAT(n) therebetween. The level comparator 10 compares the value SAT(n) with a predetermined threshold TH so as to notify the switch controller 11 of the result of the comparison. The switch controller 11 controls the switch 12 according to the result. The switch 12 passes or cuts off the audio signal under the control of the switch controller 11.

In addition to the above circuits, the radio receiver further incorporates a demodulator and an A/D convertor (not shown). Both the demodulator and A/D convertor are placed after the antenna 1, whereby the demodulator demodulates the received radio wave to provide to the A/D convertor a signal whose frequency is lower than that of the radio wave, and the A/D convertor converts the analogue signal to a digital signal.

Next, the operation of the first embodiment will be explained. Upon receipt of the radio wave from the radio transmitter, the antenna 1 feeds the received wave to the demodulator 3. The demodulator 3 demodulates the receipt radio wave to provide the demodulated signal to both the high pass filter 2 and the low pass filter 2A. Having been fed the radio wave, the high pass filter 2 passes the supervisory signal and the adjacent noise while the low pass filter 2A passes the audio signal. Hence, both the supervisory signal and the adjacent signal are fed into both the band pass filter 6a and the band pass filter 6b whereas the audio signal is fed into the switch 12.

In the control unit 4, the supervisory signal passes through the band pass filter 6a while the adjacent noise passes through the band pass filter 6b. Receiving the supervisory signal, the level calculator 7a calculates the absolute value thereof L1(n). Receiving the adjacent noise, the level calculator 7b calculates the absolute value thereof L2(n) likewise. The smoother 8a smoothes the value L1(n) to produce the smoothed value LP1(n) while the smoother 8b smoothes the value L2(n) to produce the smoothed value LP2(n), which are defined as follows:

$$LP1(n)=\delta*L1(n)+(1-\delta)*LP1(n-1) \qquad (1)$$

$$LP2(n)=\delta*L2(n)+(1-\delta)*LP2(n-1) \qquad (2)$$

where n denotes the order of sampling, and δ denotes the weight coefficient. In this embodiment, δ=1/64 and the frequency of sampling is 40 KHz, for example.

Upon being fed with both the values LP1(n) and LP2(n) by the smoothers 8a and 8b, the subtractor 9 subtracts the value LP2(n) from the value LP1(n) to yield the difference SAT(n):

$$SAT(n)=LP1(n)-LP2(n) \qquad (3)$$

The level comparator 10 compares the value SAT(n) with the predetermined threshold TH to determine whether the level of the supervisory signal is strong or weak, and to notify the switch controller 11 accordingly of the presence or absence of the supervisory signal, as follows:

if SAT(n)>=TH, the level comparator 10 notifies the switch controller 11 of the presence of the supervisory signal, and if SAT(n)<TH, the level comparator 10 notifies the switch controller 11 of the absence of the supervisory signal.

Figure 5:
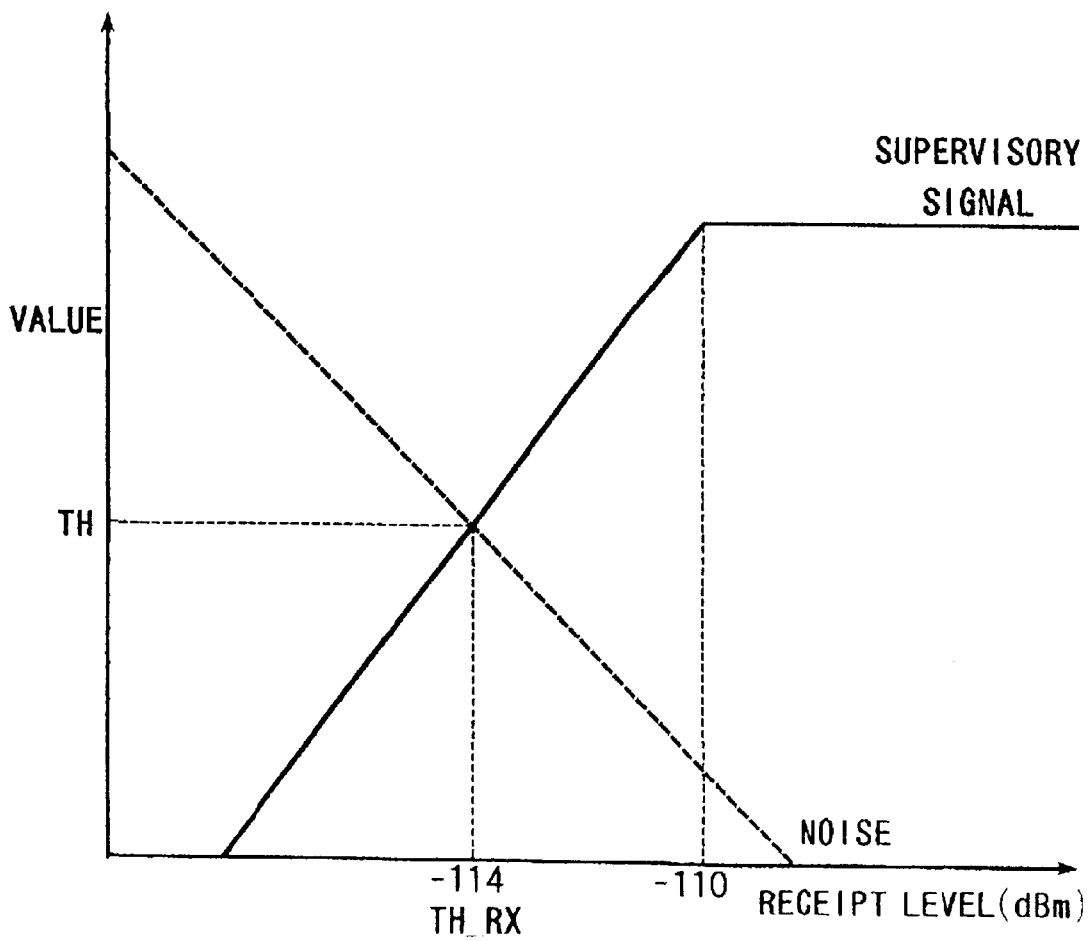
FIG. 5 shows the relationship of the threshold TH and the reception level of the radio wave in the first embodiment.

In general, the reception level of the radio wave ranges from −30 dBm to −130 dBm, wherein the level of the supervisory signal decreases sharply below a reception level of −110 dBm, for example. In contrast, the noise level continuously increases under −110 dBm. Thus, below such a reception level, the noise may work like the supervisory signal. Therefore, it is necessary to cut off audio signals containing a lot of noise below the reception level of −114 dBm, for example, as shown in FIG. 5. Accordingly, the threshold TH is set to be the value corresponding to a reception level TH_RX of −114 dBm.

Notified of the presence/absence of the supervisory signal, the switch controller 11 controls the switch 12 according to the contents of the notification. Specifically, the switch controller 11 forces the switch 12 to pass the audio signal upon notification of the presence of the supervisory signal; on the contrary, it forces the switch 12 to cut off the audio signal upon notification of the absence thereof.

As described above, according to the first embodiment, for the purpose of confirming whether the supervisory signal is actually strong or weak, the control unit 4 compares the level of the supervisory signal with the level of the adjacent noise. If the difference therebetween is large, the control unit 4 concludes that the supervisory signal is large, that is, that the condition of the propagation path is good. On the contrary, if the difference is small, the control unit 4 concludes that the supervisory signal is small, that is, that the condition of the propagation path is bad. Then, the control unit 4 passes the audio signal upon concluding that the path is good, and cuts off the audio signal upon concluding that the path is bad. Consequently, audio signals which contain little noise are provided to the user of the radio receiver, while audio signals which contain a lot of noise are not provided to the user.

Second Embodiment

Next, the second embodiment of the radio receiver according to the present invention will be explained. The second embodiment is significantly characterized by its feature of controlling the gain used for amplifying the audio signal. The configuration of the second embodiment is roughly the same as that of the first embodiment, except that the control unit 4 in the second embodiment incorporates a gain generator 13, and a multiplier 14 in place of the switch controller 11 and the switch 12 in the first embodiment. Since the configuration and the operation of the circuits other than these two additional circuits in the second embodiment are the same as in the first embodiment, the explanation below will focus principally on the configuration and operation of these two additional circuits.

Figure 6:
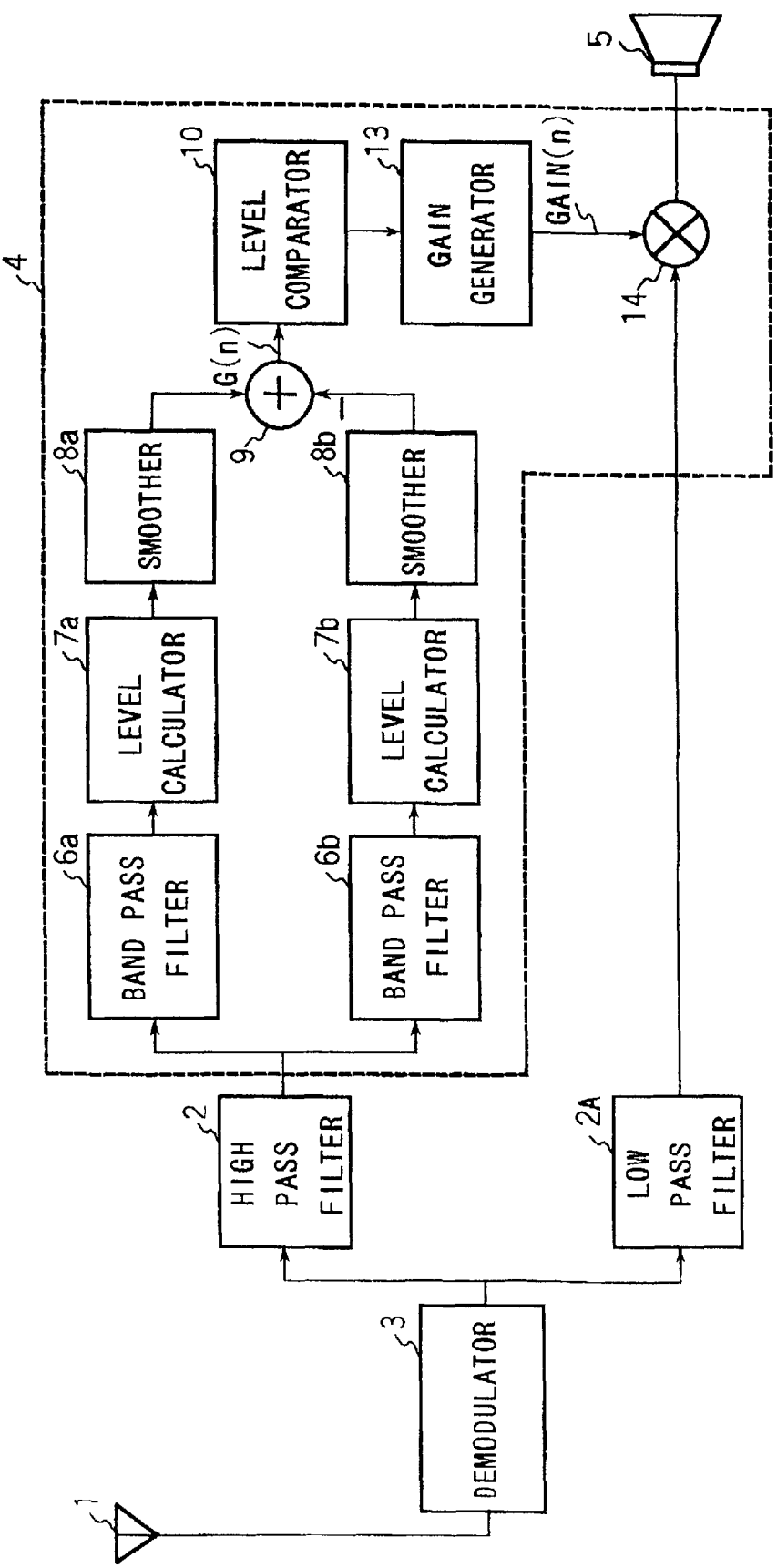
FIG. 6 shows the configuration of the second embodiment.

FIG. 6 shows the configuration of the controller of the second embodiment. In the control unit 4, the gain generator 13 generates a gain according to the result of the comparison obtained by the level comparator 10, and the multiplier 14 amplifies the audio signal based upon the gain.

Next, the operation of the control unit 4 will be explained. Similar to the first embodiment, upon receiving from the subtractor 9, the value G(n), which is identical to the value SAT(n), the difference between the level of the supervisory signal and the adjacent noise, the level comparator 10 compares the value G(n) with the predetermined threshold TH, so as to feed the gain generator 13 the value G(n) and to notify it of whether the value G(n) is larger than the threshold TH. The gain generator 13 generates the value GAIN (n) on the basis of the value of G(n) as follows:

$$\text{if } G(n) >= TH, \text{ GAIN}(n) = 1.0 \quad (4)$$

$$\text{if } G(n) < TH, \text{ GAIN}(n) = ((1.0-0.1)/(TH-\text{REF\_TH})) \, (G(n)-TH)+1 \quad (5)$$

Figure 7:
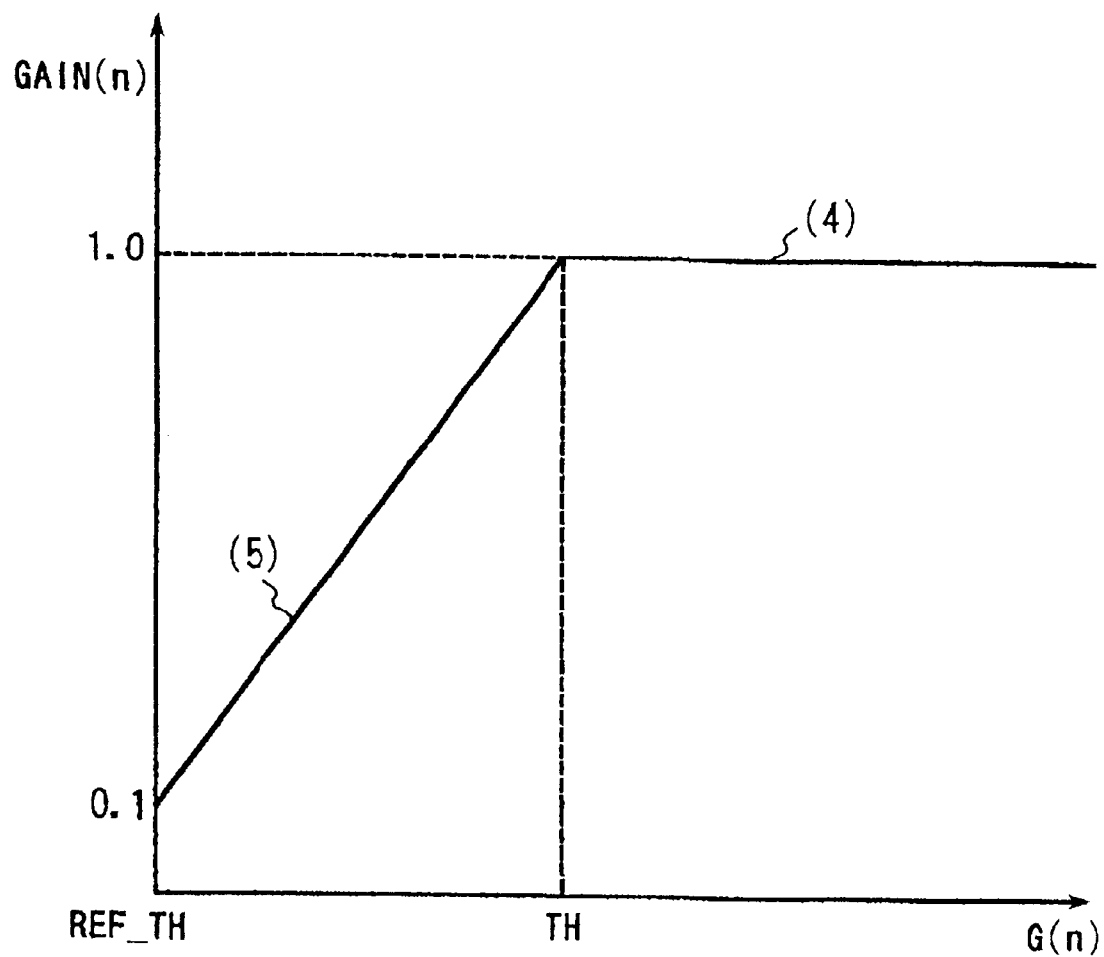
FIG. 7 shows the relationship between the value G(n) and the gain GAIN (n) in the second embodiment.

As shown in FIG. 7, the value GAIN (n) ranges from 0.1 to 1.0. The gain generator 13 outputs the value GAIN (n) to the multiplier 14. Upon receipt of the value GAIN (n), the multiplier 14 amplifies the audio signal according to the value GAIN (n), thereby providing the speaker 5 with the amplified audio signal.

As described above, according to the second embodiment, even though the value G(n) crosses the threshold TH, in other words, the reception level of the radio wave crosses the threshold TH_RX, the audio signal merely experiences amplification or attenuation of its level without being switched on/off. Accordingly, the user of the radio receiver can avoid hearing the noise that switching of the audio signal brings out.

Figure 8:
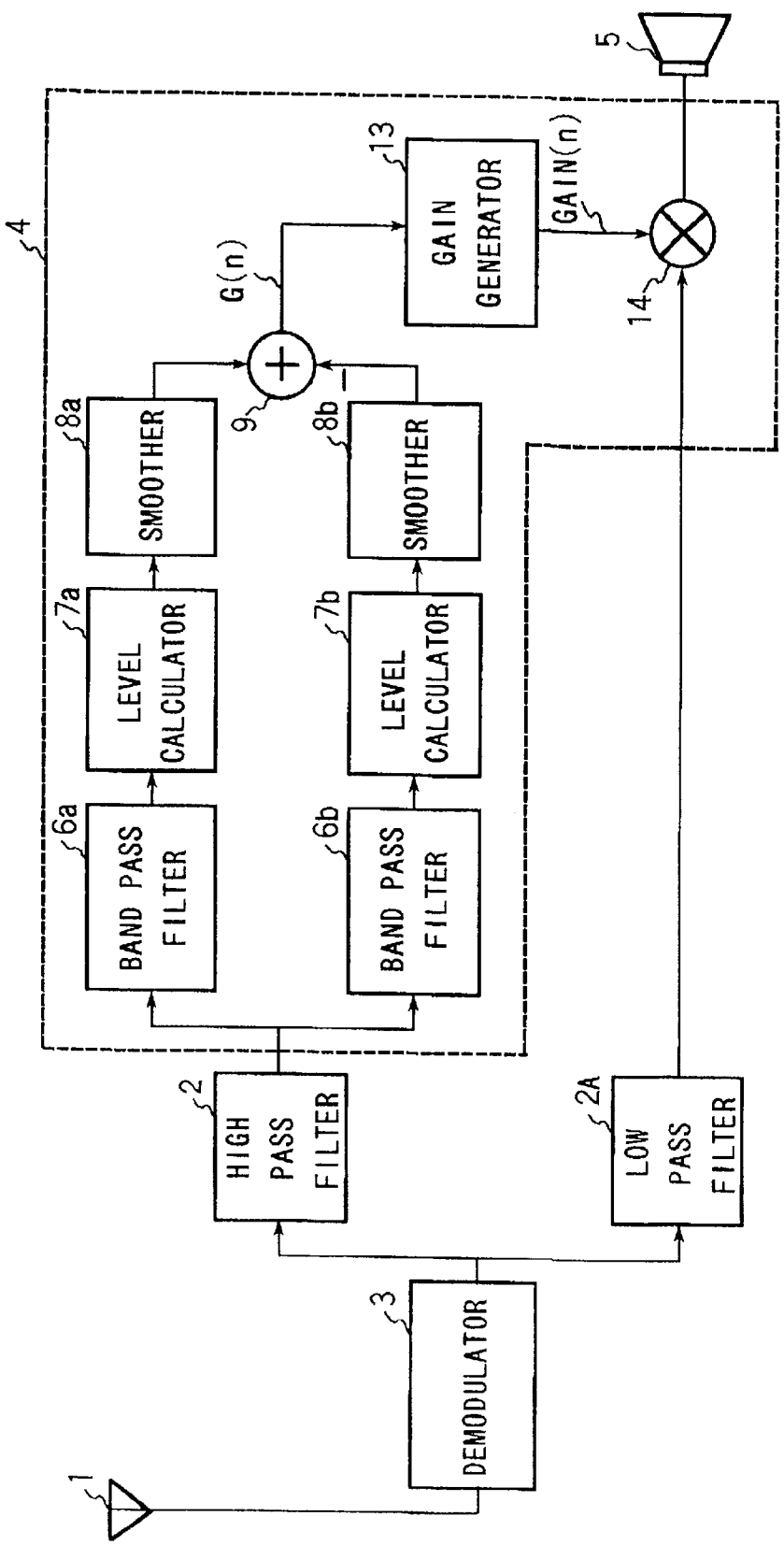
FIG. 8 shows the configuration of an improvement of the second embodiment.

As shown in FIG. 8, the second embodiment need not incorporate the level comparator 10. In this case, the gain generator 13 generates the value GAIN (n) based solely upon the value G(n), regardless of whether the value G(n) is larger than the predetermined threshold TH, which results in the same effect as above.

Third Embodiment

Next, the third embodiment of the radio receiver according to the present invention will be described in detail. The configuration and operation of the third embodiment is roughly the same as that of the second embodiment. In addition to the features of the second embodiment, the third embodiment smoothes the value GAIN (n) to avoid sharp changes in amplification or attenuation of the audio signal. This feature of the third embodiment will be principally discussed below.

Figure 9:
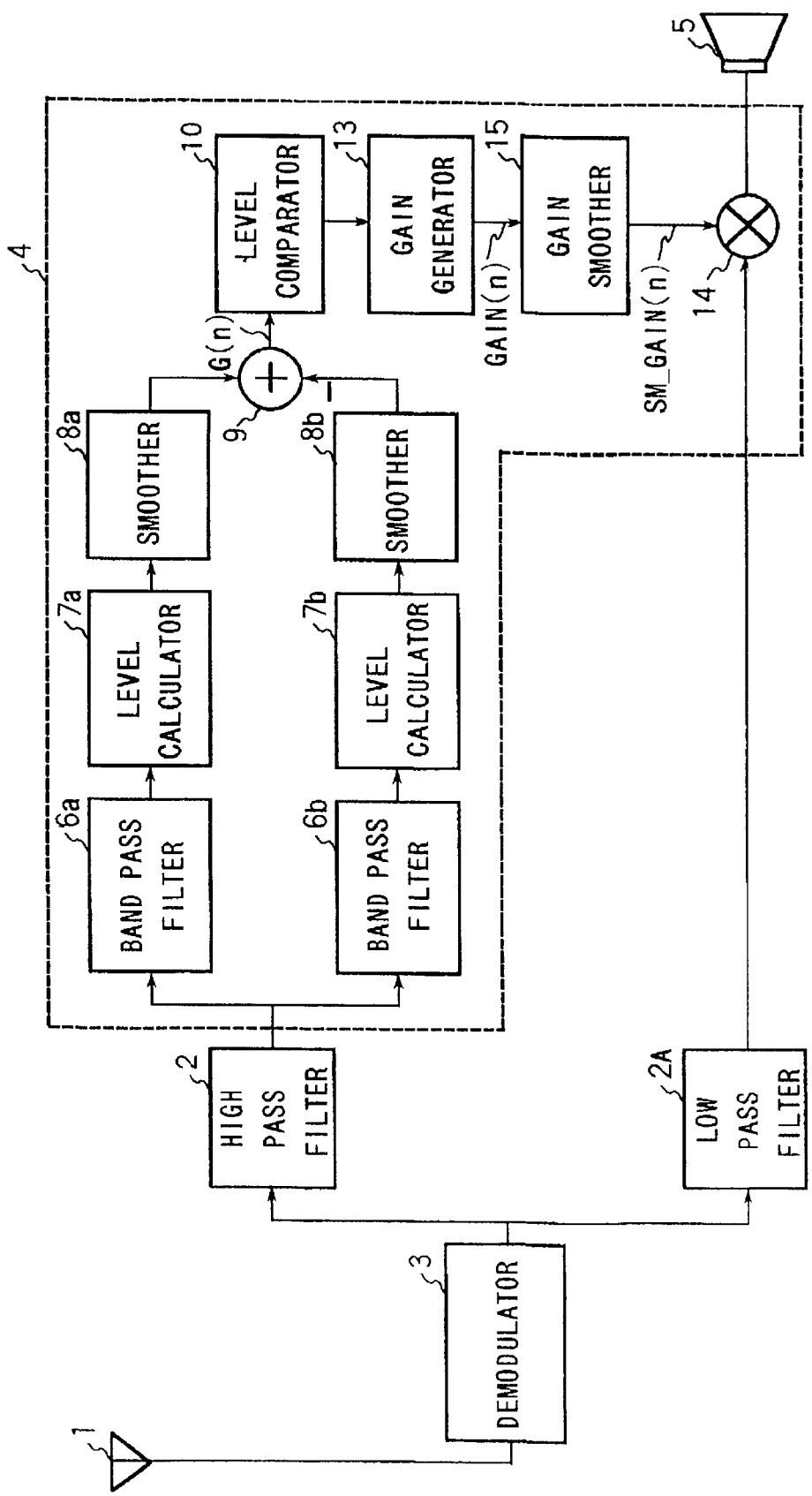
FIG. 9 shows the configuration of the third embodiment.

FIG. 9 shows the configuration of the third embodiment. In the figure, the control unit 4 further incorporates a gain smoother 15, which follows the gain generator 13. The gain generator 13 feeds the value GAIN (n) into the gain smoother 15. Upon receipt of the value GAIN (n), the gain smoother 15 smoothes it as follows:

$$\text{SM\_GAIN}(n) = \delta * \text{GAIN}(n) + (1-\delta) * \text{SM\_GAIN}(n-1) \quad (6)$$

where $\delta 1$ denotes the weight coefficient. In this embodiment, $\delta 1$ is set to be $1/128$.

Figure 10:
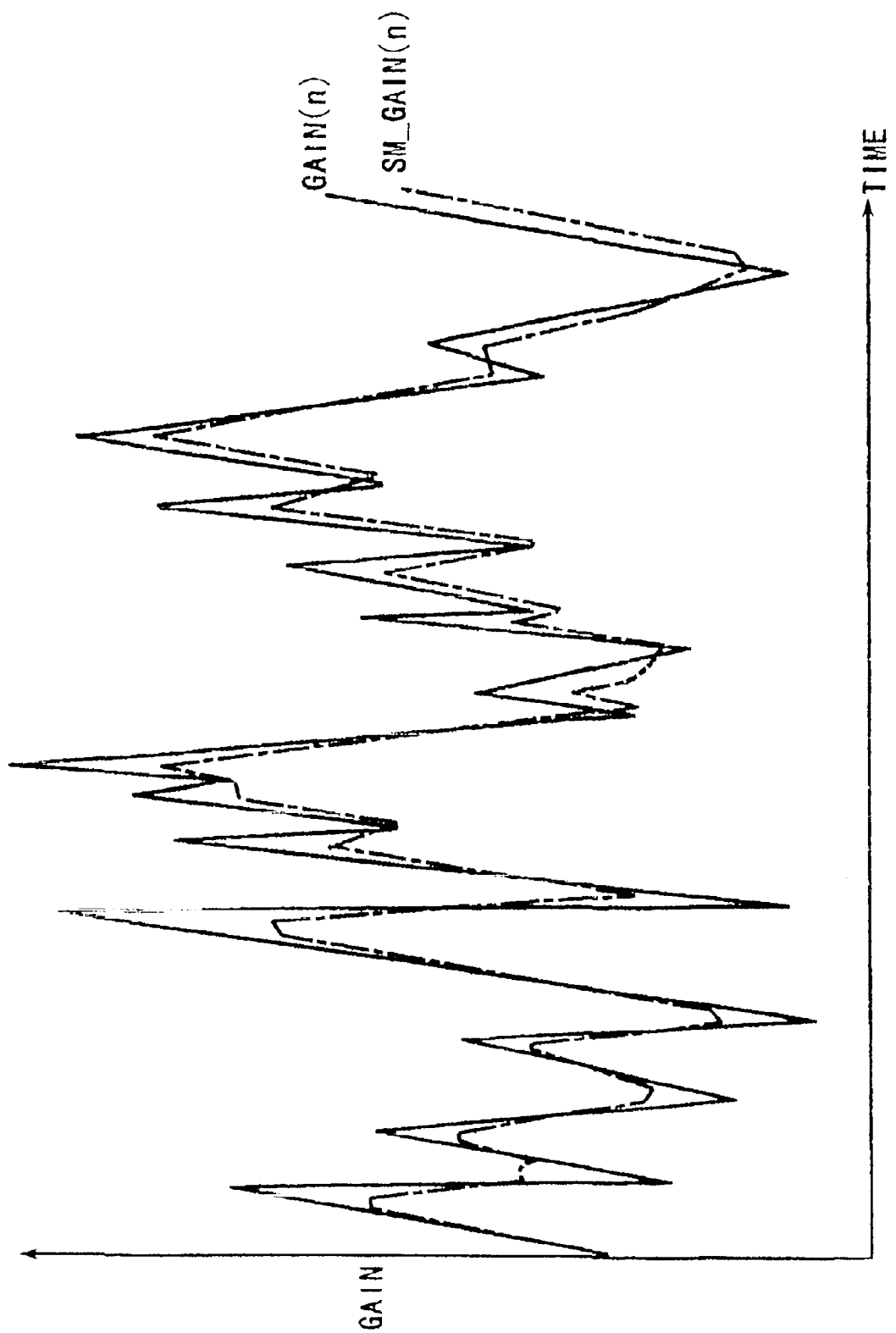
FIG. 10 shows the operation of the third embodiment.

Use of this smoothing operation suppresses the change in the value GAIN (n) to produce the value SM_GAIN (n), the change of which is smaller than the change in the value GAIN (n), as shown in FIG. 10. According to the value SM_GAIN (n), the multiplier 14 amplifies the audio signal.

As described above, according to the third embodiment, the smoothed value SM_GAIN (n) is generated using the value GAIN (n), which is employed for amplifying or attenuating the audio signal. Accordingly, in comparison with the second embodiment, the change in the amplified or attenuated audio signal is smaller, which allows the user of the radio receiver to hear more easily.

Fourth Embodiment

Next, the fourth embodiment of the radio receiver according to the present invention will be described in detail. The configuration and operation of the fourth embodiment is nearly the same as that of the second embodiment. Therefore, the difference therebetween will be principally discussed below.

Figure 11:
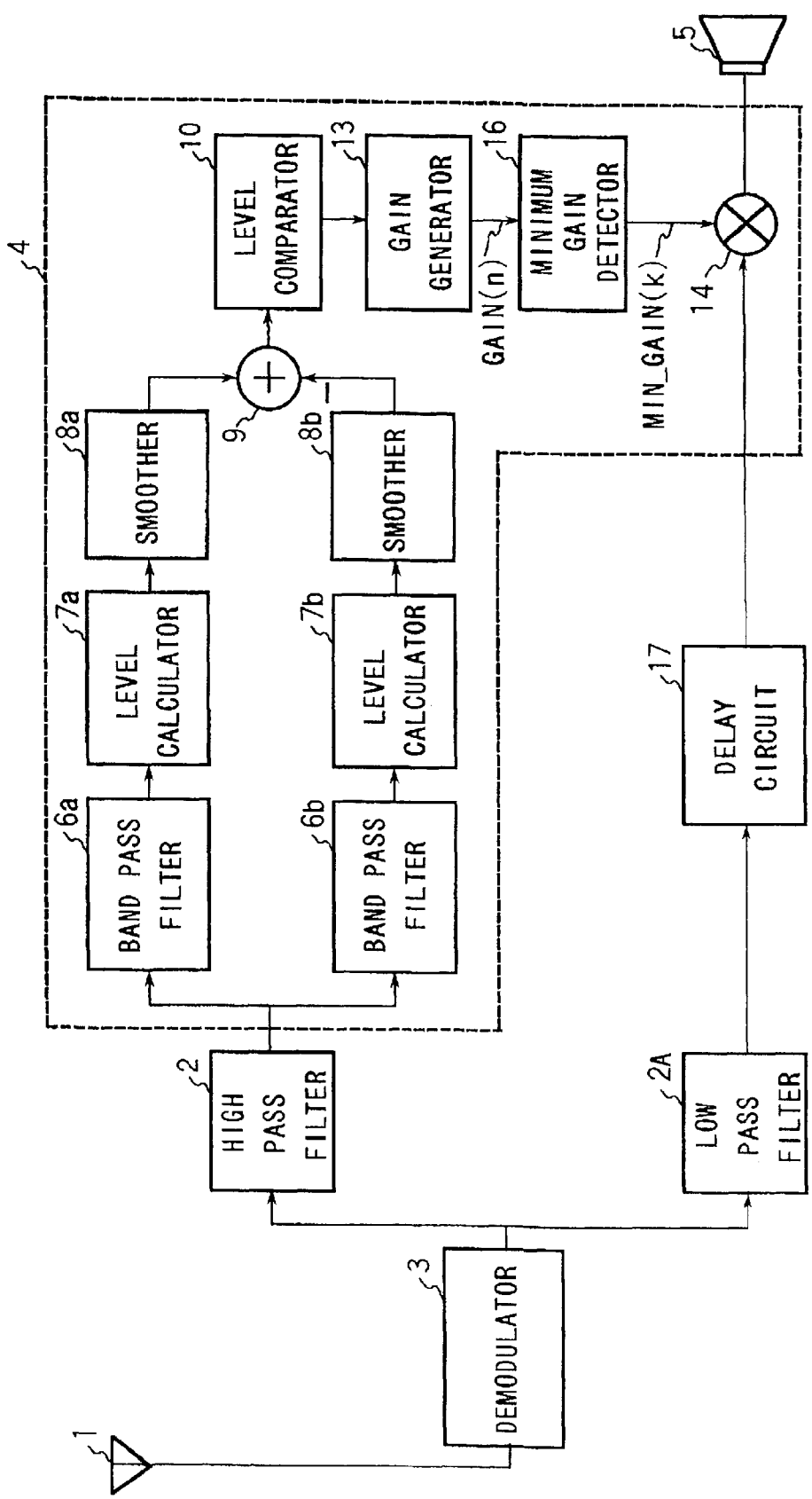
FIG. 11 shows the configuration of the fourth embodiment.
Figure 12:
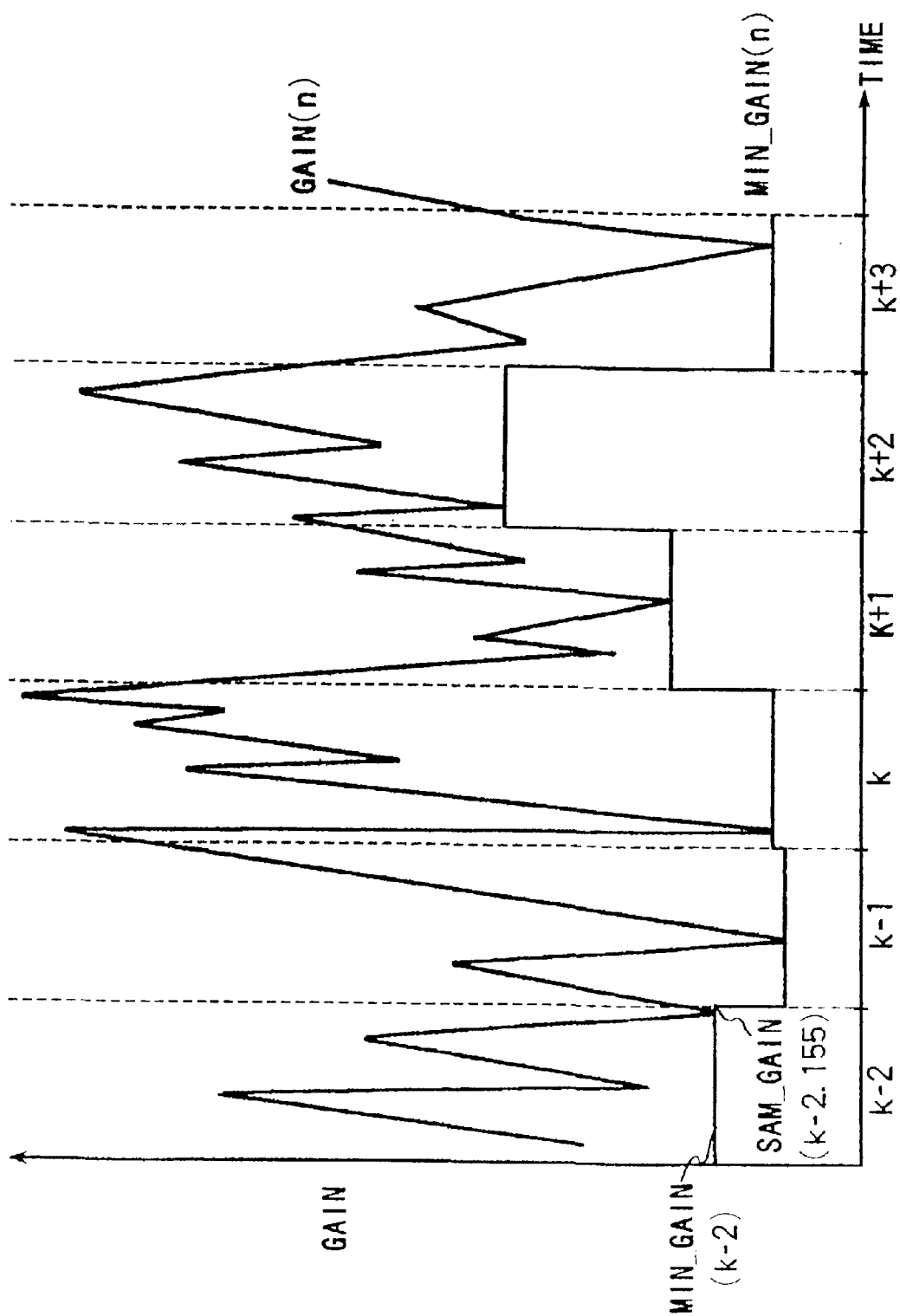
FIG. 12 shows the operation of the fourth embodiment.

FIG. 11 shows the configuration of the fourth embodiment and FIG. 12 shows the operation thereof. In contrast to the second embodiment, the fourth embodiment incorporates a minimum gain detector 16 and a delay circuit 17. As shown in FIG. 12, the minimum gain detector 16 detects the minimum gain MIN_GAIN (n) for each of a plurality of periods of time, for example, period(k−2), period(k−1), and period(k), wherein the lengths of all the time periods are the same. Further, in each period, a plurality of samplings, e.g. 160 samplings, are carried out by the minimum gain detector 16, wherein each sampling indicates a point on the curve of the value GAIN (n). The minimum gain detector 16 detects the minimum gain among the plurality of gains sampled in each of the plurality of time periods. Hereinafter, sampled gains in each period are referred to as "SAM_GAIN (s, t)," where s denotes the number of the period and the t denotes the order of sampling. For example, for the period (k−2), there is a plurality of sampled gains SAM_GAIN (k−2, 1), (k−2, 2), . . . , and (k−2, 160). Further, for the period (k−2), supposing that the sampled gain SAM_GAIN (k−2, 155) is the minimum, the minimum gain detector 16 selects the sampled gain SAM_GAIN (k−2, 155) as the minimum gain MIN_GAIN (k−2), which makes the sampled gain SAM_GAIN (k−2, 155) represent the period (k−2). Thus, the sampled gain SAM_GAIN (k−2, 155) is fed into the multiplier 14 as the minimum gain MIN_GAIN (k−2).

During this operation by the minimum gain detector 16, he audio signal corresponding to the period (k−2) experiences a delay identical to the length of the period (k−2), in the delay circuit 17. As a result, the multiplier 14 amplifies the audio signal corresponding to the period (k−2), according to the minimum gain MIN_GAIN (k−2, 155), that is to say, the sampled gain SAM_GAIN (k−2).

As described above, according to the fourth embodiment, the minimum gain detector 16 selects the minimum gain among a plurality of sampled gains for a period, whereby the selected gain is made the representative gain of the period to be used for amplifying the audio signal corresponding to the period. Since the minimum gain MIN_GAIN (n) is the minimum in the period, the audio signal is amplified by the minimum amount, which prevents the user of the radio receiver is from hearing much noise. Moreover, the minimum gain MIN_GAIN (n) remains constant for each period, which reduces the change in the minimum gain MIN_GAIN (n), as shown in FIG. 12.

Fifth Embodiment

Next, the fifth embodiment of the radio receiver according to the present invention will be described in detail. Compared with the second embodiment, the fifth embodiment is primarily distinguished in that it further incorporates a delay circuit 17 and an interpolator 18. Since the circuits other than these two additional circuits are the same as those in the second embodiment, and the delay circuit 17 is the same as that in the fourth embodiment, the operation of the interpolator 18 will be principally discussed below.

Figure 13:
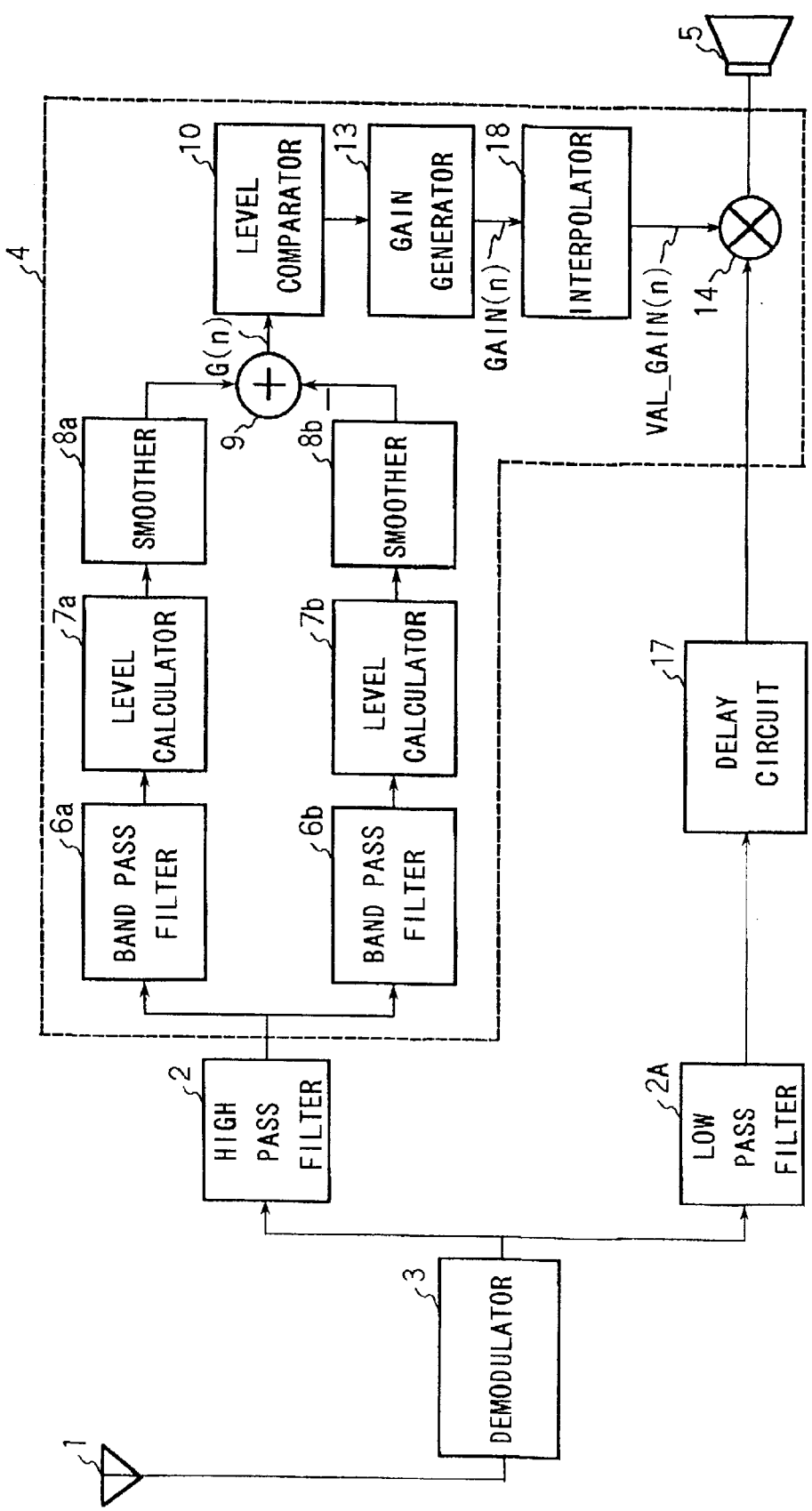
FIG. 13 shows the configuration of the fifth embodiment.
Figure 14:
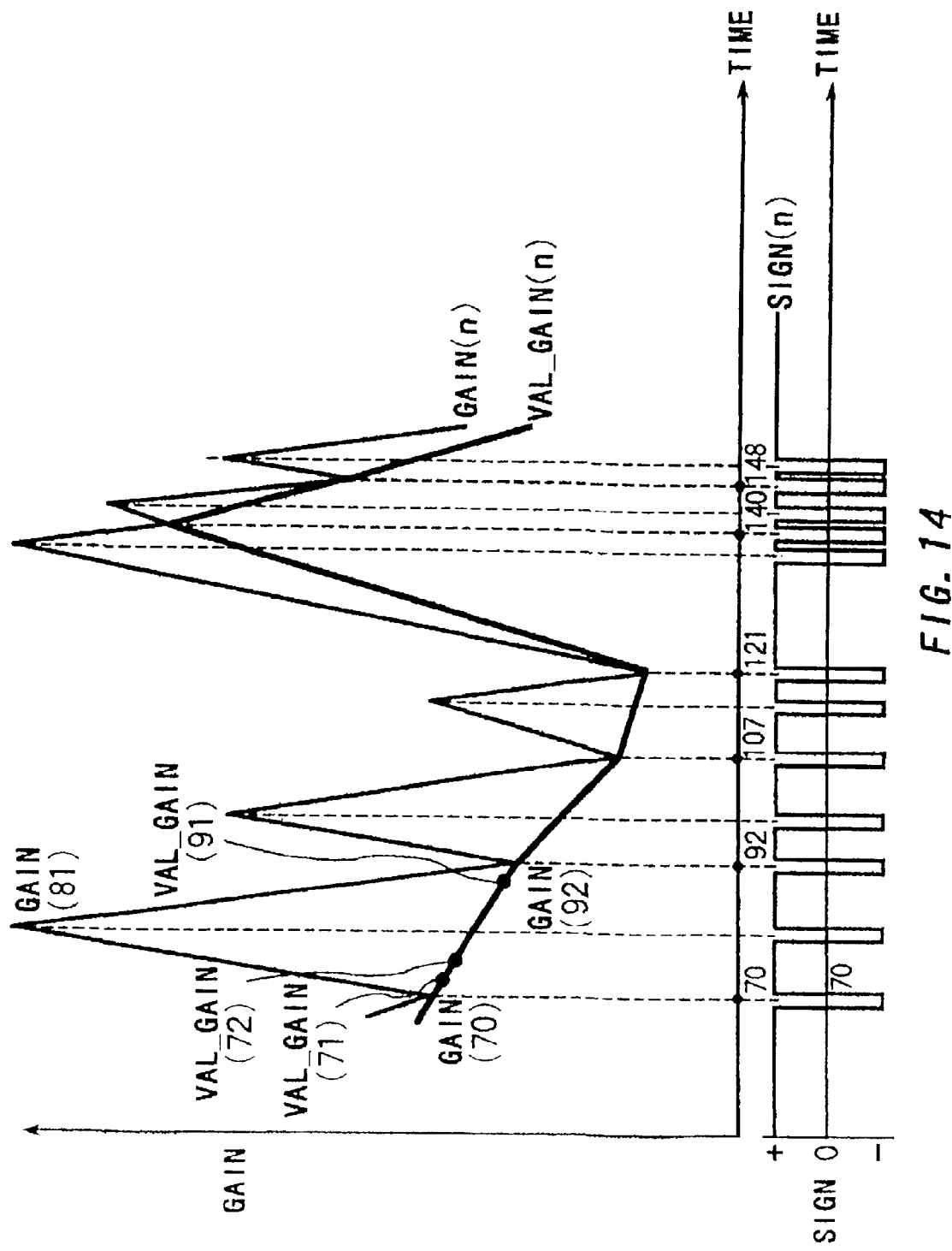
FIG. 14 shows the operation of the fifth embodiment.

FIG. 13 shows the configuration of the fifth embodiment and FIG. 14 shows the operation thereof. In FIG. 13, the interpolator 18 is placed between the gain generator 13 and he multiplier 14 while the delay circuit 17 is placed between the low pass filter 2A and the multiplier 14. Upon receipt of the gain GAIN (n) from the gain generator 13, the interpolator 18 detects valleys or concave portions with respect to the curve of the gain GAIN (n) in FIG. 14. Specifically, first, the interpolator 18 obtains the sign SIGN (n) of the curve by performing the following calculation:

$$\text{SIGN (n)}=(\text{GAIN (n)}-\text{GAIN (n}-1))*(\text{GAIN (n}+1)\ \text{GAIN(n)}) \quad (7)$$

where SIGN (0)=0.

Next, if SIGN (n)<0 and (GAIN (n)−GAIN (n−1))<0, the interpolator 18 concludes that the sign SIGN (n) shows a valley of the curve. Otherwise, it concludes that the sign SIGN(n) does not show a valley.

For example, since the sign SIGN (70) is negative, the interpolator 18 concludes that the gain GAIN (70) is a valley on the GAIN (n) curve. Similarly, the interpolator 18 concludes that the gains GAIN (92), GAIN (107), GAIN (121), GAIN (140), and GAIN (148) are also valleys on the GAIN (n) curve. On the contrary, the interpolator 18 concludes that the gain GAIN (81) is a peak on the GAIN (n) curve, for example. Next, using the gains GAIN (70) and GAIN (92), the interpolator 18 linearly interpolates therebetween to prepare a gain VAL_GAIN (n) as following:

$$\text{VAL\_GAIN(n)}=((\text{GAIN(92)}-\text{GAIN(70)}/(92-70))*(n-70)+\text{GAIN(70)} \quad (8)$$

where 70<n<92.

Thus, as shown in FIG. 14, the gain VAL_GAIN (n) curve, specifically, the points VAL_GAIN (71), VAL_GAIN (72), . . . , and VAL_GAIN (91), are obtained between the gain GAIN (70) and the gain GAIN (92). The interpolator 18 sequentially gives both the gain GAIN (70) and the gain GAIN (92), and all the gains VAL_GAIN (71)–VAL_GAIN (91) to the multiplier 14.

During this operation, the delay circuit 17 delays the audio signal by the time between the gain GAIN (70) and the gain GAIN (92) to permit the audio signal to be amplified using the corresponding gain GAIN (n) or the corresponding gain VAL_GAIN (n) by the multiplier 14. Specifically, since the sampling is carried out 160 times per second, the time between the gain GAIN(70) and the gain GAIN(92) is approximately 0.14 second (=$\frac{1}{160}$*22). For example, the audio signal (70) is delayed so as to be amplified according to the gain GAIN (70), the audio signal (72) is delayed so as to be amplified according to the gain VAL_GAIN (72). Similarly, the audio signal (91) is amplified according to the gain VAL_GAIN (91) and the audio signal (92) is amplified according to the gain GAIN (92).

As described above, according to the fifth embodiment, the interpolator 18 linearly interpolates between a valley of the GAIN (n) curve and another valley thereof using those two valleys, and the audio signal(n) is amplified based upon the interpolated gain VAL_GAIN (n). Therefore, since the change in the gain VAL_GAIN (n) is smaller than the change in the gain GAIN (n), the change in the level of the amplified audio signal is reduced.

Sixth Embodiment

Next, the sixth embodiment of the radio receiver according to the present invention will be explained in detail. In comparison with the second embodiment, the sixth embodiment is distinguished in that it further incorporates a gain selector 19 and a gain updater 20. The operation of the other circuits is the same as that in the second embodiment; thus the operation of these two additional circuits will be principally explained below.

Figure 15:
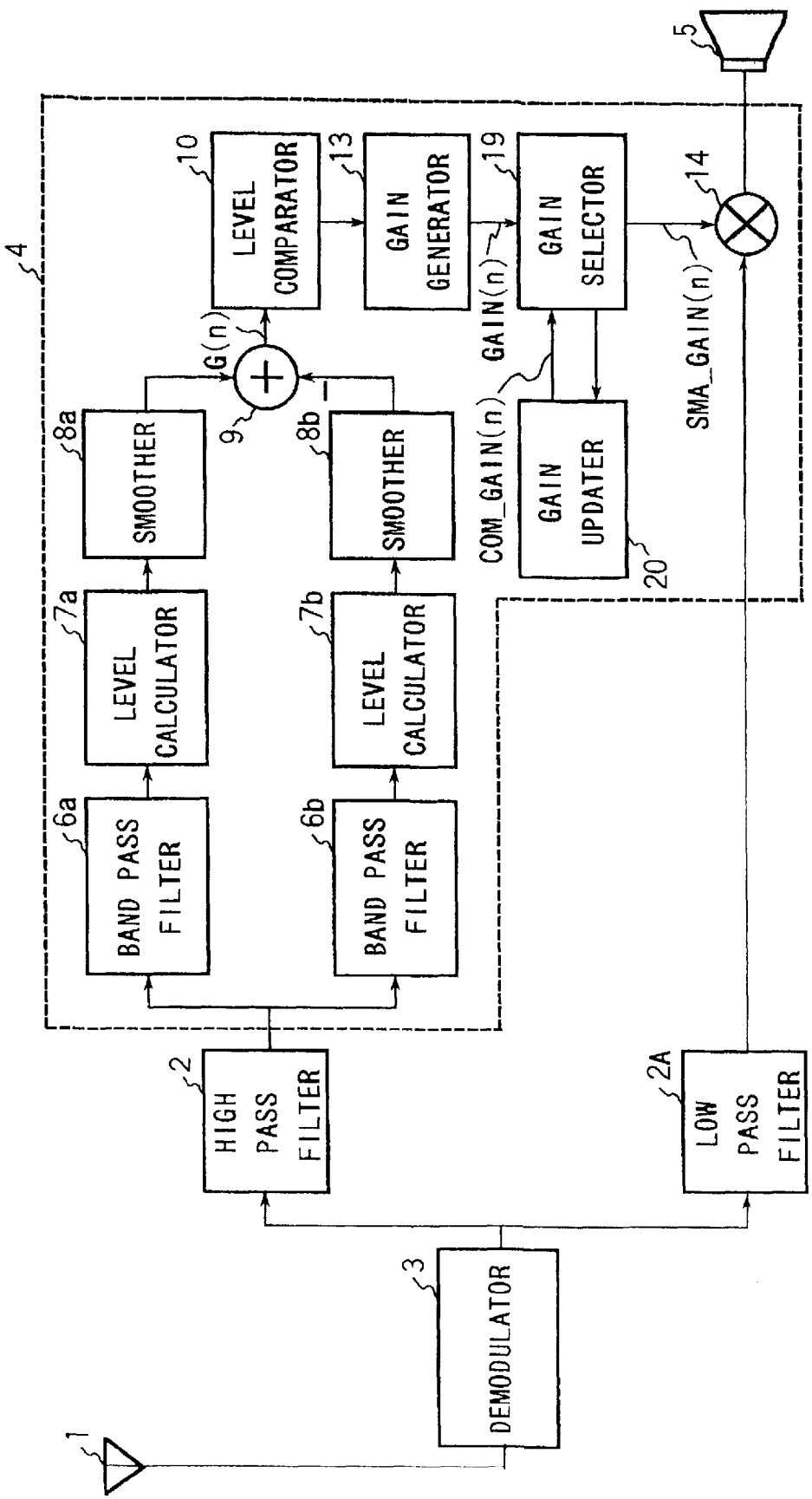
FIG. 15 shows the configuration of the sixth embodiment.

With reference to FIG. 15, upon receipt of the gain GAIN (n) from the gain generator 13, the gain selector 19 compares the gain GAIN (n) with the compulsorily-increased gain COM_GAIN (n) stored in the gain updater 20, providing the smaller one of the gain GAIN (n) and the compulsorily-increased gain COM_GAIN (n) to the multiplier 14 as the small gain SMA_GAIN (n). More specifically, upon concluding that the gain GAIN (n) is larger than the compulsorily-increased gain COM_GAIN (n), the gain selector 19 forces the gain updater 20 to obtain the next compulsorily-increased gain COM_GAIN (n +1) according to the following equation:

$$\text{COM\_GAIN(n+1)}=\text{COM\_GAIN (n)}*(1+\delta 3) \quad (9)$$

where the coefficient δ3 is 0.001125, for example. If the gain GAIN (n) is smaller than the compulsorily-increased gain COM_GAIN (n), the gain selector 19 forces the gain updater 20 to obtain the next compulsorily-increased gain COM_GAIN (n+1) according to the following equation:

$$\text{COM\_GAIN(n+1)}=\text{GAIN(n)} \quad (10)$$

Thus, as long as the gain GAIN (n) is larger than the compulsorily-increased gain COM_GAIN (n), the compulsorily-increased gain COM_GAIN (n) is used for amplification of the audio signal as the small gain SMA_GAIN (n) and the next compulsorily-increased gain COM_GAIN (n+1) is prepared using the compulsorily-increased gain COM_GAIN (n). On the contrary, the gain GAIN (n) is used for amplification of the audio signal as the small gain SMA_GAIN (n) once the gain GAIN (n) falls below the compulsorily-increased gain COM_GAIN (n). Upon receiving the small gain SMA_GAIN (n) from the gain selector 19, the multiplier 14 amplifies the audio signal based thereupon.

Figure 16:
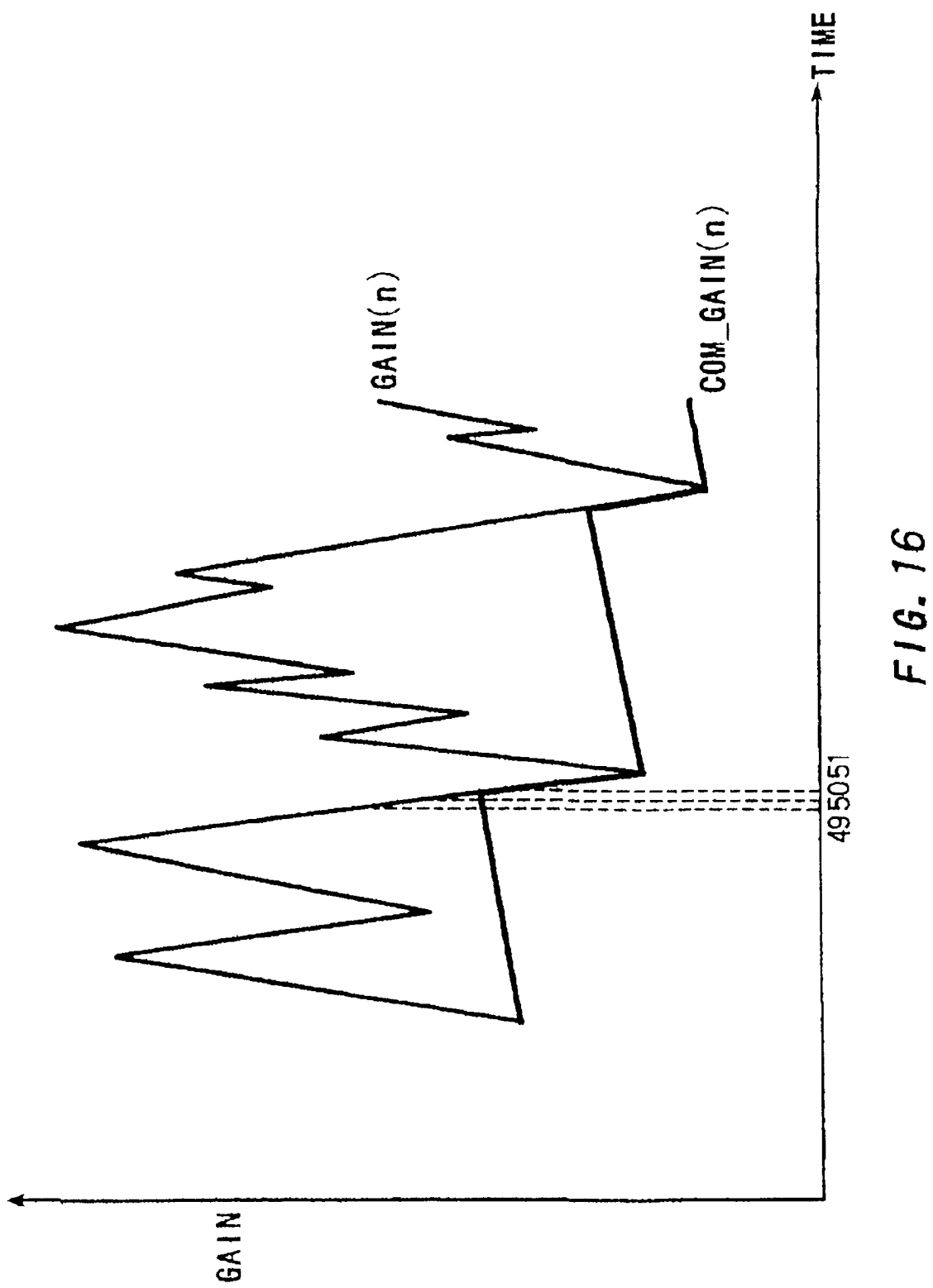
FIG. 16 shows the operation of the sixth embodiment.

For example, as shown in FIG. 16, since the gain GAIN (49) is larger than the compulsorily-increased gain COM_GAIN (49), the gain selector 19 selects the compulsorily-increased gain COM_GAIN (49) as the small gain SMA_GAIN (49), whereupon the multiplier 14 amplifies the audio signal based upon the COM_GAIN (49). Simultaneously, the gain updater 20 prepares the next compulsorily-increased gain COM_GAIN (50) using the compulsorily-increased gain COM_GAIN (49). Since the gain GAIN (50) is larger than the compulsorily-increased gain COM_GAIN (50), the gain selector 19 selects the COM-GAIN (50) as the small gain SMA_GAIN (50), whereupon the multiplier 14 amplifies the audio signal based upon the compulsorily-increased gain COM_GAIN (50). However, since the gain GAIN (51) is smaller than the compulsorily-increased gain COM_GAIN (51), the gain selector 19 selects the gain GAIN (51) as the small gain SMA_GAIN (51), whereupon the multiplier 14 amplifies the audio signal according to the gain GAIN (51).

As described above, according to the sixth embodiment, basically, the gain updater 20 gradually increases the compulsorily-increased gain COM_GAIN (n) except that the gain updater 20 sharply decreases the compulsorily-increased gain COM_GAIN (n) once the gain GAIN (n) falls below the compulsorily-increased gain COM GAIN (n). Hence, the change in the small gain SMA_GAIN (n)

fed into the multiplier 14 becomes smaller and, further, the small gain SMA_GAIN (n) itself becomes smaller. Consequently, the audio signal amplified using such a small gain SMA_GAIN (n) becomes easier to hear.

Seventh Embodiment

Next, the seventh embodiment of the radio receiver according to the present invention will be explained in detail. The seventh embodiment is an improvement of the sixth embodiment. The difference between these two embodiments is that the seventh embodiment further incorporates a hangover circuit 21. In the seventh embodiment, a hangover is defined as a delay or the like in the calculation of the compulsorily-increased gain COM_GAIN (n) by the gain updater 20 or in the application of the small gain SMA_GAIN (n) to the multiplier 14 by the gain selector 19. The configuration and operation of the hangover circuit 21 will be principally discussed below.

Figure 17:
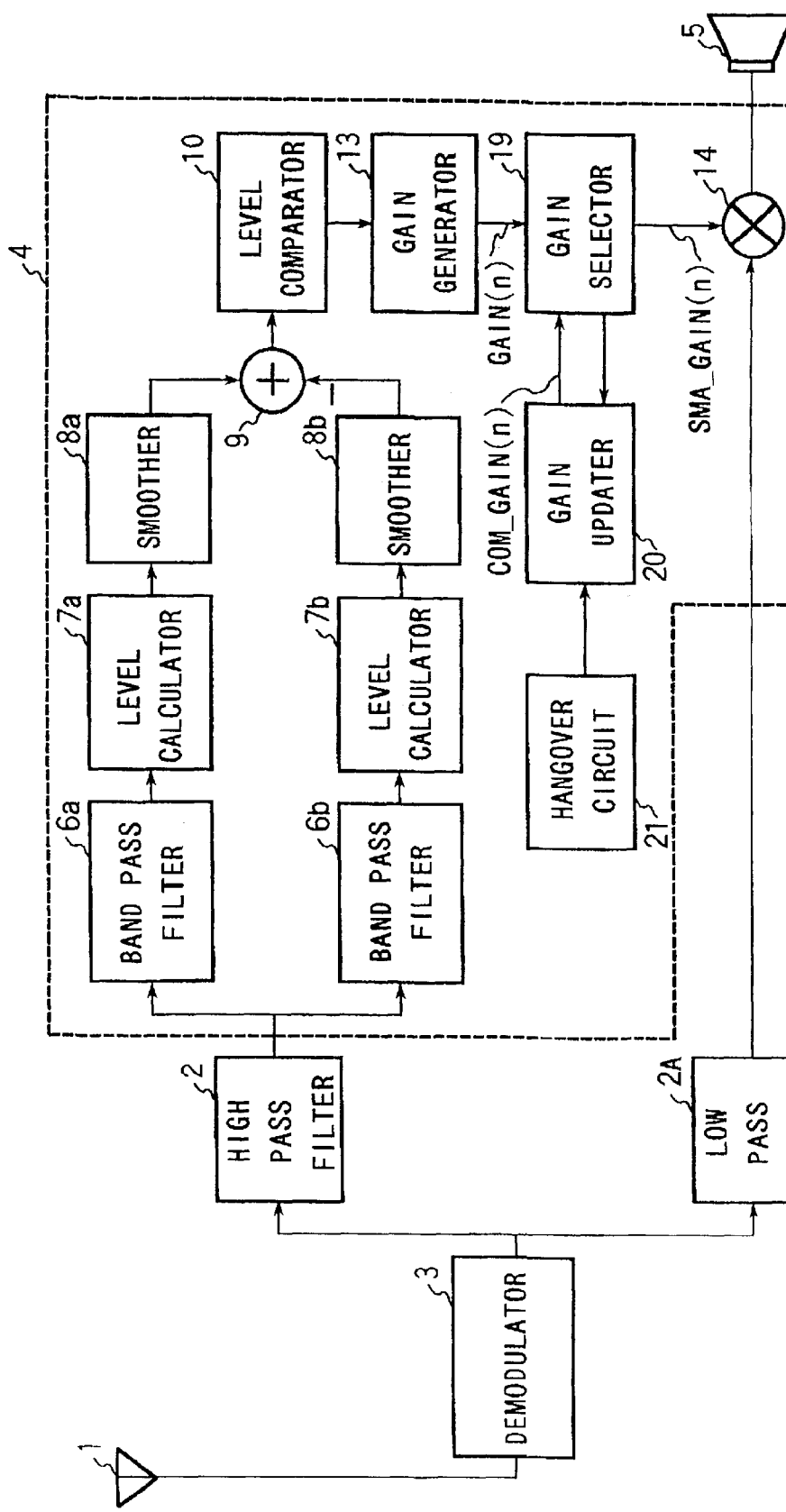
FIG. 17 shows the configuration of the seventh embodiment.
Figure 18:
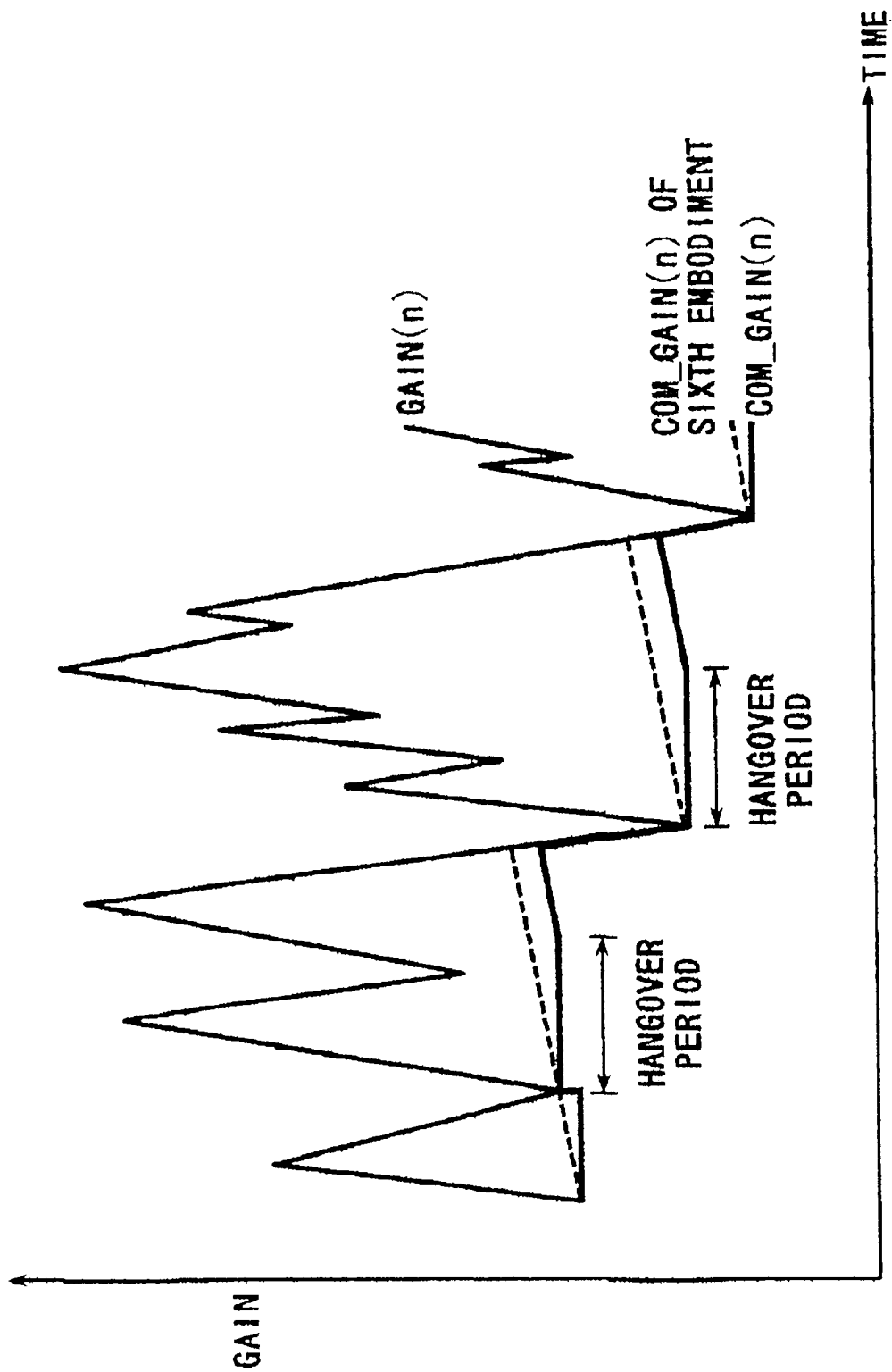
FIG. 18 shows the operation of the seventh embodiment.

FIG. 17 shows the configuration of the seventh embodiment and FIG. 18 shows the operation thereof. As shown in FIG. 17, the hangover circuit 21 works in cooperation with the gain updater 20. The hangover circuit 21 has stored a fixed hangover period as shown in FIG. 18. The hangover circuit 21 halts the updating operation executed by the gain updater 20 during the hangover period. As a result, whereas in the sixth embodiment the compulsorily-increased gain COM_GAIN (n) is always or continuously increased, in the seventh embodiment the increase of the compulsorily-increased gain COM_GAIN (n) is halted during the hangover period. Thus, as shown in FIG. 18, a curve of the compulsorily-increased gain COM_GAIN (n) of the seventh embodiment is obtained as indicated by the solid line, wherein the change is smaller than that of the compulsorily-increased gain COM_GAIN (n) of the sixth embodiment indicated by the dotted line.

As described above, according to the seventh embodiment, the hangover circuit 21 forces the gain updater not to update the compulsorily-increased gain COM_GAIN (n) during the hangover period; as a result, the change in the compulsorily-increased gain COM_GAIN (n) is smaller than the sixth embodiment.

In lieu of halting the updating, the hangover circuit 21 may halt the application of the compulsorily-increased gain COM_GAIN (n) to the multiplier 14, which can produce the same effect as above.

Eighth Embodiment

Next, the eighth embodiment of the radio receiver according to the present invention will be explained in detail. The configuration of the eighth embodiment is almost the same as that of the fourth embodiment. In addition to the circuits of the fourth embodiment, the eighth embodiment further comprises a gain selector 19 and a gain updater 20. The operation of these additional circuits will be principally discussed below.

Figure 19:
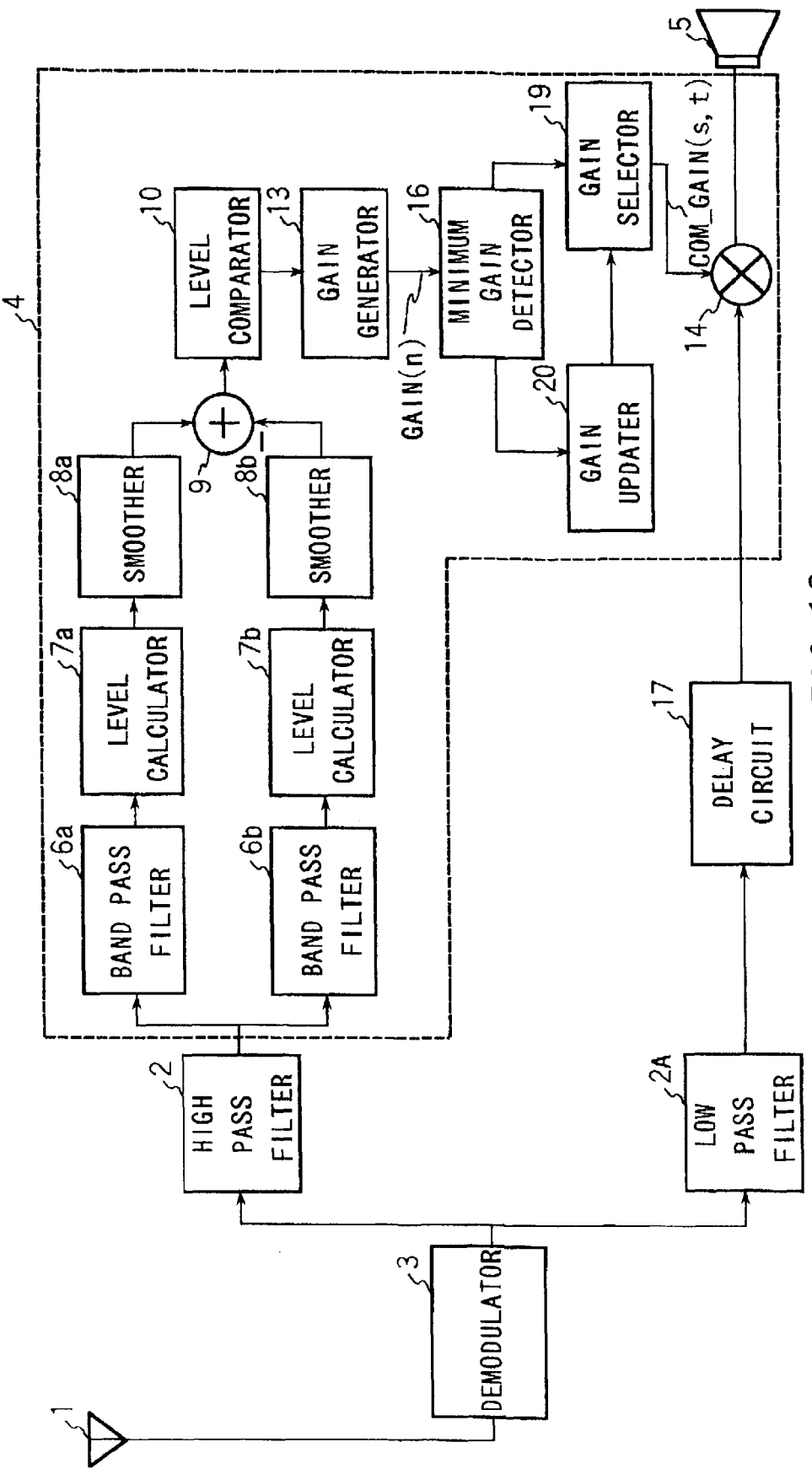
FIG. 19 shows the configuration of the eighth embodiment.
Figure 20:
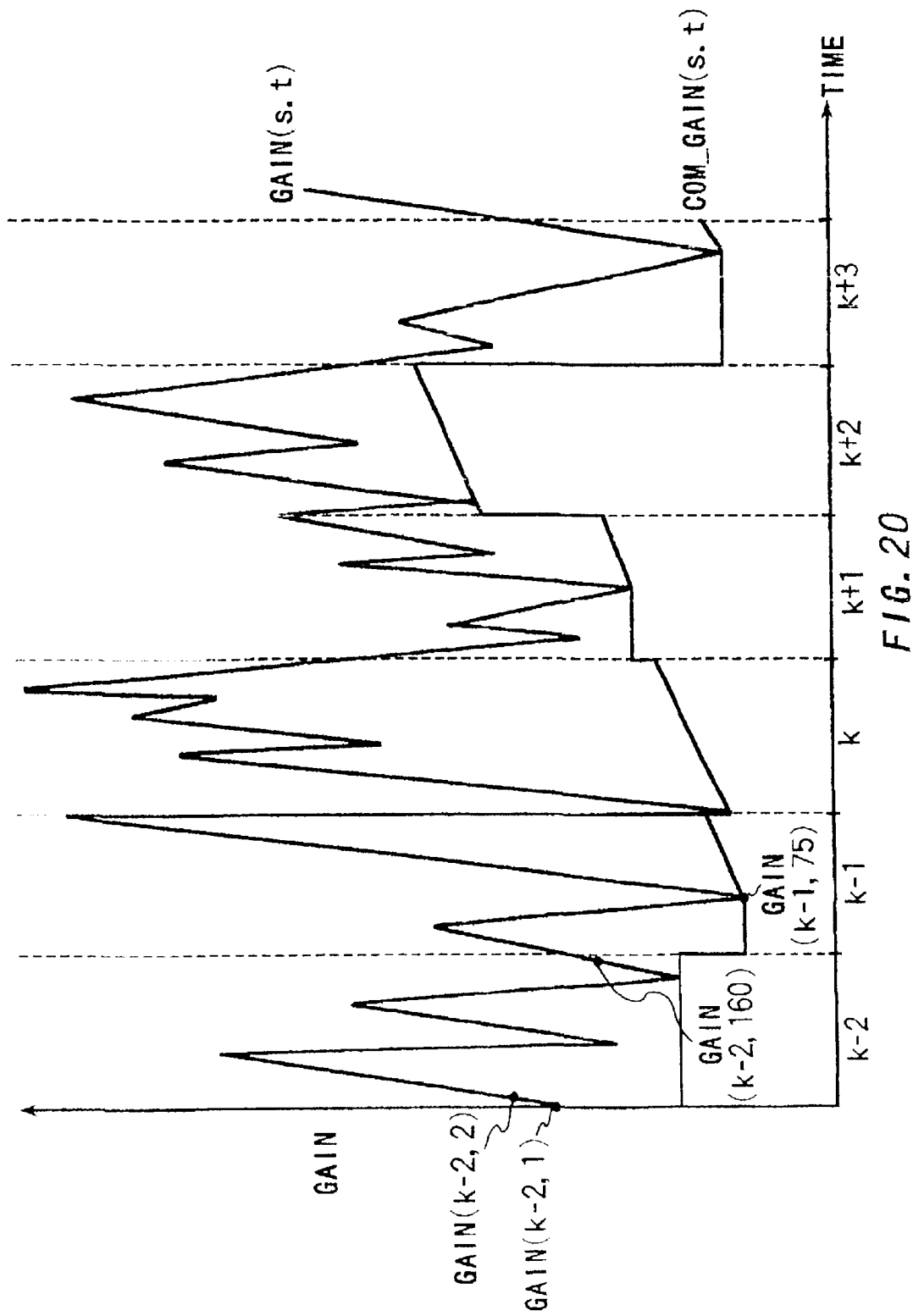
FIG. 20 shows the operation of the eighth embodiment.

FIG. 19 shows the configuration of the eighth embodiment and FIG. 20 shows the operation thereof. As shown in FIG. 19, both the gain selector and gain updater 20 are placed adjacent to the minimum gain detector 16, and the gain GAIN (n) is fed into the minimum gain detector 16 by the gain generator 13 as in the fourth embodiment.

In FIG. 20, as explained in the fourth embodiment, there are a plurality of time periods (k−2), (k−1), (k), (k+1), (k+2), (K+3), . . . . For each period there are 160 sampled gains GAIN (s, t) for the gain GAIN (n), where s denotes the number of the period and t denotes the order of the sampling in the period. For example, the period (k−2) has 160 sampled gains GAIN (k−2, 1)–GAIN (k−2, 160), while the period (k−1) has 160 sampled gains GAIN (k−1, 1)–GAIN (k−1, 160).

The minimum gain detector 16 detects the minimum gain for each period. For example, assuming that the gain GAIN (k−1, 75) is the minimum gain in the period (k−1), the minimum gain detector 16 detects the gain GAIN (k−1, 75) for the period(k−1), and provides to the gain selector 19 and the gain updater 20, the gain GAIN (k−1, 75) as the minimum gain MIN_GAIN (k−1, 1)–MIN_GAIN (k−1, 75) and the sampling time 75. Upon receipt of the minimum gain MIN_GAIN (s,t) and the sampling time, the gain updater 20 prepares a compulsorily-increased gain COM_GAIN (s,t) based upon the minimum gain MIN_GAIN (s,t) and the sampling time. For example, for the period(k−1), the gain updater 20 permits the gain GAIN (k−1, 75) to used for amplification of the audio signal during the first portion of the period (k−1) prior to the sampling time 75 but it prepares compulsorily-increased gains COM_GAIN (k−1, t) by the gradual increase thereof during the latter portion of the period (k−1) after sampling time 75, according to the following equations:

$$\text{COM\_GAIN}(k-1, t1) \text{GAIN}(k-1, 75) \qquad (11)$$

$$\text{COM\_GAIN}(k-1, t2) = \text{COM\_GAIN}(k-1, t2-1) * (1\delta3) \qquad (12)$$

where 1<=t1<75, 76<t2<=160, and δ3=0.001125, for example.

Upon being fed with the compulsorily-increased gain COM_GAIN (s, t), the gain selector 19 gives the compulsorily-increased gain COM_GAIN (s,t) to the multiplier 14.

On the other hand, the delay circuit 17 delays the audio signal by time of period corresponding to the period (k−1). Consequently, the multiplier 14 amplifies the audio signal corresponding to the period (k−1), on the basis of the gain COM_GAIN (k−1, t). More specifically, the audio signal (k−1, 1)–(k−2, 75) are amplified based upon the minimum GAIN (k−1), namely GAIN (k−1, 75) while the audio signal (k−2, 76)–(k−2, 160) are amplified based upon the compulsorily-increased gains COM_GAIN (k−2, 76)–(k−2, 160), respectively.

As described above, according to the eighth embodiment, the radio receiver utilizes, for amplifying the audio signal, the minimum gain and the compulsorily-increased gain for each period. Since this reduces the change in the gain used for amplification of the audio signal, the user of the radio receiver can be free from hearing rapid changes in the amplified audio signal.

Ninth Embodiment

Next, the ninth embodiment of the radio receiver according to the present invention will be described in detail. The ninth embodiment is an improvement of the fourth embodiment. The ninth embodiment differs from the fourth embodiment in that the ninth embodiment further comprises a period changer 22. The other circuits of the ninth embodiment are the same as in the fourth embodiment; therefore, the operation of the period changer 22 will be principally discussed below.

Figure 21:
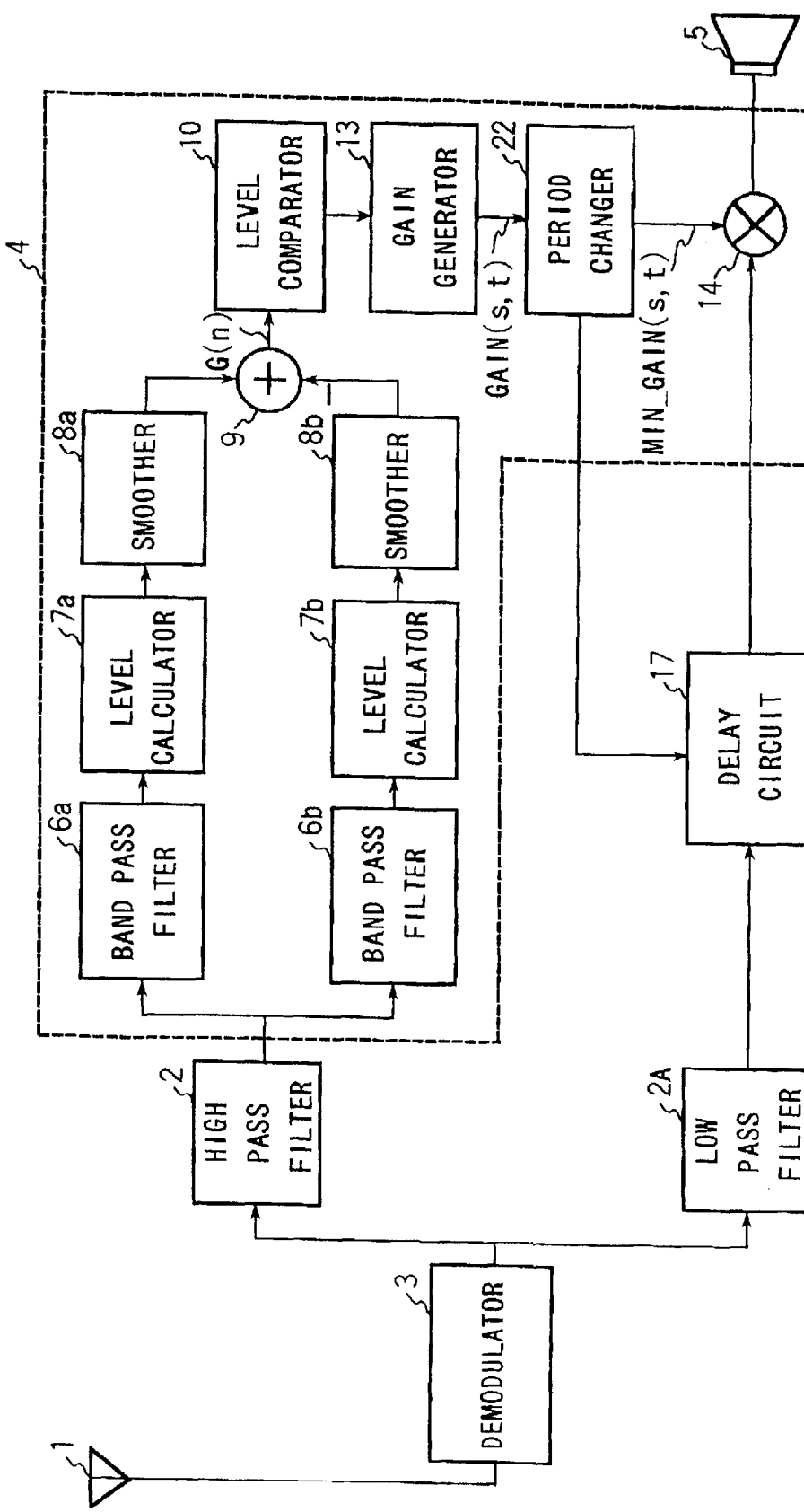
FIG. 21 shows configuration of the ninth embodiment.
Figure 22:
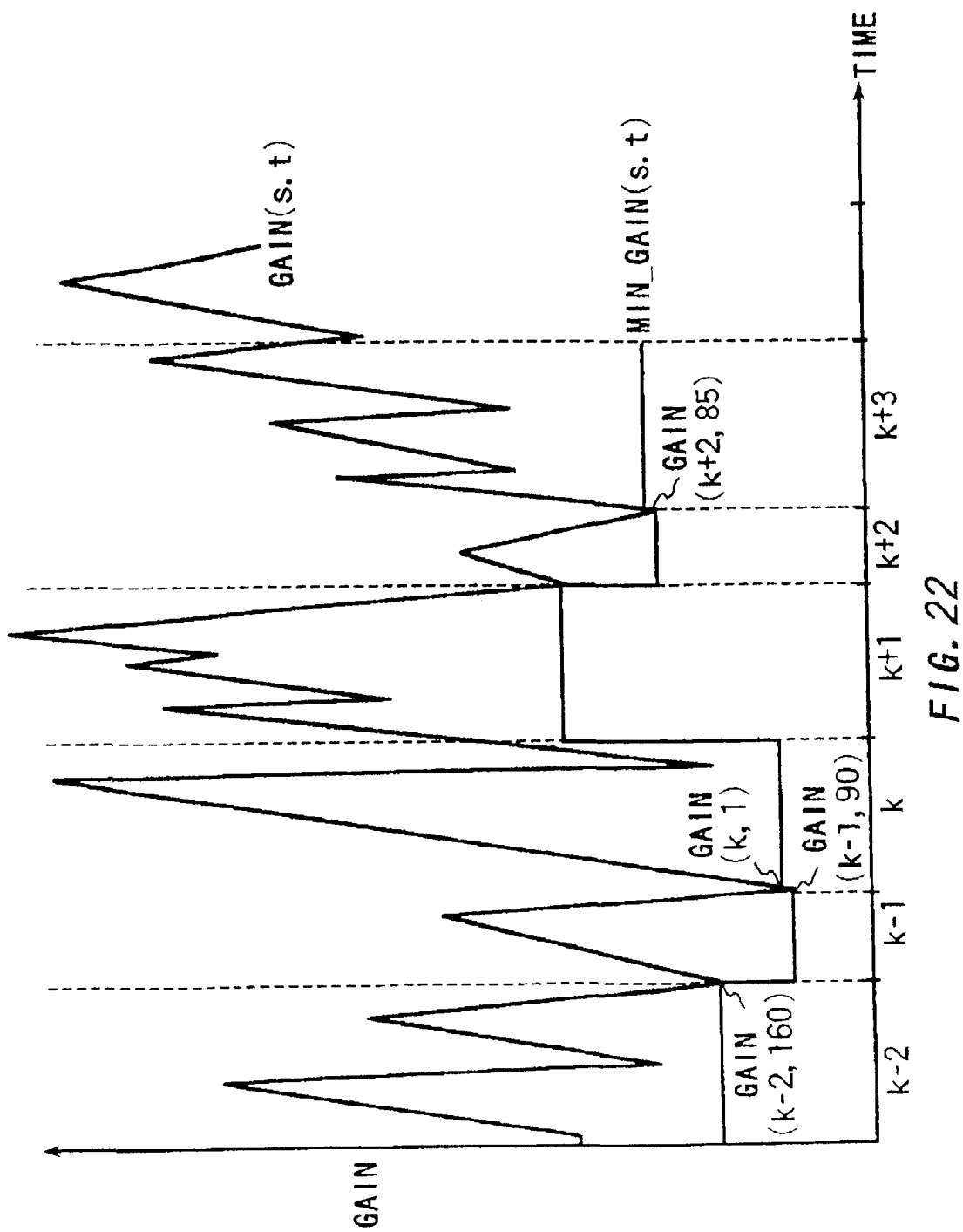
FIG. 22 shows the operation of the ninth embodiment.

FIG. 21 shows the configuration of the ninth embodiment and FIG. 22 shows the operation thereof. In FIG. 21, the period changer 22 is placed after the gain generator 13. Similar to the fourth embodiment, the original lengths of the multiple time periods (k−2), (k−1), . . . , and (k+3) are all the same. However, in this embodiment, the lengths of several periods are changed to be shorter depending upon the position of the minimum gain MIN_GAIN (n). As a result, any period following a period whose length has become shorter commences at a time earlier than its original starting time.

In FIG. 22, for example, assuming that each period includes 160 sampled gains, the gain GAIN (k−2, 160) is the minimum gain for the period (k−2), and the gain GAIN (k−1, 90) is smaller than the gain GAIN (k−2, 160).

Similar to the fourth embodiment, the period changer 22 detects the minimum gain MIN_GAIN (s, t) for each period. Specifically, for the period (k−2), the period changer 22 detects the gain GAIN (k−2, 160) as the minimum gain (k−2, t). Therefore, during the period (k−2), the gain GAIN (k−2, 160) is applied to the multiplier 14, whereby the audio signal corresponding to the period (k−2) is amplified using the gain GAIN (k−2, 160).

In contrast, for the period (k−1), the period changer 22 determines that the gain GAIN (k−1, 90) is smaller than the gain GAIN (k−2, 160) and that the gain GAIN (k−1, 90) is the minimum during the original length of the period (k−1). Hence, the period changer 22 shortens the period (k−1), whereby the gain GAIN (k−1, 90) is used for amplifying the audio signal corresponding to the shortened period (k−1), and the next period (k) immediately commences. For the period (k), since the gain GAIN (k, 1) is the minimum during the period (k), the gain GAIN (k, 1) is used for amplification during that period. Similarly, for the period (k+2), the period changer 22 determines that the gain GAIN (k+2, 85) is the minimum during the original length of the period (k+2), whereby the period changer 22 shortens the period (k+2), and gives the gain GAIN (k+2, 85) to the multiplier 14 during the shortened period (k+2). In contrast to the periods (k−1) and (k+2), the lengths of the periods (k−2), (k), (k+1), and (k+3) remain unchanged because in each of these periods, the minimum gain smaller than the initial gain at the beginning of each period does not occur prior to the end of the period.

As described above, according to the ninth embodiment, the period changer 22 detects the minimum gain for each period and, upon detection thereof, the period changer 22 shortens the period by the length between the time at which the minimum gain occurs and the time which is the end of the original period, and provides the detected minimum gain to the multiplier 14 during the shortened period while it immediately permits the following period to commence. Therefore, the gain used for amplification becomes easy to smaller, which allows the user of the radio receiver to receive audio signal containing less noise.

Tenth Embodiment

Figure 23:
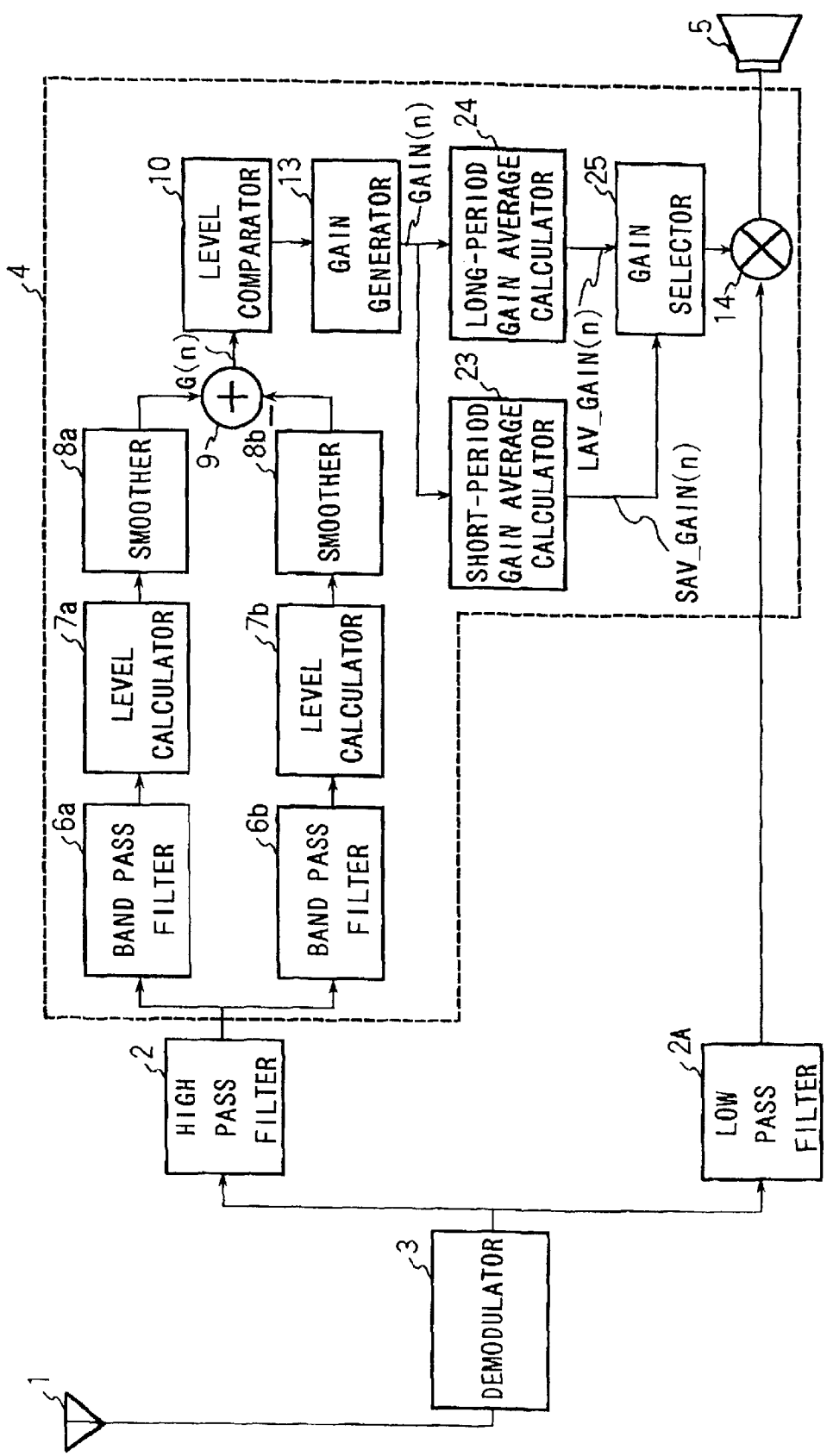
FIG. 23 shows the configuration of the tenth embodiment.

Next, the tenth embodiment of the radio receiver according to the present invention will be described in detail. FIG. 23 shows the configuration of the tenth embodiment. As shown in the figure, the tenth embodiment is an improvement of the third embodiment, wherein the tenth embodiment incorporates a short-period gain average calculator 23, a long-period gain average calculator 24, and a gain selector 25. The other circuits are the same as those in the third embodiment; therefore, the differences between the third embodiment and the tenth embodiment will be principally discussed below.

Figure 24:
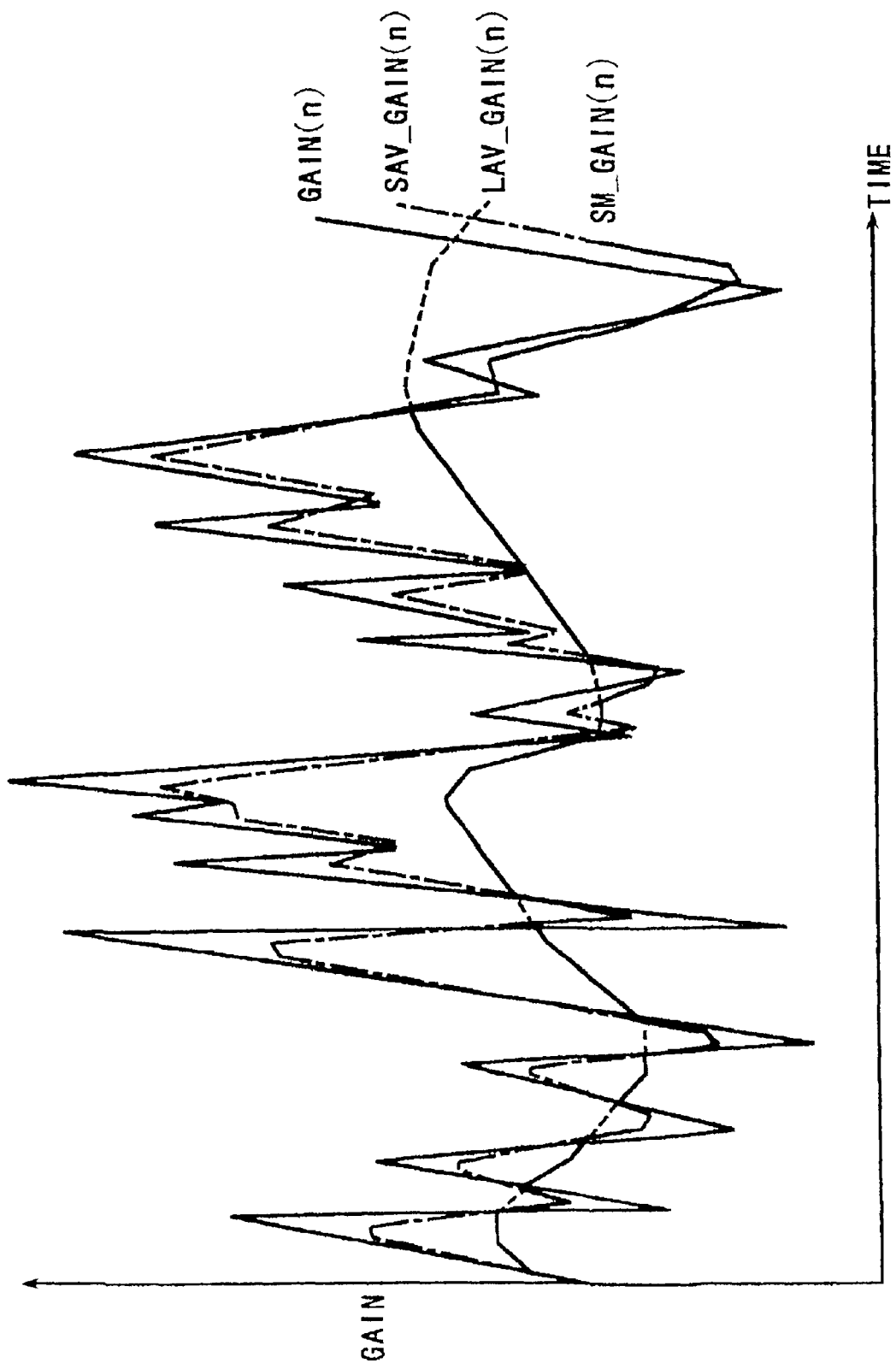
FIG. 24 shows the operation of the tenth embodiment.

FIG. 23 shows the configuration of the tenth embodiment and FIG. 24 shows the operation thereof. In FIG. 23, the short-period gain average calculator 23 and the long-period gain average calculator 24 are placed after the gain generator 13. Upon receipt of the gain GAIN (n) from the gain generator 13, the short-period gain average calculator 23 and the long-period gain average calculator 24 compute a gain for short period of time SAV_GAIN (n) and a gain for long period of time LAV_GAIN (n), respectively, which are defined as follows:

$$SAV\_GAIN(n)=\delta 4*GAIN(n)+(1-\delta 4)*SAV\_GAIN(n-1) \quad (13)$$

$$LAV\_GAIN(n)=\delta 5*GAIN(n)+(1-\delta 5)*LAV\_GAIN(n-1) \quad (14)$$

where $\delta 4=1/64$ and $\delta 5=1/512$, for example.

The gain SAV_GAIN (n) represents the average of the change in the gain GAIN (n) over a short period of time. In contrast, the gain LAV_GAIN (n) represents the average of the change in the gain GAIN (n) over a long period of time.

After calculating the gain SAV_GAIN (n), the short-period gain average calculator 23 provides the gain SAV_GAIN (n) to the gain selector 25. Similarly, after calculating the gain LAV_GAIN (n), the long-period gain average calculator 24 provides the gain LAV_GAIN (n) to the gain selector 25. Upon receiving both the gains SAV_GAIN (n) and LAV_GAIN (n), the gain selector 25 selects the smaller of the two, and the smaller gain is used for amplifying the audio signal by the multiplier 14.

More precisely, as shown in FIG. 24, basically, the gain selector 25 selects the gain LAV_GAIN (n); however, the gain selector 25 selects the gain SAV_GAIN (n) when the gain SAV_GAIN (n) is smaller than the gain LAV_GAIN (n). This means that the amplification of the audio signal depends basically upon the change in the condition of the propagation path over a long period of time, but depends upon the change in the condition of the propagation path over a short period of time when the latter condition is worse than the former condition.

As described above, in accordance with the tenth embodiment, the short-period gain average calculator 23 computes the gain SAV_GAIN (n), namely, the average of the change in the gain GAIN (n) over a short period of time, while the long-period gain average calculator 24 computes the gain LAV-GAIN (n), namely, the average of the change in the gain GAIN (n) over a long period of time. Further, the gain selector 25 ordinarily selects the gain LAV_GAIN (n) but it selects the gain SAV_GAIN (n) when the gain SAV_GAIN (n) becomes smaller than the gain LAV_GAIN (N). Consequently, this reduces the change in the gain GAIN (n), and enables tracking rapid changes in the gain GAIN (n), that is, rapid changes in the condition of the propagation path.

Eleventh Embodiment

Next, the eleventh embodiment of the radio receiver according to the present invention will be described in detail. The eleventh embodiment is an improvement of the tenth embodiment. The difference between the eleventh embodiment and tenth embodiment is that the eleventh embodiment incorporates a long-period coefficient changer 26 instead of the gain selector 25 in the tenth embodiment. The circuits other than the long-period coefficient changer 26 are the same as those in the tenth embodiment. Therefore, the explanation below will focus principally on the long-period coefficient changer 26.

Figure 25:
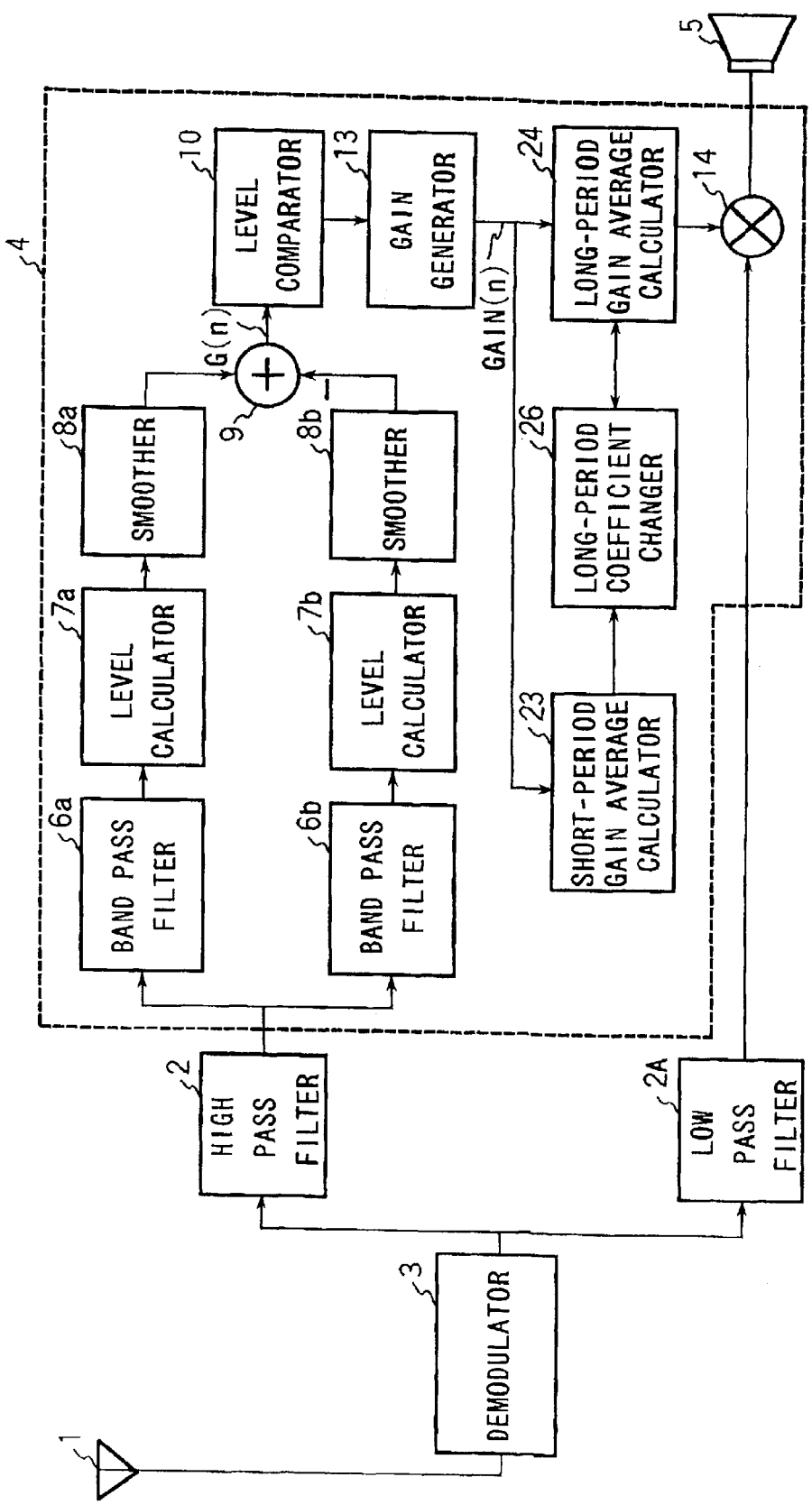
FIG. 25 shows the configuration of the eleventh embodiment.

With reference to FIG. 25, upon being fed with the gain GAIN (n) by the gain generator 13, the short-period gain average calculator 23 and the long-period gain average calculator 24 respectively compute the gain SAV_GAIN (n) and the gain LAV_GAIN (n) as in the tenth embodiment. Here, the coefficient δ5 is changeable, and is given by the long-period coefficient changer 26. More specifically, the long-period coefficient changer 26 compares the gain SAV_GAIN (n) with the gain LAV_GAIN (n) to change the coefficient δ5 according to the following:

if LAV_GAIN (n)>SAV_GAIN (n), δ5 is changed from $\frac{1}{512}$ to $\frac{1}{128}$, and if LAV_GAIN (n) <=SAV_GAIN (n), δ5 remains $\frac{1}{512}$ where the former inequality and the equation (14) indicate that the gain LAV_GAIN (n) having a larger δ5 sharply tracks changes in the gain GAIN (n), that is, sharply tracks changes in the condition of the propagation path. As a result, the tracking of the long-period gain average calculator 24 having such a changeable coefficient δ5 is sharper than the long-period gain average calculator 24 having the fixed coefficient δ5 in the tenth embodiment.

As described above, in accordance with the eleventh embodiment, the coefficient δ5 of the long-period gain average calculator 24 is changeable, and the coefficient is determined in such a fashion that the tracking of the long-period gain average calculator 24 becomes sharper when the condition of the propagation path over a long period of time is better than the condition of the propagation path over a short period of time. Accordingly, compared with the tenth embodiment, the tracking of the gain GAIN (n) by the long-period gain average calculator 24 is sharper and more accurate.

Twelfth Embodiment

Next, the twelfth embodiment of the radio receiver according to the present invention will be described in detail. The twelfth embodiment of the radio receiver comprises a coefficient changer 27 in place of the long-period coefficient changer 26 in the eleventh embodiment. The other circuits are the same as those in the eleventh embodiment. Therefore, the operation of the coefficient changer 27 will be principally discussed below.

Figure 26:
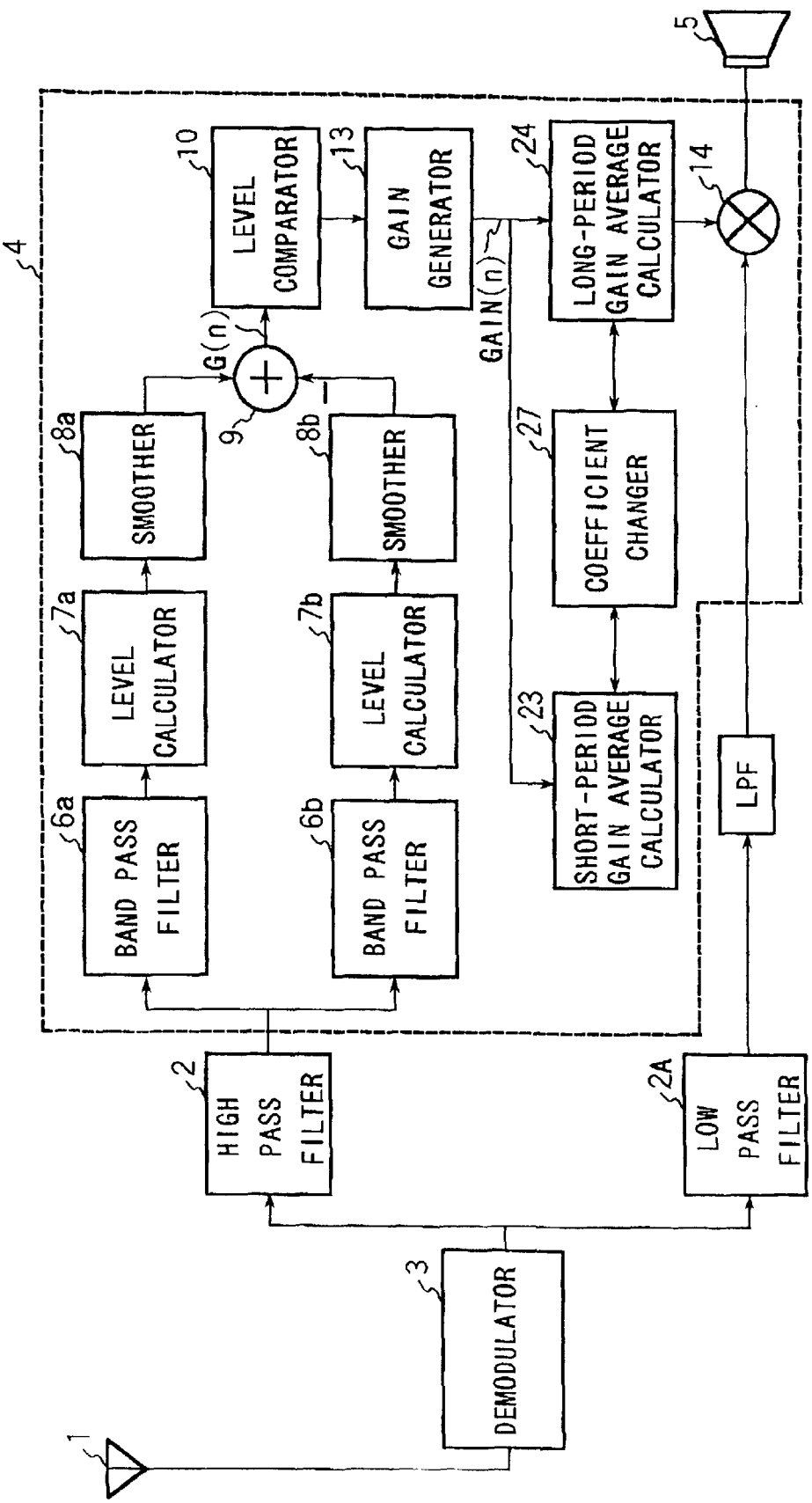
FIG. 26 shows the configuration of the twelfth embodiment.

FIG. 26 shows the configuration of the twelfth embodiment. As shown in the figure, the coefficient changer 27 is placed between the short-period gain average calculator 23 and the long-period gain average calculator 24. The coefficient changer 27 is fed the gain SAV_GAIN (n) by the short-period gain average calculator 23 and is fed the gain LAV_GAIN (n) by the long-period gain average calculator 24. Upon receiving the gains SAV_GAIN (n) and LAV_GAIN (n) from the short-period gain average calculator 23 and the long-period gain average calculator 24, the coefficient changer 27 compares those gains to select one of them, as in the tenth and eleventh embodiments. After this selection, the coefficient changer 27 changes the short-period coefficient δ4 or the long-period coefficient δ5. More specifically, if LAV_GAIN (n)>SAV_GAIN (n), the coefficient changer 27 makes the long-period coefficient δ5 larger to render tracking by the long-period gain average calculator 24 sharper while if LAV_GAIN (n)<=SAV_GAIN (n), the coefficient changer 27 makes the short-period coefficient δ4 smaller to render tracking by the short-period gain average calculator 23 duller. Hence, the tracking of the gain GAIN (n), that is to say, the tracking of the condition of the propagation path by the short-period gain average calculator 23 and the long-period gain average calculator 24 becomes more tailored to the condition of the propagation path.

As described above, in accordance with the twelfth embodiment, the coefficient changer 27 changes the short-period coefficient or the long-period coefficient according to the result of comparing the gain SAV_GAIN (n) with the gain LAV_GAIN (n). Therefore, the tracking of the change in the condition of the propagation path becomes more tailored to the condition of the propagation path in comparison with the tenth and eleventh embodiments.

Thirteenth Embodiment

The thirteenth embodiment of the radio receiver according to the present invention will be described below.

Figure 27:
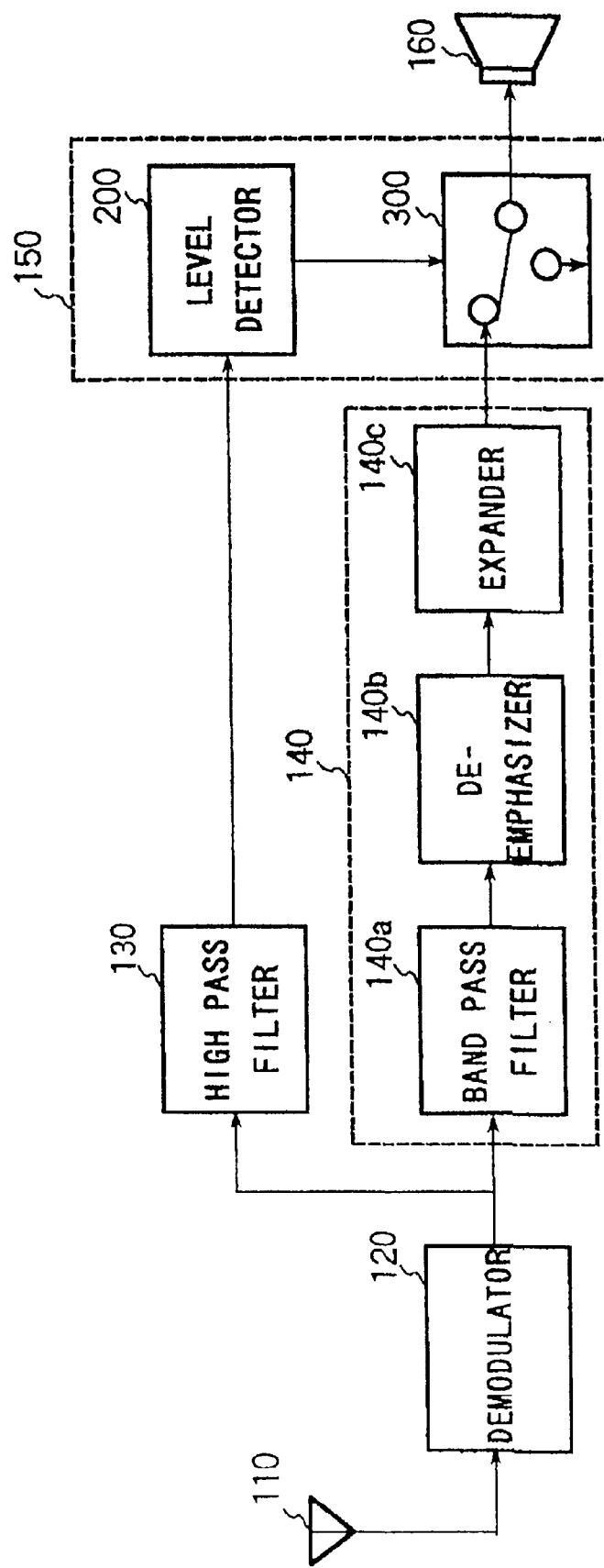
FIG. 27 shows the configuration of the thirteenth embodiment.
Figure 28:
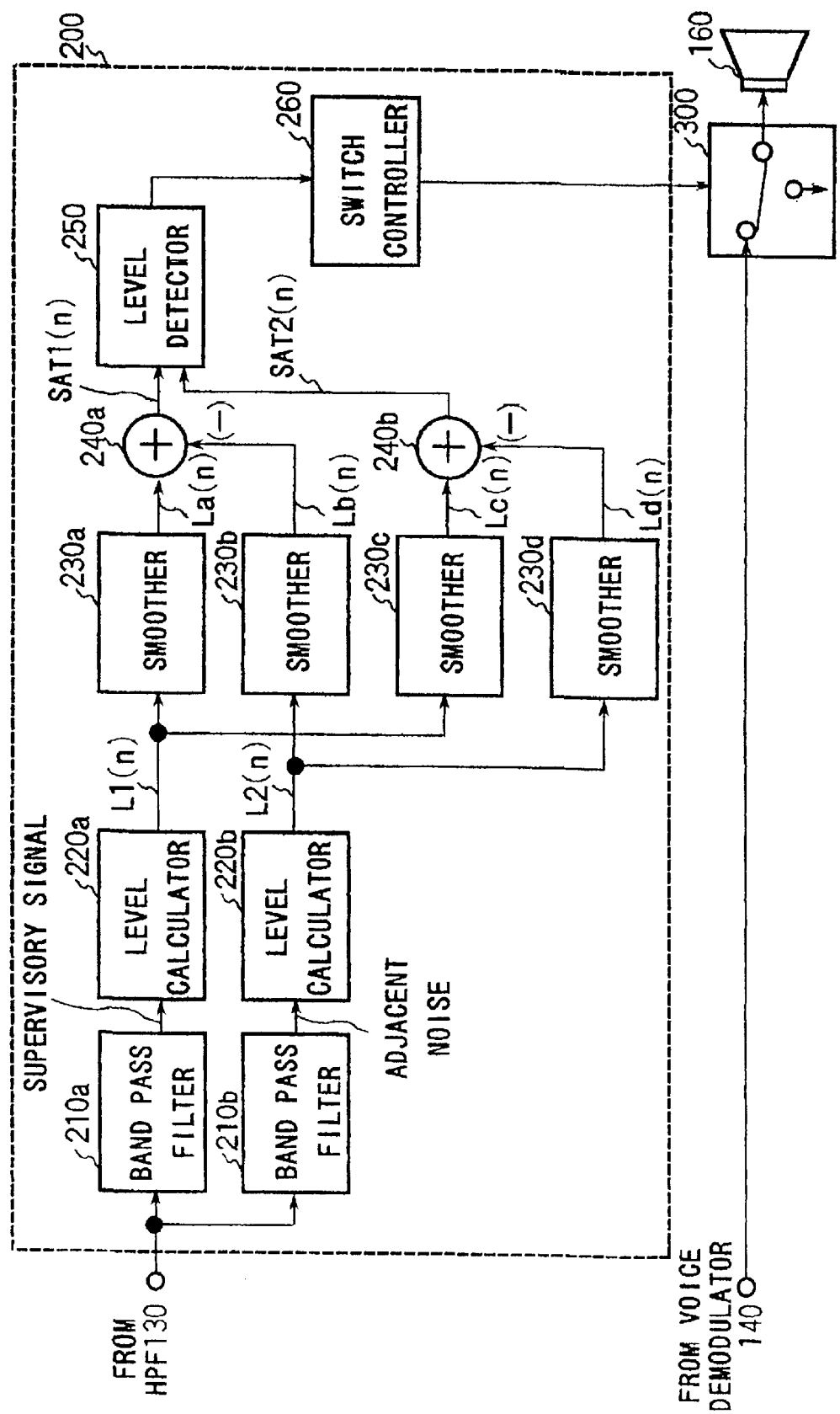
FIG. 28 shows the configuration of the control unit of the thirteenth embodiment.

FIG. 27 shows the configuration of radio receiver of the thirteenth embodiment and FIG. 28 shows the configuration of the control unit in the radio receiver. In FIG. 27, the radio receiver incorporates an antenna 110, a demodulator 120, a high pass filter (HPF) 130, an audio demodulator 140, a control unit 150, and a speaker 160. Further, the audio demodulator 140 incorporates a band pass filter 140a, a de-emphasizer 140b, and an expander 140c. The control unit 150 incorporates a level detector 200 and a switch 300. As shown in FIG. 28, the level detector 200 incorporates band pass filters (BPF) 210a and 210b, level calculators 220a and 220b, smoothers 230a, 230b, 230c, and 230d, subtracters 240a and 240b, a level detector 250, and a switch controller 260.

The antenna 110 receives a radio signal including an audio signal and a supervisory signal from a radio transmitter (not shown) via the propagation path between the radio transmitter and the radio receiver. The demodulator 120 demodulates the received signal. The high pass filter 130 passes signals other than the audio signal while the audio demodulator 140 demodulates the audio signal. The control unit 150 passes or cuts off the audio signal according to the supervisory signal. That is to say, in the control unit 150, the level detector 200 controls the switch 300 handling the audio signal, based upon the supervisory signal. More specifically, as detailed later referring to FIG. 28, the control unit 150 determines the condition of the path using the supervisory signal and the noise adjacent to the supervisory signal.

Now, the operation of the radio receiver of the thirteenth embodiment will be explained in detail. Upon receipt of the radio signal from the radio transmitter, the antenna 110 feeds the received signal into the demodulator 120. The demodulator 120 demodulates the received signal, thus giving to both the high pass filter 130 and the audio demodulator 140 a demodulated signal. Upon receipt of the demodulated signal, the high pass filter 130 passes signals whose frequencies are higher than the maximum frequency 4000 Hz of the audio signal. Since the frequency of the supervisory signal is 6000 Hz, it passes through the high pass filter 130, thus entering the level detector 200 of the control unit 150.

In the audio demodulator 140, only the audio signal contained in the demodulated signal is allowed to go through the band pass filter 140a, and this signal thereafter undergoes de-emphasis and expansion in the de-emphasizer 140b and the expander 140c, respectively, finally entering the switch 300 of the control unit 150. The audio signal includes, for example, signal components having frequencies ranging from 300 Hz to 3000 Hz.

Referring to FIG. 28, upon receiving the signal from the high pass filter 130, the band pass filter 210a passes the supervisory signal of 6000 Hz while the band pass filter 210b passes the noise adjacent to the supervisory signal, for example, noise of 6200 Hz, which is referred to as "adjacent noise".

Figure 29:
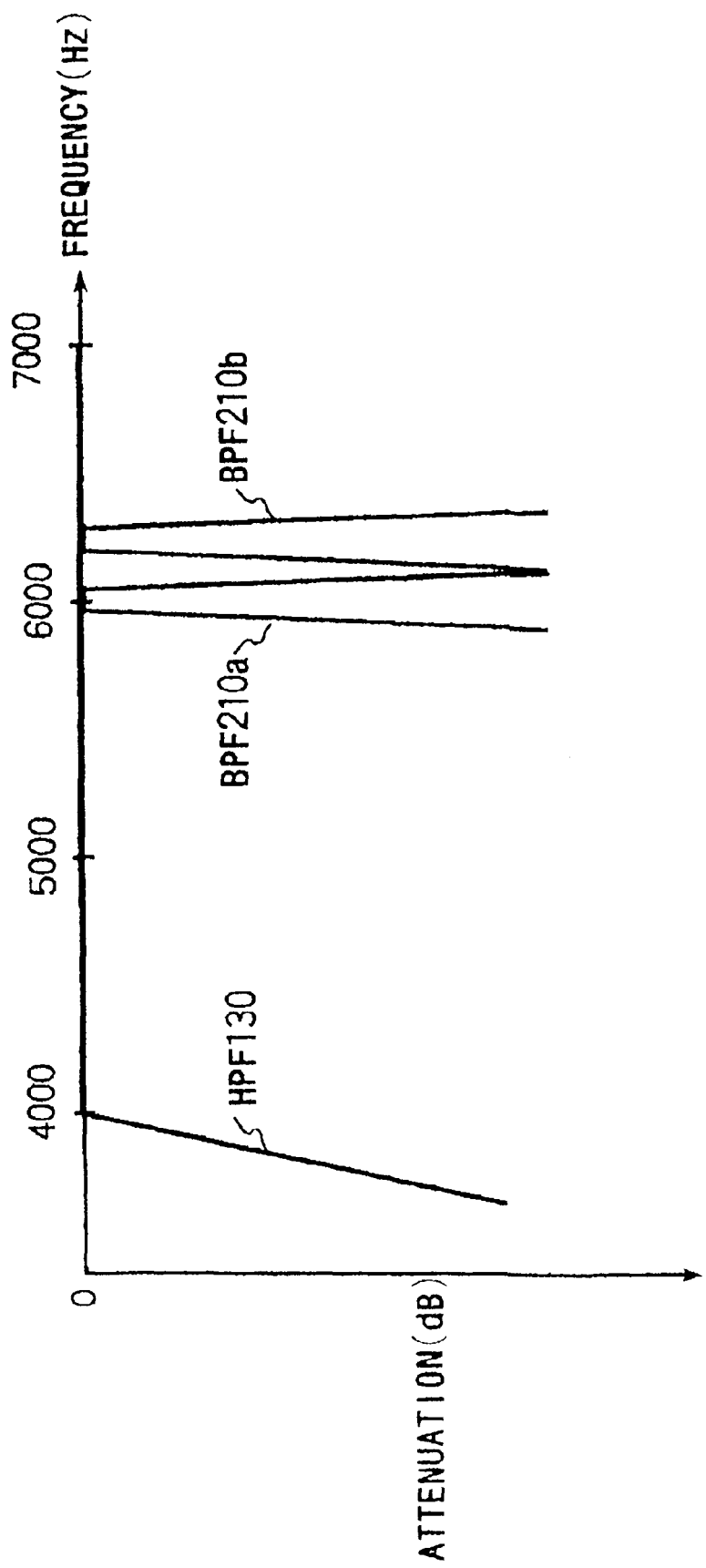
FIG. 29 shows the characteristics of the filters of the thirteenth embodiment.

FIG. 29 shows the characteristics of the high pass filter 130 and the band pass filters 210a and 210b. As described above and shown in the figure, the high pass filter 130 passes signals whose frequencies are higher than 4000 Hz, and thereafter the band pass filter 210a passes the supervisory signal of 6000 Hz while the band pass filter 210b passes noise of approximately 6200 Mz.

Turning back to FIG. 28, upon passing through the band pass filter 210a, the supervisory signal is fed into the level calculator 220a. Similarly, upon passing through the band pass filter 210b, the noise adjacent to the supervisory signal is fed into the level calculator 220b. The level calculator 220a computes the absolute value L1(n) of the supervisory signal while the level calculator 220b computes the absolute value L2(n) of the adjacent noise. The absolute value L1(n) is fed into the smoothers 230a and 230c while the absolute value L2(n) is fed into the smoothers 230b and 230d. The smoothers 230a and 230c perform smoothing on the absolute value L1(n) and the smoothers 230b and 230d perform smoothing on the absolute value L2(n) according to the following equations.

$$La(n)=\delta 1*L1(n)+(1-\delta 1)*La(n-1) \quad (15)$$

$$Lb(n)=\delta 1*L2(n)+(1-\delta 1)*Lb(n-1) \quad (16)$$

$$Lc(n)=\delta 2*L1(n)+(1-\delta 2)*Lc(n-1) \quad (17)$$

$$Ld(n)=\delta 2*L2(n)+(1-\delta 2)*Ld(n-1) \quad (18)$$

where n denotes the order of smoothing and the smoothing is repeatedly carried out at the frequency of 40 kHz, and the relationship between $\delta 1$ and $\delta 2$ is $1.0 > \delta 1 >> \delta 2$, for example, $\delta 1 = 1/16$ and $\delta 2 = 1/1024$. Here, the value La(n) indicates the average of the change in the supervisory signal over a short period of time; the value Lb(n) indicates the average of the change in the adjacent noise over a short period of time; the value Lc(n) indicates the average of the change in the supervisory signal over a long period of time;

and the value Ld(n) indicates the average of the change in the adjacent noise over a long period of time. The smoothers 230a, 230b, 230c, and 230d output the values La(n), Lb(n), Lc(n), and Ld(n), respectively.

The values La(n) and Lb(n) are fed into the subtractor 240a while the values Lc(n) and Ld(d) are fed into the subtractor 240b. The subtractors 240a and 240b perform subtraction on the values La(n) and Lb(n), and Lc(n) and Ld(n), respectively, according to the following equations.

$$SAT1(n)=La(n)-Lb(n) \quad (19)$$

$$SAT2(n)=Lc(n)-Ld(n) \quad (20)$$

Here, the value SAT1(n) represents the difference between the supervisory signal and the adjacent noise over a short period of time while the value SAT2(n) represents the difference between the supervisory signal and the adjacent noise over a long period of time. Both the values SAT1(n) and SAT2(n) are fed into the level detector 250.

Figure 30:
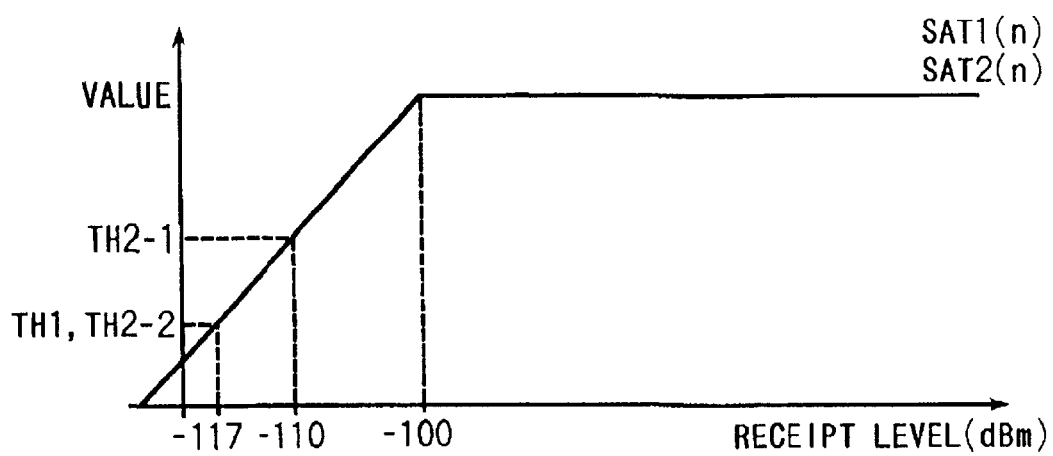
FIG. 30 shows the relationship between the reception level of the radio wave and the threshold for the thirteenth embodiment.

Upon receipt of the values SAT1(n) and SAT2(n), the level detector 250 compares these values with predetermined thresholds. For the value SAT1(n), the level detector 250 has a threshold TH1. For the value SAT2(n), the level detector 250 has thresholds TH2-1 and TH2-2. For example, as shown in FIG. 30, the threshold TH1 is a value corresponding to a reception level of the radio wave of −117 dBm, the threshold TH2-1 is a value corresponding to a reception level of −110 dBm, and the threshold TH2-2 is a value corresponding to a reception level of −117 dBm. These thresholds perform like the threshold TH explained with reference to FIG. 5. The operation of comparison and notification by the level detector 250 is carried out as follows.

(a) If SAT2(n)>=TH2-1, the level detector 250 notifies the switch controller 260 of the presence of the supervisory signal.

(b) If SAT2(n)<=TH2-2, the level detector 250 notifies the switch controller 260 of the absence of the supervisory signal.

(c) If TH2-1>SAT2(n)>TH2-2 and SAT1(n)<=TH1, the level detector 250 notifies the switch controller 260 of the absence of the supervisory signal.

(d) If TH2-1>SAT2(n)>TH2-2 and SAT1(n)>TH1, the level detector 250 notifies the switch controller 260 of the presence of the supervisory signal.

Figure 31:
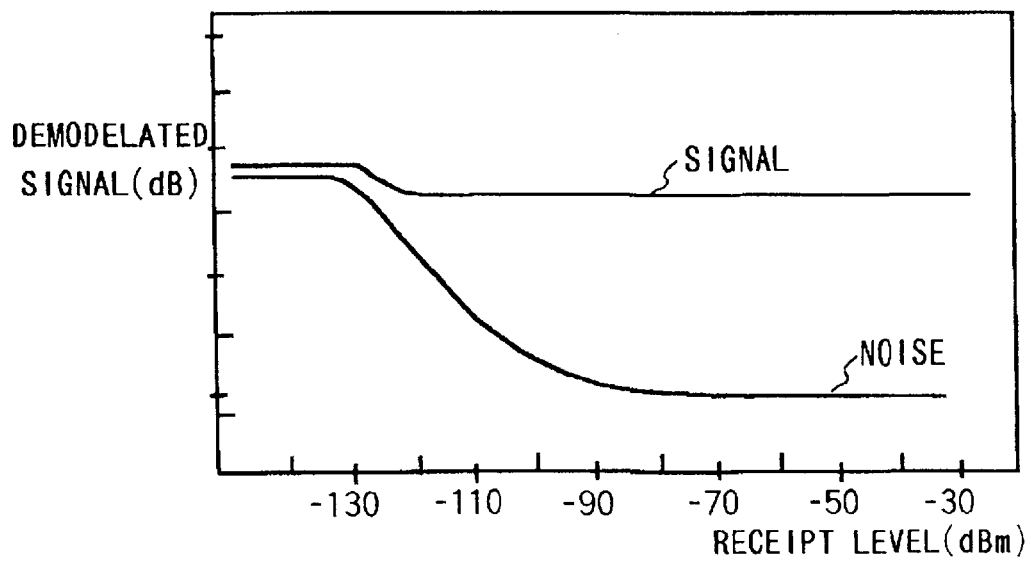
FIG. 31 shows the relationship between the reception level of the signal and the demodulated signal for the thirteenth embodiment.
Figure 32:
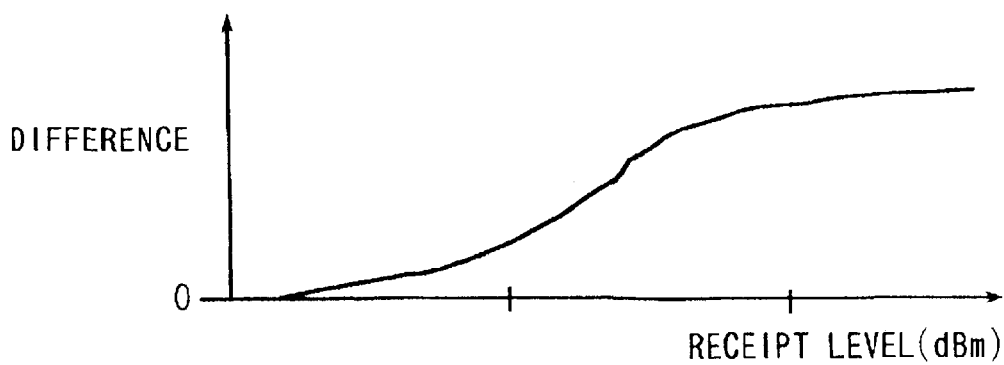
FIG. 32 shows the relationship between the reception level and the difference of the supervisory signal and the adjacent signal for the thirteenth embodiment.

FIG. 31 shows the relationship between the reception level of the signal received by the antenna 110 and the signal demodulated by the demodulator 120, and FIG. 32 shows the relationship between the reception level and the difference of the level of the supervisory signal and the level of the adjacent noise signal. As shown in FIG. 31, the signal-to-noise ratio of the demodulated signal remains large as long as the reception level is not weak. As shown in FIG. 32, the difference between the level of the supervisory signal and the level of the adjacent noise signal remains large as long as the reception level of the radio wave is not weak.

If the supervisory signal is extremely deteriorated by a bad propagation path, that is to say, if the reception level of the radio wave is weak, both the band pass filter 210a and the band pass filter 210b pass noise. Since the noise is white noise which is flat in the frequency domain, the value La(n) and the value Lb(n) are roughly the same, whereby the subtractor 240a outputs approximately zero as the difference of the value La(n) and the value Lb(n).

Upon being notified of the presence of the supervisory signal, the switch controller 260 passes the audio signal by turning on the switch 300. Thereby, the audio signal is output to the speaker 160. On the contrary, upon being notified of the absence of the supervisory signal, the switch controller 260 cuts off the audio signal by turning off the switch 300.

As described above, the average of the change in the supervisory signal over a short period of time, the average of the change in the supervisory signal over a long period of time, the average of the change in the adjacent noise over a short period of time, and the average of the change in the adjacent noise over a long period of time are obtained by the band pass filters 210a and 210b, the level calculators 220a and 220b, and the smoothers 230a, 230b, 230c, and 230d. Further, the value SAT1(n) indicating the difference between the supervisory signal and the adjacent noise over a short period of time and the value SAT2(n) indicating the difference between the supervisory signal and the adjacent noise over a long period of time are obtained on the basis of these averages by the subtractors 240a and 240b. Consequently, use of the values SAT1(n) and SAT2(n) enables supervision by the supervisory signal both over a short period of time and over a long period of time. More specifically, when the propagation path remains bad, that is, when the audio signal contains a large amount of noise over a long period of time, the audio signal is securely cut off. On the contrary, when the propagation path instantaneously becomes bad due to fading or the like, that is, when the propagation path is bad over a short period of time, the audio signal is not cut off. This prevents the noise passing through the filter from acting like the supervisory signal, when the supervisory signal is diminished owing to a bad propagation path. Consequently, the user of the radio receiver can avoid annoyance caused by audio signals containing a lot of noise.

Fourteenth Embodiment

Next, the fourteenth embodiment of the radio receiver according to the present invention will be described.

Figure 33:
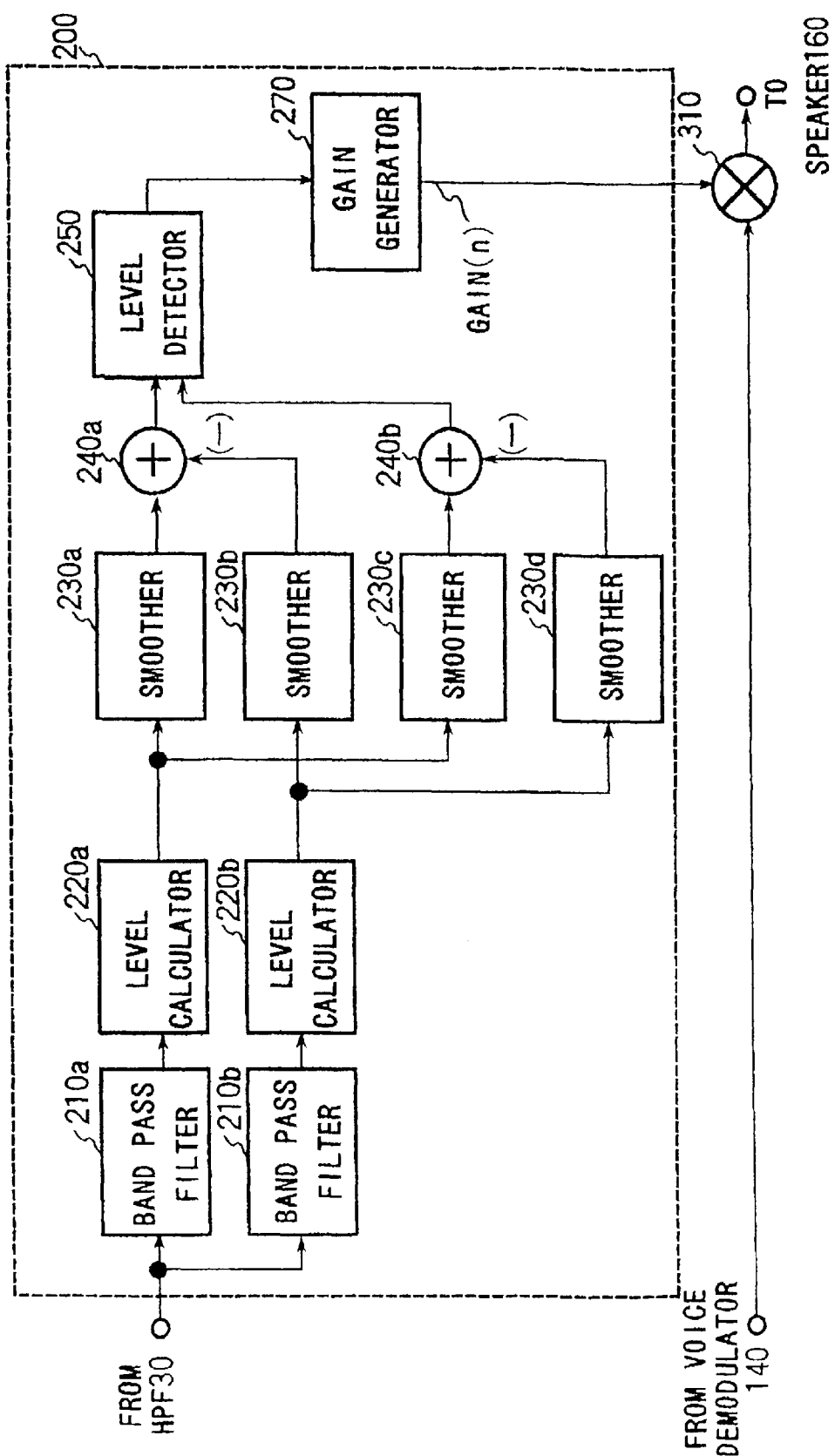
FIG. 33 shows the configuration of the fourteenth embodiment.

FIG. 33 shows the configuration of the fourteenth embodiment. As shown in the figure, the fourteenth embodiment has a gain generator 270 and a multiplier 310 in place of the switch controller 260 and the switch 300 in the thirteenth embodiment. The multiplier 310 amplifies the audio signal based upon the gain indicated by the gain generator 270. The other circuits of the fourteenth embodiment are the same as those in the thirteenth embodiment. Therefore, for ease of explanation, the operation of these two different circuits will be principally explained below.

Upon receipt of the values SAT1(n) and SAT2(n) from the subtractor 240a and the subtractor 240b, the level detector 250 computes a value G1(n) and a value G2(n) based thereupon. More specifically, the level detector 250 computes the values G1(n) and G2(n) by multiplying the values SAT1(n), SAT2(n), and several predetermined coefficients, such that G1(n)=SAT1(n)*δ11, and G2(n)=SAT2(n)*δ12, for example.

Upon receiving the values G1(n) and G2(n), the gain generator 270 yields a gain GAIN (n), and provides the GAIN (n) to the multiplier 310. The operation of the gain generator 270 is as follows.

If $G2(n) \geq$ value (−110 dBm), GAIN(n)=1.0     (21)

If $G2(n) \leq$ value (−117 dBm), GAIN(n)=0.1     (22)

If value (−110 dBm)>$G2(n)$>value(−117 dBm) and value(−115 dBm)>$G1(n)$>value (−120 dBm), GAIN(n)=((1.0−0.1)/(value(−115 dBm)−value (−120 dBm))($G1(n)$−value(−115 dBm))+1     (23)

If value(−110 dBm)>$G2(n)$>value(−117 dBm) and $G1(n)$>value(−115 dBm), GAIN(n)=1.0     (24)

If value (−110 dBm)>$G2(n)$>value (−117 dBm) and $G1 \leq$ value (−120 dBm), GAIN(n)=0.1     (25)

where value ( ) denotes the value in FIG. 30. For example, value (−110 dBm) denotes the value corresponding to the reception level of −110 dBm in FIG. 30.

Figure 34:
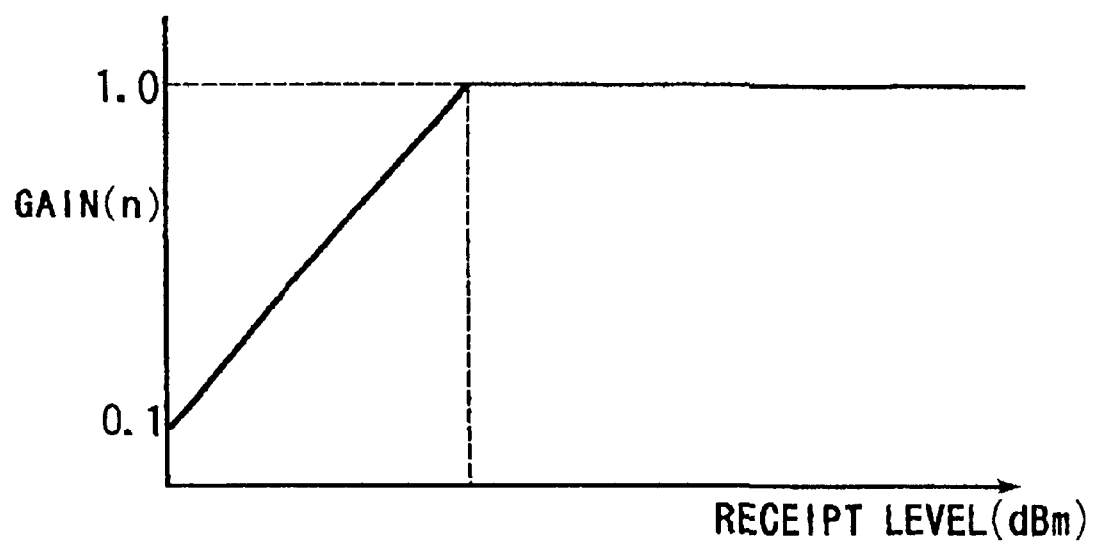
FIG. 34 shows the relationship between the reception level and the gain GAIN (n) for the fourteenth embodiment.

FIG. 34 shows the relationship between the reception level and the gain GAIN (n). The above expressions give the curve of the gain GAIN (n) indicated in FIG. 34.

Turning back to FIG. 33, upon receipt of the GAIN (n) from the gain generator 270, the multiplier 310 amplifies the audio signal output fed thereto by the audio demodulator 140, according to the gain GAIN (n), thereby providing the speaker 160 with the amplified audio signal.

As described above, in accordance with the fourteenth embodiment, the radio receiver employs the gain generator 270 and the multiplier 310 instead of the switch controller 260 and the switch 300 in the thirteenth embodiment. In contrast to the cutting off of the audio signal by the switch 300, the multiplier 310 adjusts the level of the audio signal according to gain GAIN (n) indicated by the gain generator 270, which enables the user to be free from noise accompanying the cutting-off.

Fifteenth Embodiment

Next, the fifteenth embodiment of the radio receiver according to the present invention will be described in detail.

Figure 35:
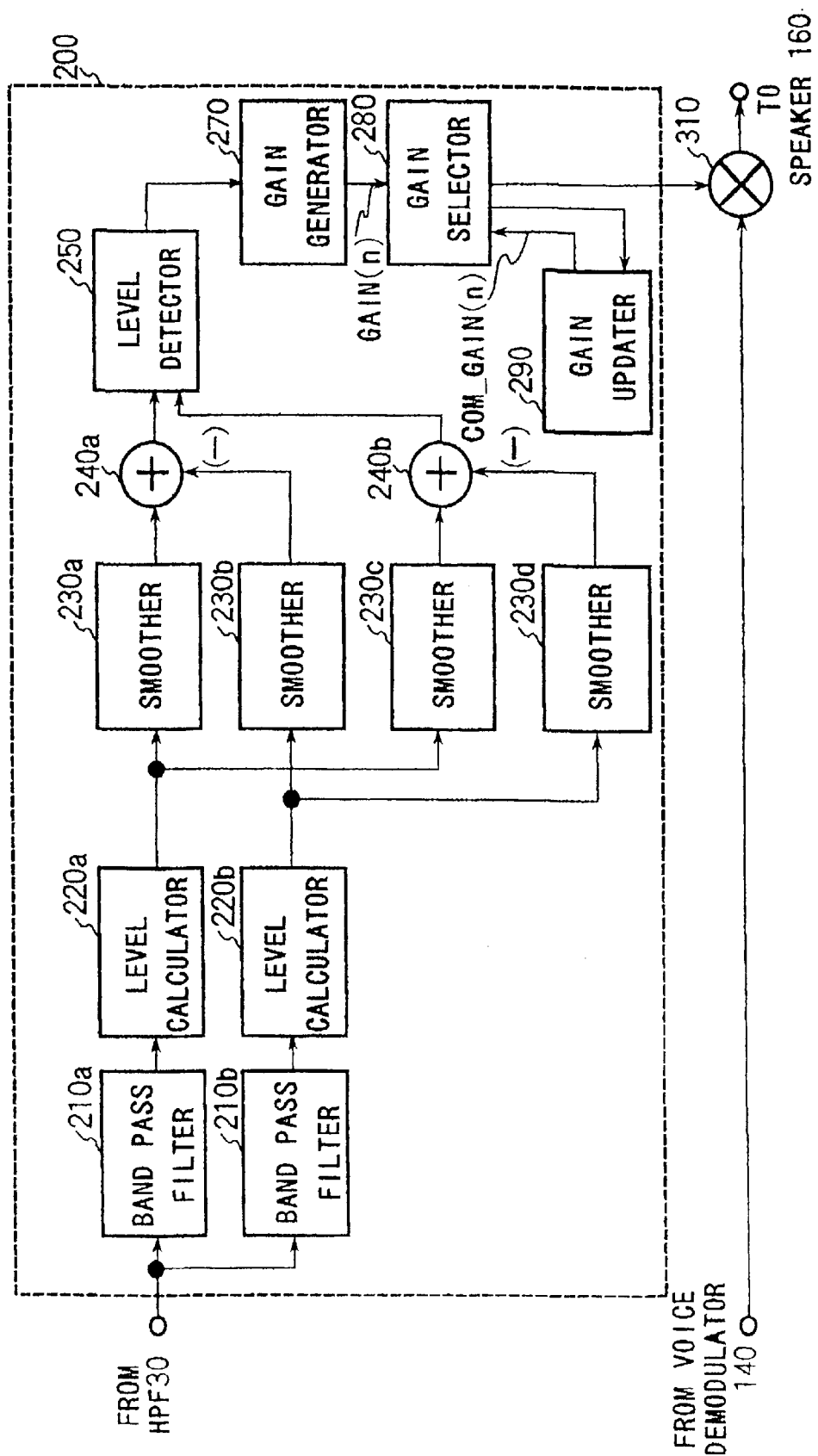
FIG. 35 shows the configuration of the fifteenth embodiment.

FIG. 35 shows the configuration of the fifteenth embodiment of the radio receiver. In comparison to the fourteenth embodiment, the fifteenth embodiment further incorporates a gain selector 280 and a gain updater 290. The other circuits in the fifteenth embodiment are identical with those in the fourteenth embodiment. The gain updater 290 produces a compulsorily-increased gain COM_GAIN (n), which is utilized by the gain selector 280. The compulsorily-increased gain COM_GAIN (n) is identical with that of the sixth embodiment.

The operation of the fifteenth embodiment will now be explained. Upon receipt of the GAIN (n) from the gain generator 270 and the COM_GAIN (n) from the gain updater 290, the gain selector 280 selects the smaller one of the gain GAIN (n) and the compulsorily-increased gain COM_GAIN (n), thus outputting the smaller gain to the multiplier 310 and the gain updater 290. To summarize, if COM_GAIN (n)<=GAIN (n), the compulsorily-increased gain COM_GAIN (n) is output; on the contrary, if GAIN (n)<COM_GAIN (n), the gain GAIN (n) is output. Upon receipt of the compulsorily-increased gain COM_GAIN (n) or the gain GAIN (n), either of which acts as a COM_GAIN (n) in the gain updater 290, the gain updater 290 produces a COM_GAIN (n+1) according to the following equation.

COM_GAIN(n+1)=COM_GAIN(n)*(1.0+δ3)     (26)

where the initial COM_GAIN(0)=1.0 and δ3 is 0.0078125, for example.

Figure 36:
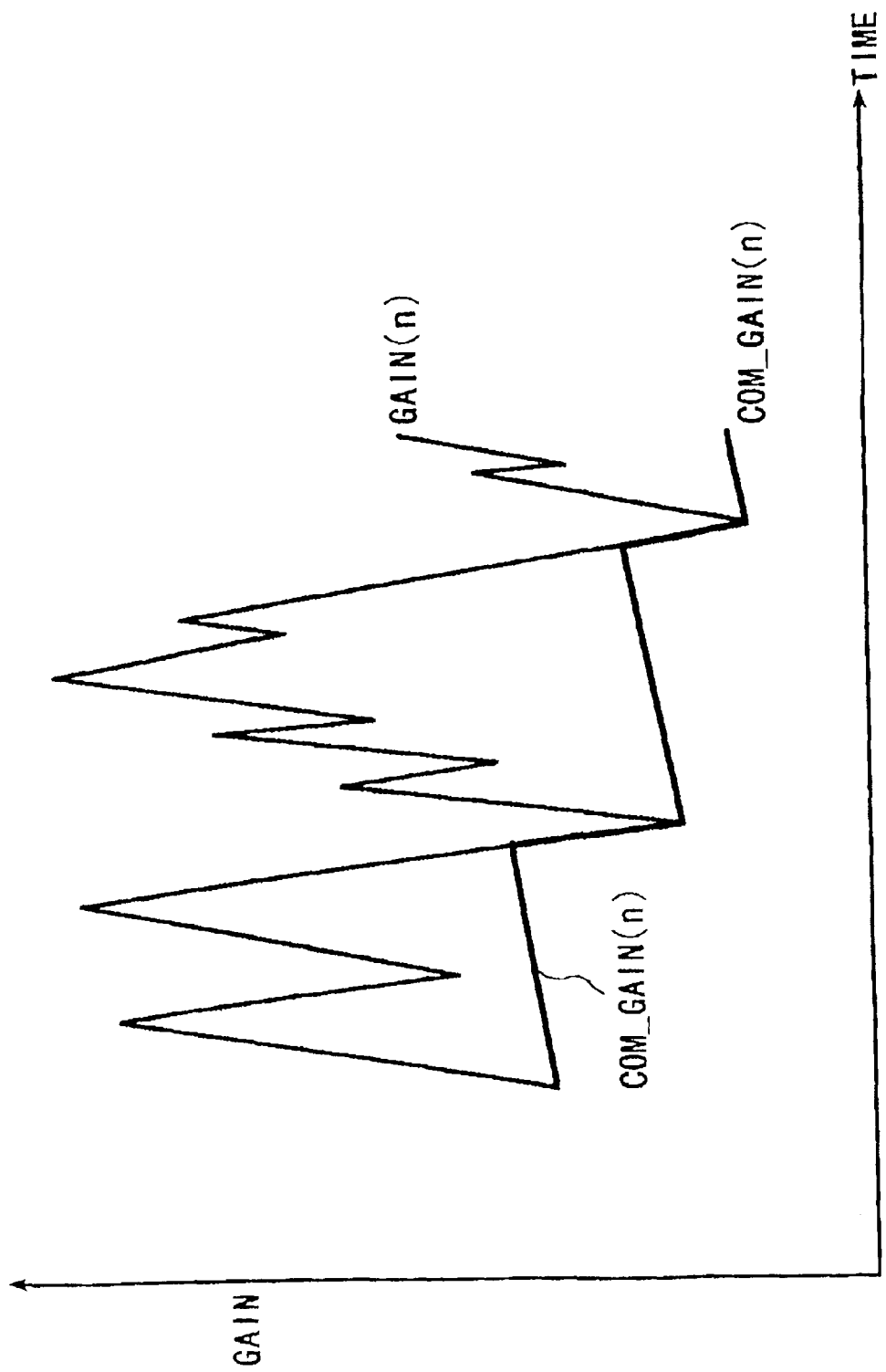
FIG. 36 shows the operation of the fifteenth embodiment.

FIG. 36 shows graphically the operation of the fifteenth embodiment. As shown in the figure, even though the gain GAIN (n) sharply changes, the COM_GAIN (n) does not sharply change.

As described above, according to the fifteenth embodiment, the radio receiver further incorporates the gain selector 280 and the gain updater 290 in addition to the configuration of the fourteenth embodiment. The gain selector 280 and the gain updater 290 serve to suppress the change in the gain used for amplifying the audio signal and to continuously seek the minimum gain. More specifically, the radio receiver reduces the gain when the audio signal contains a lot of noise and increases the gain or permits the gain to approach the initial maximum value 1.0 when the audio signal contains little noise. Consequently, in comparison with the fourteenth embodiment, the audio signal becomes easier to hear.

Sixteenth Embodiment

Next, the sixteenth embodiment of the radio receiver according to the present invention will be described in detail.

Figure 37:
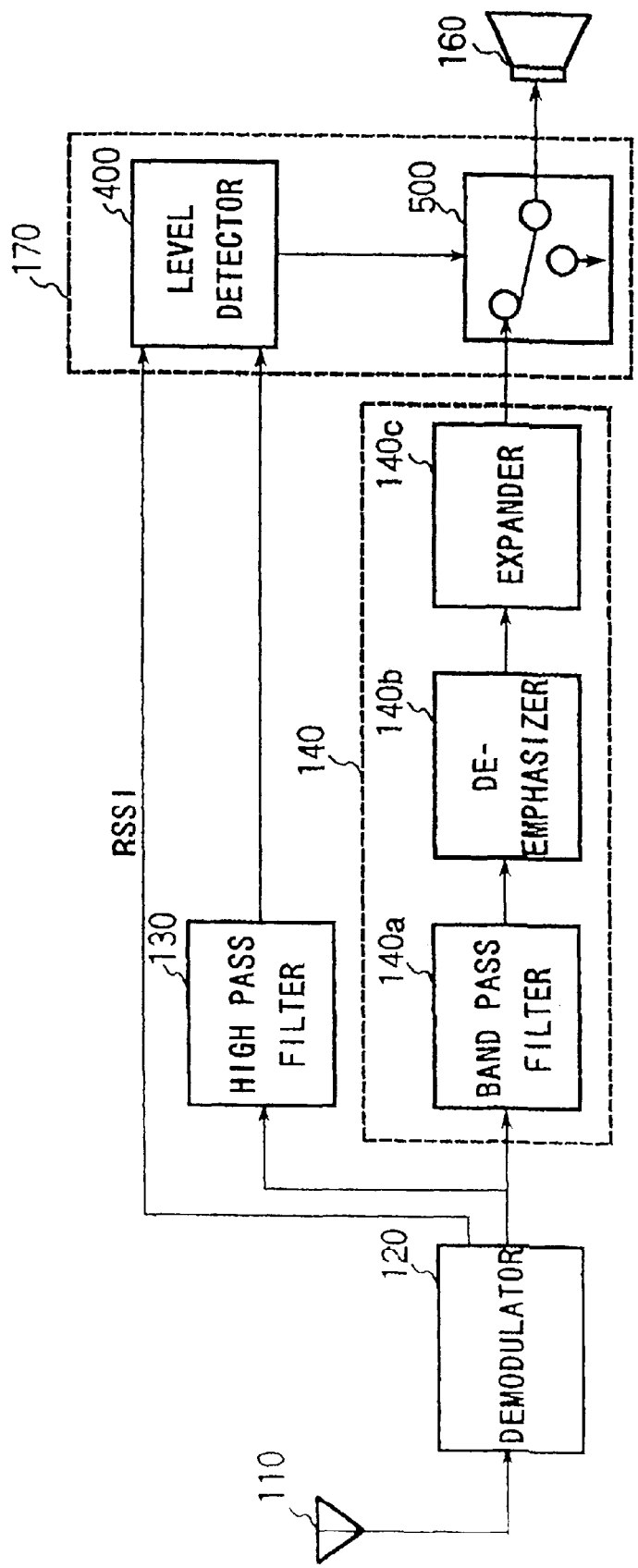
FIG. 37 shows the configuration of the sixteenth embodiment.
Figure 38:
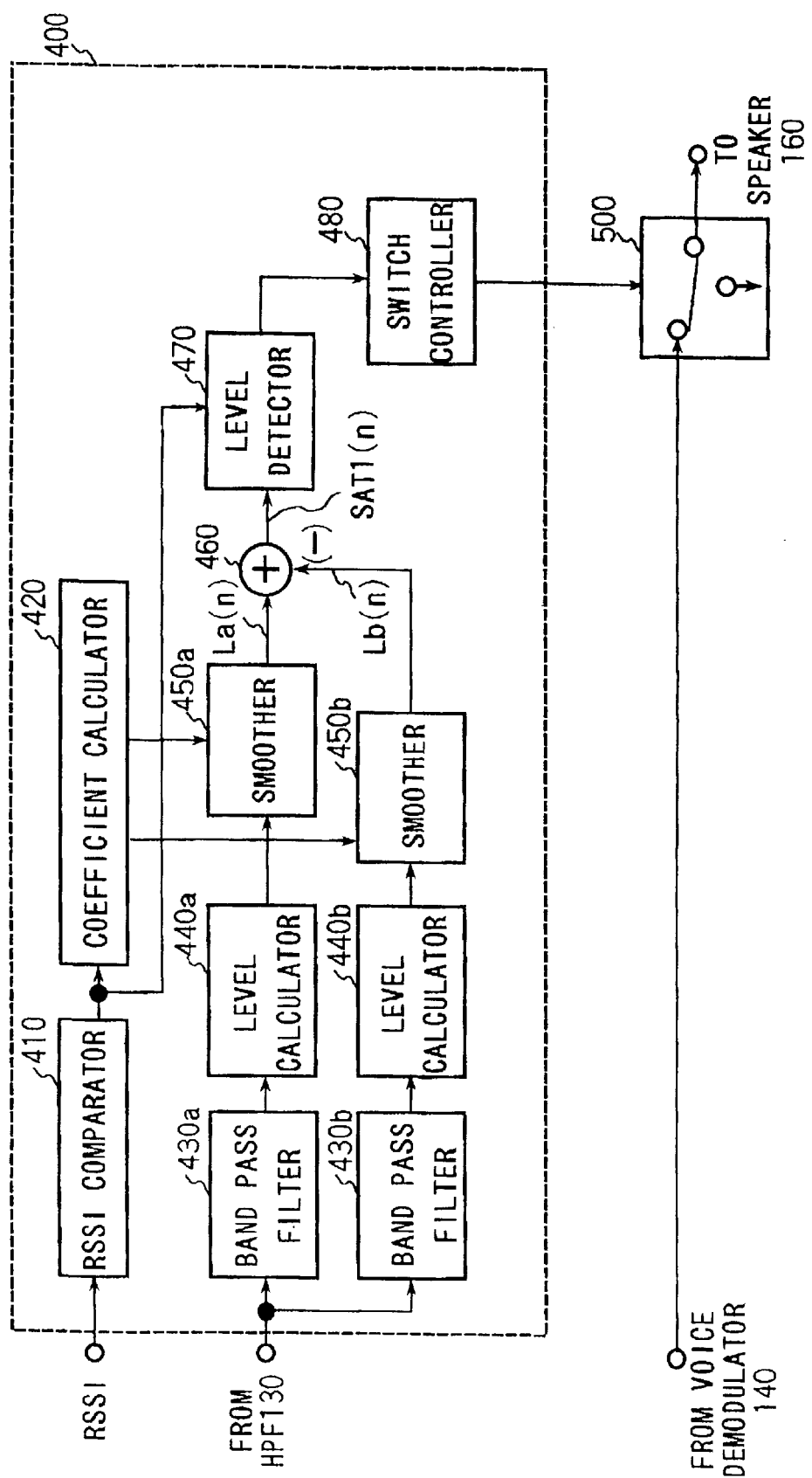
FIG. 38 shows the configuration of the control unit of the sixteenth embodiment.

FIG. 37 shows the configuration of the sixteenth embodiment and FIG. 38 shows the control unit of the sixteenth embodiment. The circuits in the sixteenth embodiment are almost the same as those in the thirteenth embodiment. As shown in FIG. 37, However, the sixteenth embodiment utilizes an RSSI (Received Signal Strength indicator) signal. Herein, the RSSI signal is prepared by the demodulator 120, which denotes the absolute level of the radio wave having a desired frequency, that is to say, the absolute level of the radio wave to be received by the radio receiver. For example, the demodulator 120 prepares the RSSI signal using the feedback amount of an automatic gain controller (not shown) that amplifies the radio wave up to the predetermined level. The demodulator 120 feeds the RSSI signal to the level detector 400.

In FIGS. 37 and 38, the control unit 170 incorporates a level detector 400 and a switch 500 similar to the thirteen embodiment, wherein the level detector 400 incorporates an RSSI comparator 410, a coefficient calculator 420, band pass filters 430a and 430b, level calculators 440a and 440b, smoothers 450a and 450b, a subtractor 460, a level detector 470, and a switch controller 480. The RSSI comparator 410 compares the level of the received RSSI signal with a given threshold. The coefficient calculator 420 calculates oblivion coefficients used for the smoothers 450a and 450b, according to the result of comparison obtained by the RSSI comparator 410. The other circuits operate similarly to the corresponding circuits in the thirteenth embodiment.

The operation of the sixteenth embodiment will now be explained. Upon receipt of the RSSI signal from the demodulator 120, the RSSI comparator 410 compares the level of the RSSI signal with the given threshold, thus determining whether the RSSI signal is weak or strong according to the following inequalities:

If RSSI signal <−110 dBm, the RSSI signal is determined to be weak, and

If RSSI signal >=−110 dBm, the RSSI signal is determined to be strong.

The determination by the RSSI comparator 410 is fed into both the coefficient calculator 420 and the level detector 470. When notified that the RSSI signal is weak, the coefficient calculator 420 sets the oblivion coefficient $\delta 1$ to be $1/16$. On the contrary, when notified that the RSSI signal is strong, the coefficient calculator 420 sets the oblivion coefficient $\delta 1$ to be $1/1024$. This indicates that the value of the coefficient $\delta 1$ changes in accordance with the level of the RSSI signal and that the values La(n) and Lb(n) calculated by the smoothers 450a and 450b change in accordance with the coefficient $\delta 1$, as described later. Here, the values La(n) and Lb(n) denoting the averages of the change in the supervisory signal and the adjacent noise are for a short period of time or for a long period of time, depending upon the RSSI signal.

The oblivion coefficient $\delta 1$ is fed into both the smoothers 450a and 450b. The band pass filters 430a and 430b, and the level calculators 440a and 440b perform similarly to those in the thirteenth embodiment. Upon receiving the oblivion coefficient $\delta 1$ from the coefficient calculator 420, the smoothers 450a and 450b compute the values La(n) and Lb(n) according to the following equations:

$$La(n) = \delta 1 * L1(n) + (1 - \delta 1) * La(n-1) \quad (27)$$

$$Lb(n) = \delta 1 * L2(n) + (1 - \delta 1) * Lb(n-1) \quad (28)$$

where n denotes the order of the sampling and the frequency of sampling is 40 KHz. The values La(n) and Lb(n) are output to the subtractor 460, whereupon the subtractor 460 obtains a value SAT1(n) using these values La(n) and Lb(n) on the basis of the following equation:

$$SAT1(n) = La(n) - Lb(n) \quad (29)$$

The subtractor 460 provides the value SAT1(n) to the level detector 470. The level detector 470 compares the value SAT1(n) with one of the fixed thresholds TH-1 and TH-2 and notifies the switch controller 480 of the presence/absence of the supervisory signal accordingly as the RSSI signal is strong or weak as explained below. The threshold TH-1 are TH-2 are given values similar to those of the thresholds, TH-1, TH2-1, and TH2-2 of the thirteenth embodiment. For example, the threshold TH-1 and TH-2 are set to a value corresponding to a reception level of −117 dBm.

When the RSSI signal is strong, if SAT1(n)<TH-1, the level detector 470 notifies the switch controller 480 of the absence of the supervisory signal; when the RSSI signal is weak, if SAT(n)<TH-2, the level detector 470 notifies the switch controller 480 of the absence of supervisory signal; otherwise, the level detector 470 notifies the switch controller 480 of the presence of the supervisory signal.

When the notification is fed into the switch controller 480, the switch controller 480 controls the switch 500 based upon the notification. Consequently, the switch 500 cuts off the audio signal when the supervisory signal is absent, whereas it passes the audio signal when the supervisory signal is present.

As described above, according to the sixteenth embodiment, the coefficient calculator 420 calculates or sets the oblivion coefficients $\delta 1$ accordingly as the RSSI signal is weak or strong, and the value of the oblivion coefficient $\delta 1$ determines whether the values La(n) and Lb(n) should be calculated over a short period of time or over a long period of time. Further, one of the thresholds TH-1 and TH-2 used for determining whether the supervisory signal is present or absent is selected based on whether the RSSI signal is weak or strong. Consequently, it is possible to calculate the values La(n) and Lb(n) over a short period of time when the level of the RSSI signal is strong, which enables changes in the supervisory signal to be sharply tracked. In contrast, it is possible to calculate the values La(n) and Lb(n) over a long period of time when the level of the RSSI signal is weak, which enables frequent switching of the audio signal to be avoided. As a result, the user of the radio receiver can avoid the annoyance caused by hearing a lot of noise contained in the audio signal or by hearing a lot of noise which accompanies frequent switching.

Seventeenth Embodiment

Next, the seventeenth embodiment of the radio receiver according to the present invention will be described in detail. The configuration of the seventeenth embodiment is roughly the same as that of the sixteenth embodiment; the difference between the two embodiments is in the configuration of the control unit 400.

Figure 39:
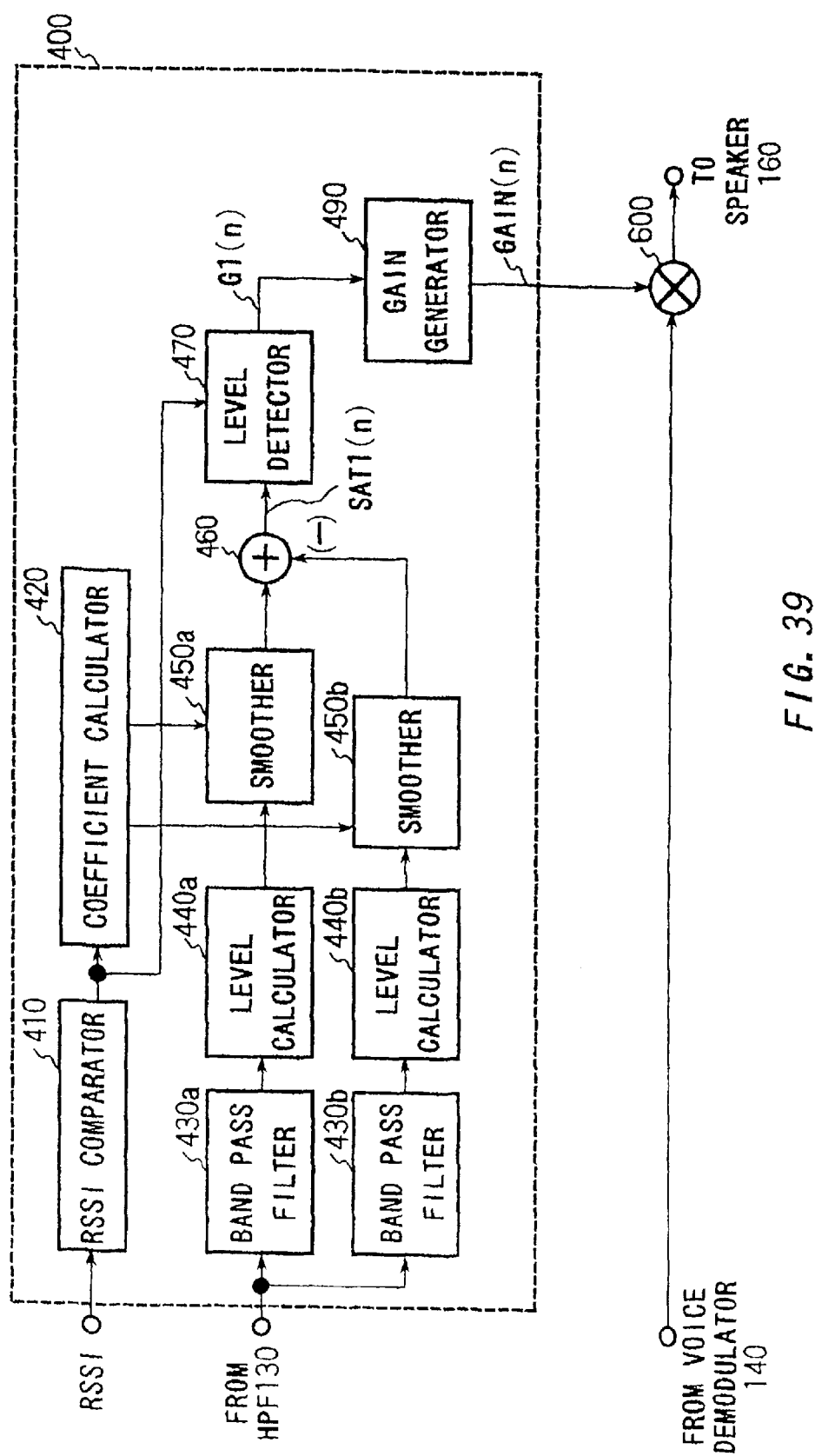
FIG. 39 shows the configuration of the control unit of the seventeenth embodiment.

FIG. 39 shows the configuration of the control unit 170 in the seventeenth embodiment (number not indicated in figure). In the figure, a gain generator 490 is incorporated in lieu of the switch controller 480 and a multiplier 600 is incorporated in lieu of the switch 500. The operation of these circuits is the same as in the fourteenth embodiment.

The operation of the seventeenth embodiment will be described below. Since the operation of the circuits other than the level detector 470, the gain generator 490, and the multiplier 600 are identical with those of the corresponding circuits in the sixteenth embodiment, the below explanation will focus principally on the operation of the gain generator 490 and the multiplier 600.

Upon receipt of notification of whether the RSSI signal is weak or strong from the RSSI comparator 410, and receipt of the value SAT1(n) from the subtractor 460, the level detector 470 obtains a value G1(n) as follows:

if RSSI signal is strong, $G1(n) = SAT1(n) * 1.1$ (30)

if RSSI signal is weak, $G1(n) = SAT1(n) * 1.0$ (31)

The level detector 470 outputs the value G1(n) to the gain generator 490. Upon receipt of the value G1(n), the gain generator 490 obtains the value GAIN (n) as follows:

if −115 dBm >= $G1(n)$ > −120 dBm, $GAIN(n) = ((1.0 - 0.1)/(-115 \text{ dBm} - (-120 \text{ dBm}))) * (G1(n) - (-115 \text{ dBm})) + 1.0$ (32)

if $G1(n)$ > value(−115 dBm), $GAIN(n) = 1.0$ (33)

if $G1(n)$ <= value(−120 dBm), $GAIN(n) = 0.1$ (34)

where value ( ) denotes the value corresponding to the reception level as in the above embodiments.

The gain generator 490 gives the value GAIN (n) to the multiplier 600. The multiplier 600 amplifies the audio signal according to the GAIN (n), thus feeding the amplified audio signal to the speaker 160.

As described above, according to the seventeenth embodiment, similarly to the fourteenth embodiment, the control unit of the radio receiver employs the gain generator 490 and the multiplier 600 in place of the switch controller 480 and the switch 500 in the sixteenth embodiment. Therefore, repetition of the switching of the audio signal, that is, repetition of the passing or cutting off of the audio signal, can be avoided.

Eighteenth Embodiment

The eighteenth embodiment of the radio receiver according to the present invention will now be described. The eighteenth embodiment differs from the seventeenth embodiment in that the control unit of the eighteenth embodiment employs a gain selector 700 and a gain updater 710, which are identical to those of the fifteenth embodiment.

Figure 40:
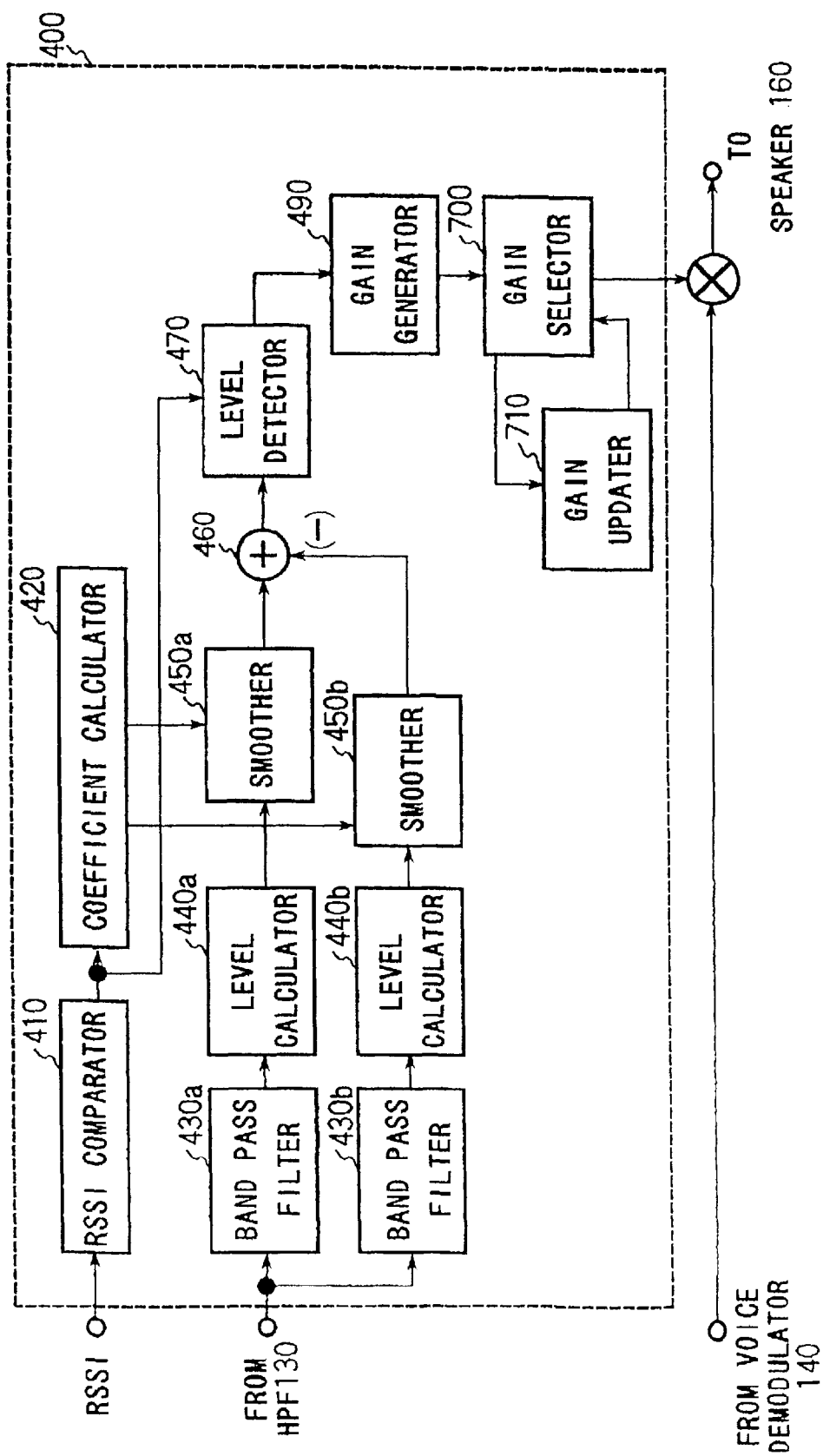
FIG. 40 shows the configuration of the control unit of the eighteenth embodiment.

FIG. 40 shows the configuration of the eighteenth embodiment. In the eighteenth embodiment, the operation of the gain selector 700 and the gain updater 710 is the same as the operation of those of the fifteenth embodiment while the operation of the circuits other than these two circuits is the same as the operation of those of the seventeenth embodiment. That is to say, the gain generator 490 generates the gain GAIN (n) to feed the gain GAIN (n) into the gain selector 700 while the gain updater 710 gradually increases the compulsorily-increased gain COM_GAIN (n) to feed the compulsorily-increased gain COM(n) to the gain selector 700, and the gain selector 700 selects the smaller of the gain GAIN (n) and the compulsorily-increased gain COM_GAIN (n), thus outputting the smaller gain to the multiplier 600. The multiplier 600 amplifies the audio signal using the smaller gain fed to the multiplier 600 by the gain selector 700.

As described above, according to the eighteenth embodiment, since the gain selector 700 and the gain updater 710 suppress the change in the GAIN (n) and seek the minimum GAIN (n) as in the fifteenth embodiment, the user of the radio receiver can avoid annoyance caused by sharp changes in the level of the audio signal.

Nineteenth Embodiment

Next, the nineteenth embodiment of the radio receiver according to the present invention will be described in detail. The nineteenth embodiment differs from the eighteenth embodiment in the configuration of the control unit 170. For ease of explanation, the description below will focus principally on the configuration and operation of the control unit 170 in the nineteenth embodiment.

Figure 41:
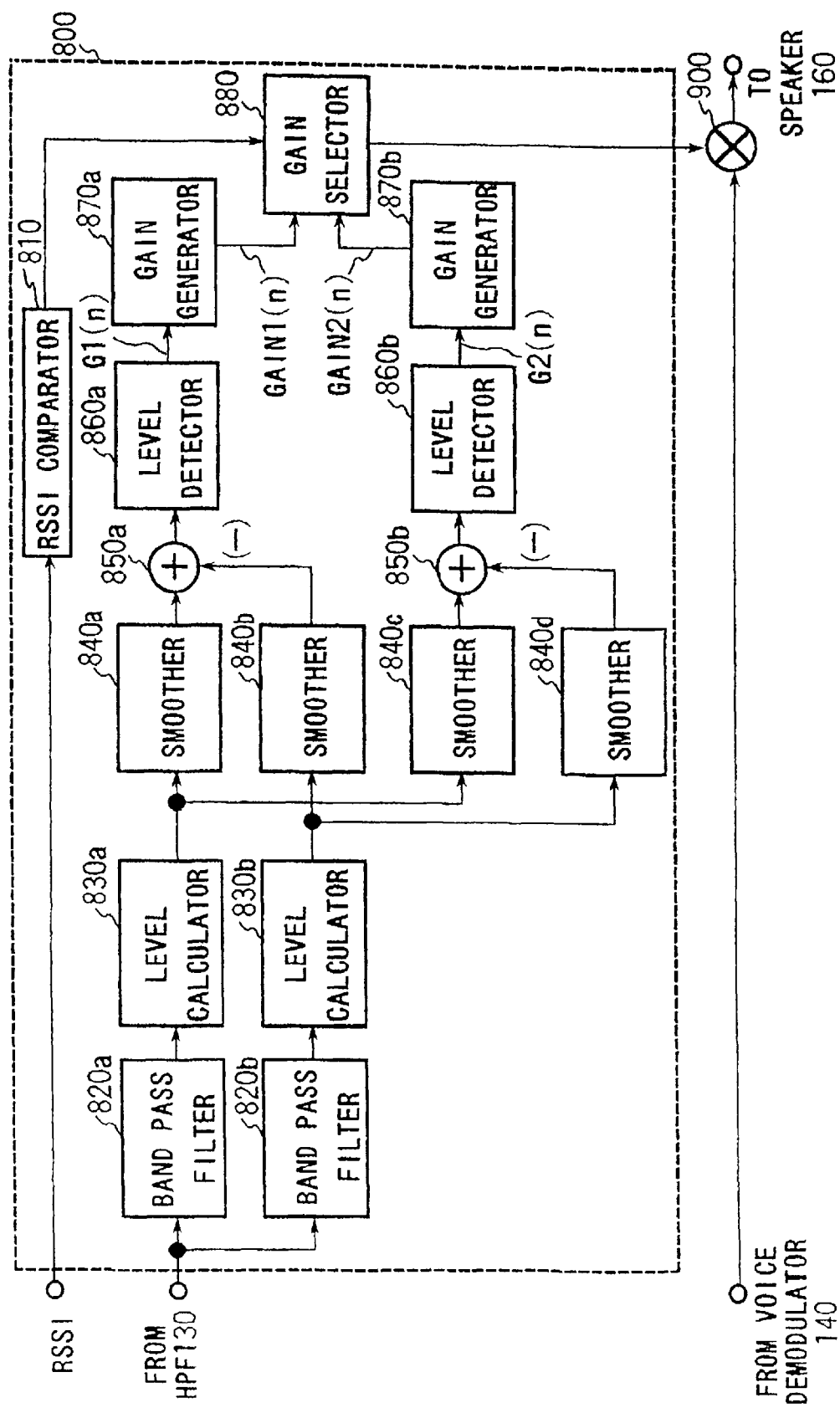
FIG. 41 shows the configuration of the control unit of the nineteenth embodiment.
Figure 42:
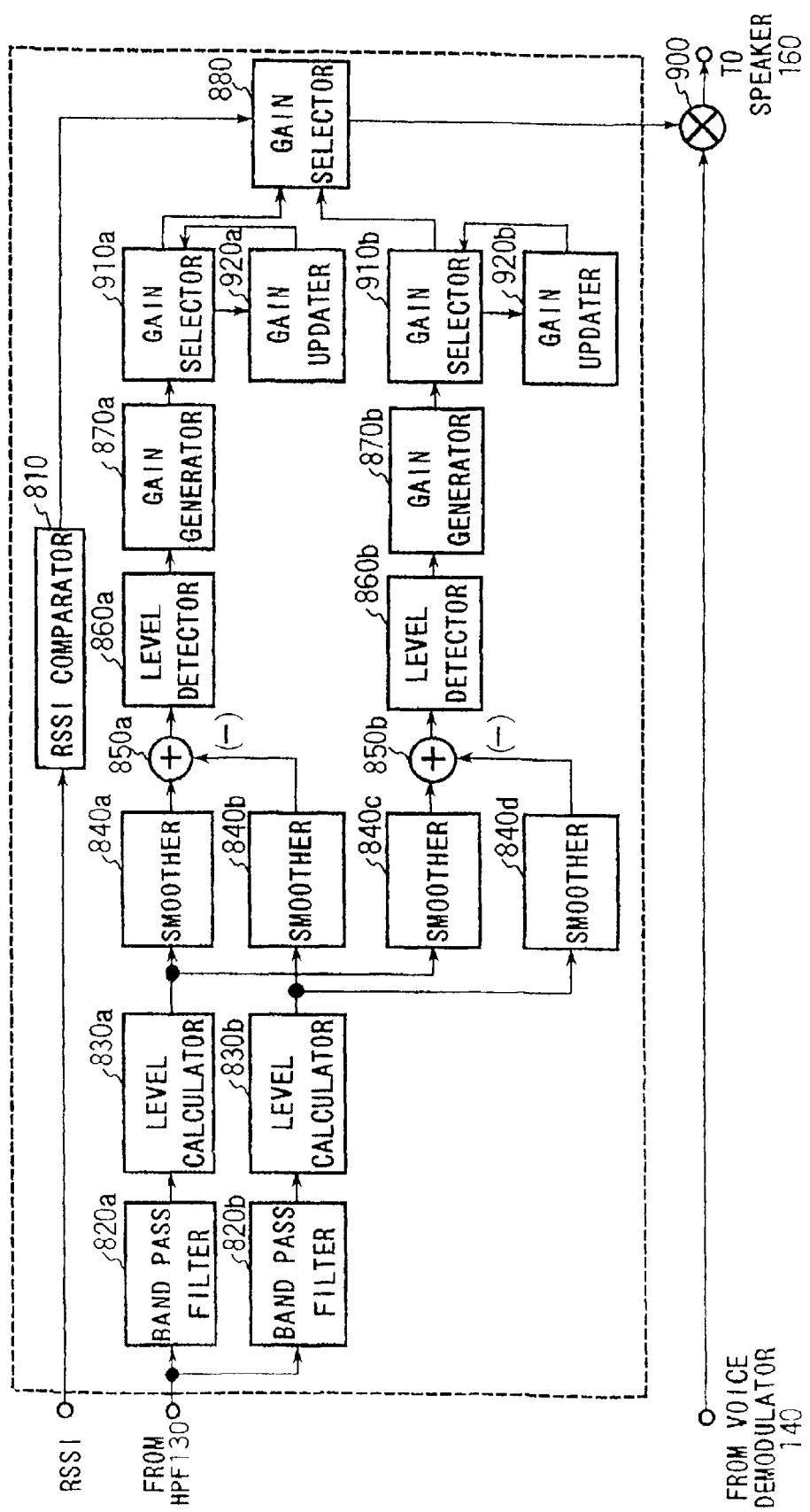
FIG. 42 shows the configuration of the control unit of the twentieth embodiment.

FIG. 41 shows the configuration of the control unit 170 in the nineteenth embodiment. In the figure, the control unit 170 incorporates a level detector 800 and a multiplier 900, wherein the level detector 800 incorporates an RSSI comparator 810, band pass filters 820*a* and 820*b*, level calculators 830*a* and 830*b*, smoothers 840*a*, 840*b*, 840*c*, and 840*d*, subtractors 850*a* and 850*b*, level detectors 860*a* and 860*b*, gain generators 870*a* and 870*b*, and a gain selector 880. Here, the configuration and operation of the band pass filters 820, level calculators 830, smoothers 840, and subtractors 850 are the same as those in the thirteenth embodiment. For simplification of explanation, therefore, the configuration and operation of the circuits other than those circuits will be described.

The RSSI comparator 810 compares the level of the RSSI signal with a given threshold and outputs the result of the comparison to the gain selector 880. The level detector 860*a* detects the difference between the supervisory signal and the adjacent noise over a short period of time whereas the level detector 860*b* detects the difference therebetween over a long period of time. The level detector 860*a* outputs a value G1(n) to the gain generator 870*a* while the level detector 860*b* outputs a value G2(n) to the gain generator 870*b*. The gain generator 870*a* generates a value GAIN1(n) used for amplifying by the multiplier 900, using the value G1(n). Similarly, the gain generator 870*a* generates a value GAIN2(n) used for amplifying by the multiplier 900, using the value G2(n). The gain selector 880 selects the value GAIN1 (1) or the value GAIN2(n) depending on the result of the comparison obtained by the RSSI comparator 810, and provides the selected value to the multiplier 900. The multiplier 900 amplifies the audio signal on the basis of the value received from the gain selector 880.

More specifically, the gain generator 870*a* generates the value GAIN1(n) using the value G1(n) as follows:

if value(−115 dBm)>=$G1$(n)>value(−120 dBm), GAIN1(n)=((1.0−0.1)/(value(−115 dBm)−value(−120 dBm)))*($G1$(n)−value(−115 dBm))+1   (35)

if $G1$(n)>value(−115 dBm), GAIN1(n) 1.0   (36)

if $G1$(n)<=value(−120 dBm), GAIN1(n) 0.1   (37)

where value ( ) denotes the value corresponding to the reception level of the radio wave, as in the above embodiments.

Similarly, the gain generator 870*b* generates the value GAIN2(n) using the value G2(n) as follows:

if value (−115 dBm)>=$G2$(n)>value (−120 dBm), GAIN2(n)= ((1.0−0.1)/(value (−115dBm)−value (−120 dBm)))*(G2(n)−value (−115 dBm))+1   (38)

if $G2$(n)>value(−115 dBm), GAIN2(n)=1.0   (39)

if $G2$(n)<=value(−120 dBm), GAIN2(n)=0.1   (40)

The gain generator 870*a* gives the value GAIN1(n) to the gain selector 880 while the gain generator 870*b* also gives the value GAIN2(n) to the gain selector 880. Upon receipt of the values GAIN1 (n) and GAIN2 (n), the gain selector 880 selects one of these values GAIN1(n) and GAIN2(n) according to whether the level of the RSSI signal is strong or weak. Specifically, the gain selector 880 outputs to the multiplier 900, one of the values GAIN1(n) and GAIN2(n) as follows:

if RSSI signal>=value(−110 dBm), the gain selector 880 outputs the value GAIN1(n)   (41)

if RSSI signal <value (−110 dBm), the gain selector 880 outputs the value GAIN2(n)   (42)

Upon being fed with one of the values GAIN1(n) or GAIN2(n), the multiplier 900 amplifies the audio signal based upon the received value.

As described above, according to the nineteenth embodiment, the radio receiver generates the value GAIN1 (n) with respect to the average of the change in the supervisory signal and the adjacent noise over a short period of time and the value GAIN2(n) with respect to the average of the change in the supervisory signal and the adjacent noise over a long period of time. Further, one of the values GAIN1(n) or GAIN2(n) used for amplifying the audio signal is selected according to whether the RSSI signal is strong or weak, which can prevent frequent switching of the audio signal.

Twentieth embodiment

Next, the twentieth embodiment of the radio receiver according to the present invention will be described in detail. The configuration and operation of the twentieth embodiment is roughly the same as that of the nineteenth embodiment. In comparison with the nineteenth embodiment, the twentieth embodiment is distinguished in that it employs two additional gain selectors 910a and 910b, and gain updaters 920a and 920b, where the gain selectors 910a and 910b and the gain updaters 920a and 920b operate like the corresponding circuits of the above embodiments. Consequently, for example, the gain selector 910a and the gain updater 920a serve to reduce the change in the gain GAIN1(n) relative to the change in the supervisory signal and the adjacent noise over a short period of time. Similarly, the gain selector 910b and the gain updater 920b serve to reduce the change in the gain GAIN2(n) relative to the change in the supervisory signal and the adjacent noise over a long period of time.

As described, according to the twentieth embodiment, incorporating the two additional gain selectors and the gain updaters, the radio receiver reduces the change in both the gains GAIN1(n) and GAIN2(n) as in the above embodiments.

While the present invention has been described in terms of the preferred embodiments, the invention is not limited thereto, but can be embodied in various ways without departing from the principle of the invention as defined in the appended claims.

What is claimed is:

1. A receiver which receives a desired signal comprising:
   a calculating circuit which calculates a condition of the desired signal based upon a level of the desired signal and a level of noise accompanying the desired signal,
   wherein the desired signal includes a transmission signal and a supervisory signal used for supervising the condition of the propagation path through which the transmission signal is transmitted, and
   the calculating circuit calculates a condition of the transmission signal based upon a level of the supervisory signal, and a level of noise adjacent to the supervisory signal; and
   a controlling circuit which controls outputting of the desired signal according to the calculated condition.

2. A receiver as set forth in claim 1, wherein the calculating circuit includes:
   a first filter which passes the supervisory signal;
   a second filter which passes the noise;
   a first calculator which calculates the level of the supervisory signal being transmitted through the first filter;
   a second calculator which calculates the level of the noise output from the second filter; and
   a subtractor which calculates a difference between the level of the supervisory signal and the level of the noise,
   wherein the controlling circuit controls outputting of the transmission signal according to the difference.

3. A receiver as set forth in claim 2, wherein the calculating circuit further includes a comparator which compares the difference with a given threshold,
   wherein the controlling circuit includes:
   a switch which switches the transmission signal; and
   a switch controller which controls the switch according to the result of the comparison obtained by the comparator.

4. A receiver as set forth in claim 3, further comprising a first smoother which smoothes a first change in the level of the supervisory signal; and
   a second smoother which smoothes a second change in the level of noise,
   wherein the comparator compares the smoothed fist change with the smoothed second change.

5. A receiver as set forth in claim 2, further comprising:
   a first short-period smoother which smoothes a first change in the level of the supervisory signal over a short period of time;
   a second short-period smoother which smoothes a second change in the level of the noise over the short period of time;
   a first long-period smoother which smoothes a third change in the level of the supervisory signal over a long period of time; and
   a second long-period smoother which smoothes a fourth change in the level of the noise over the long period of time,
   wherein the subtractor prepares a first difference between the smoothed first change and the second smoothed change, and prepares a second difference between the smoothed third change and the fourth smoothed change, and
   the controlling circuit controls outputting of the transmission signal according to the first difference and the second difference.

6. A receiver as set forth in claim 5, wherein the subtractor includes:
   a first subtractor which calculates the first difference; and
   a second subtractor which calculates the second difference.

7. A receiver as set forth in claim 5, wherein the controlling circuit includes:
   a switch which switches the transmission signal; and
   a switch controller which controls the switch according to the result of the comparison obtained by the comparator.

8. A receiver as set forth in claim 5, wherein the controlling circuit includes:
   a gain generator which generates a gain according to the first difference and the second difference; and
   a multiplier which amplifies the transmission signal according to the gain.

9. A receiver as set forth in claim 8, wherein the controlling circuit further includes:
   a gain updater which prepares a first gain based upon a second gain previously prepared by the gain updater; and
   a gain selector which selects a smaller one of the gain generated by the gain generator and the gain prepared by the gain updater,
   wherein the multiplier amplifies the transmission signal according to the smaller gain.

10. A receiver as set forth in claim 2, further comprising:
   a signal strength comparator which compares a level of an indicator signal which is received with the desired signal and is indicative of a strength of the desired signal with a given threshold;

a first smoother which smoothes a first change in the level of the supervisory signal according to a first expression having a first coefficient;

a second smoother which smoothes a second change in the level of the noise according to a second expression having a second coefficient; and a coefficient changer which changes the first coefficient and the second coefficient according to the result of the comparison obtained by the signal strength comparator, wherein the subtractor calculates a difference between the smoothed first change and the smoothed second change, and the controlling circuit controls outputting of the transmission signal according to the difference.

11. A receiver as set forth in claim 10, wherein the controlling circuit includes a switch which switches the transmission signal; and a switch controller which controls the switch according to the result of the comparison obtained by the comparator.

12. A receiver as set forth in claim 10, wherein the controlling circuit includes a gain generator which generates a gain according to the difference; and a multiplier which amplifies the transmission signal according to the gain.

13. A receiver as set forth in claim 12, wherein the controlling circuit further includes:

a gain updater which prepares a first gain based upon a second gain prepared by the gain updater; and a gain selector which selects a smaller one of the gain generated by the gain generator and the gain prepared by the gain updater, wherein the multiplier amplifies the transmission signal according to the smaller gain.

14. A receiver as set forth in claim 13, wherein the gain updater increases the second gain to prepare the first gain.

15. A receiver as set forth in claim 2, wherein the calculating circuit includes:

a signal strength comparator which compares a level of an indicator signal which is received with the desired signal and is indicative of a strength of the desired signal with a given threshold;

a first short-period smoother which smoothes a first change in the level of the supervisory signal over a short period of time;

a second short-period smoother which smoothes a second change in the level of the noise over the short period of time;

a third long-period smoother which smoothes a third change in the level of the supervisory signal over a long period of time; and a fourth long-period smoother which smoothes a fourth change in the level of the noise over the long period of time, wherein the subtractor calculates a first difference between the smoothed first change and the smoothed second change, and calculates a second difference between the smoothed third change and the smoothed fourth change, and the controlling circuit controls outputting of the transmission signal according to one of the first difference and the second difference.

16. A receiver as set forth in claim 15, wherein the calculating circuit further includes:

a first gain generator which generates a first gain based upon the first difference; and a second gain generator which generates a second gain based upon the second difference, wherein the controlling circuit controls outputting of the transmission signal according to one of the first gain and the second gain.

17. A receiver as set forth in claim 16, wherein the controlling circuit further includes:

a gain selector which selects a smaller one of the first gain and the second gain, wherein the controlling unit controls outputting of the transmission signal according to the smaller gain.

18. A receiver as set forth in claim 17, further comprising:

a first gain updater which prepares a third gain based upon a fourth gain previously prepared by the first gain updater;

a second gain updater which prepares a fifth gain based upon a sixth gain previously prepared by the second gain updater;

a first selector which selects a first small gain consisting of a smaller one of the third gain and the fourth gain; and a second selector which selects a second small gain consisting of a smaller one of the fifth gain and the sixth gain, wherein the gain selector selects the first small gain or the second small gain depending on the result of the comparison obtained by the signal strength comparator.

19. A receiver that receives a desired signal including a transmission signal and a supervisory signal, comprising:

a calculating circuit including a first filter which passes the supervisory signal from the received desired signal, a second filter which passes noise accompanying the received desired signal, a first calculator which calculates a level of the supervisory signal being transmitted through the first filter, a second calculator which calculates a level of the noise output from the second filter, and a subtractor which calculates a difference between the level of the supervisory signal and the level of the noise; and a controlling circuit that controls outputting of the transmission signal from the receiver according to the difference, with the controlling circuit including a gain generator which generates a gain according to the difference; and a multiplier which amplifies the transmission signal according to the gain.

20. A receiver as set forth in claim 19, wherein the controlling circuit further includes:

a gain smoother which suppresses changes in the gain so as to smooth the gain, wherein the multiplier amplifies the transmission signal according to the smoothed gain.

21. A receiver as set forth in claim 19, wherein the controlling circuit further includes:

a sampler which samples the gain generated by the gain generator during a period of time to prepare a plurality of sampled gains; and a minimum gain detector which detects a minimum gain among the plurality of sampled gains, wherein the multiplier amplifies the transmission signal received during the period of time according to the minimum gain.

22. A receiver as set forth in claim 19, wherein the controlling circuit further includes:
- a valley detector which detects a first valley and a second valley adjacent to the first valley with respect to a change in the gain generated by the gain generator; and
- a gain interpolator which interpolates a plurality of gains between the first valley and the second valley,
- wherein the multiplier amplifies the transmission signal between the time that the first valley arises and the time that the second valley arises according to the plurality of interpolated gains.

23. A receiver as set forth in claim 19, wherein the controlling circuit further includes:
- a gain updater which prepares a first gain based upon a second gain previously prepared by the gain updater; and
- a gain selector which selects a smaller one of the gain generated by the gain generator and the gain prepared by the gain updater,
- wherein the multiplier amplifies the transmission signal according to the smaller gain.

24. A receiver as set forth in claim 23, wherein the gain updater increases the second gain to prepare the first gain.

25. A receiver as set forth in claim 23, wherein the controlling circuit further includes a hangover circuit which prevents the gain updater from updating the smaller gain during a given hangover period,
- wherein the multiplier amplifies the transmission signal according to the smaller gain delayed by the hangover circuit.

26. A receiver as set forth in claim 23, wherein the controlling circuit further includes a hangover circuit which prevents the gain selector from feeding the smaller gain to the multiplier during a given hangover period.

27. A receiver as set forth in claim 19, wherein the controlling circuit further includes:
- a sampler which samples the gain generated by the gain generator during a period of time to prepare a plurality of sampled gains;
- a minimum gain detector which detects a minimum gain among the plurality of sampled gains;
- a gain updater which prepares a gain based upon the minimum gain; and
- a gain selector which selects a smaller one of the gain generated by the gain generator and the gain prepared by the gain updater,
- wherein the multiplier amplifies the transmission signal during the period of time according to the smaller gain.

28. A receiver as set forth in claim 27, wherein the gain updater keeps the gain constant during a first portion of the period of time before a time at which the minimum gain occurs and increases the gain during a latter portion of the period of time after the time at which the minimum gain occurs.

29. A receiver as set forth in claim 19, wherein the controlling circuit further includes:
- a sampler which samples the gain generated by the gain generator during a period of time to prepare a plurality of sampled gains;
- a minimum gain detector which detects a minimum gain among the plurality of sampled gains; and
- a period changer which shortens a length of the period of time by the length between a first time at which the minimum gain occurs and a second time which is the end of the period of time, and permits a next period of time to commence at the first time,
- wherein the multiplier amplifies the transmission signal corresponding to the period of time according to the minimum gain.

30. A receiver as set forth in claim 19, wherein the controlling circuit further includes:
- a first gain average calculator which calculates a first average of a change in the gain generated by the gain generator over a short period of time;
- a second gain average calculator which calculates a second average of a change in the gain generated by the gain generator over a long period of time; and
- a gain selector which selects a smaller one of the first average and the second average,
- wherein the multiplier amplifies the transmission signal according to the smaller gain.

31. A receiver as set forth in claim 19, wherein the controlling circuit further includes:
- a first gain average calculator which calculates a first average of a change in the gain generated by the gain generator over a short period of time;
- a second gain average calculator which calculates a second average of a change in the gain generated by the gain generator over a long period of time;
- a gain average comparator which compares the first average and the second average; and
- a gain average coefficient changer which changes one of a first coefficient used by the first gain average calculator for calculating the first average and a second coefficient used by the second gain average calculator for calculating the second average, according to the result of the comparison obtained by the gain average comparator in such a fashion that the first average and the second average become closer to each other.

32. A receiver as set forth in claim 19, wherein the controlling circuit further includes
- a first gain average calculator which calculates a first average of a change in the gain generated by the gain generator over a short period of time;
- a second gain average calculator which calculates a second average of a change in the gain generated by the gain generator over a long period of time;
- a coefficient changer which changes a coefficient used by the second gain average calculator for calculating the second average, in such a fashion that the second average becomes closer to the first average.

33. A portable telephone which receives a voice signal modulated by angle modulation and a supervisory signal for supervising the condition of the propagation path through which the voice signal is transmitted, and controls outputting of the voice signal according to the supervisory signal, the portable telephone comprising:
- a receiving circuit which receives a radio wave including the voice signal and the supervisory signal;
- a first filter which passes the supervisory signal;
- a second filter which passes noise whose frequency is different from the frequency band of the voice signal and the frequency of the supervisory signal;
- a first level calculator which calculates a level of the supervisory signal passing through the first filter;
- a second level calculator which calculates a level of the noise passing through the second filter;
- a subtractor which calculates a difference between the level of the supervisory signal and the level of the noise;

a comparator which compares the difference with a threshold defined by the angle modulation; and a controller which controls outputting of the voice signal according to the result of the comparison obtained by the comparator.

34. A method for use of a radio receiver which receives a transmission signal and a supervisory signal for supervising a condition of a propagation path through which the transmission signal is transmitted, and controls outputting of the transmission signal according to the supervisory signal, the method comprising the steps of:

detecting a level of the supervisory signal;

detecting a level of noise whose frequency is different from the frequency band of the transmission signal and the frequency of the supervisory signal;

calculating a difference between the level of the supervisory signal and the level of the noise; and controlling the outputting of the transmission signal according to the difference.

* * * * *